(12) United States Patent
Rolleston et al.

(10) Patent No.: US 8,902,220 B2
(45) Date of Patent: Dec. 2, 2014

(54) SYSTEM ARCHITECTURE FOR VIRTUAL RENDERING OF A PRINT PRODUCTION PIECE

(75) Inventors: Robert J. Rolleston, Rochester, NY (US); Alan T. Coté, East Rochester, NY (US); Neil R. Sembower, Austin, TX (US); Steven J. Harrington, Webster, NY (US); Pascal Valobra, Meylan (FR)

(73) Assignee: Xerox Corporation, Norwalk, CT (US)

( * ) Notice: Subject to any disclaimer, the term of this patent is extended or adjusted under 35 U.S.C. 154(b) by 155 days.

(21) Appl. No.: 13/239,894

(22) Filed: Sep. 22, 2011

(65) Prior Publication Data

US 2012/0162202 A1 Jun. 28, 2012

Related U.S. Application Data

(60) Provisional application No. 61/427,364, filed on Dec. 27, 2010.

(51) Int. Cl.
*G06F 3/12* (2006.01)

(52) U.S. Cl.
CPC ............ *G06F 3/1208* (2013.01); *G06F 3/1256* (2013.01); *G06F 3/1285* (2013.01)
USPC .......................................... 345/419; 345/428

(58) Field of Classification Search
USPC ....................................................... 345/419
See application file for complete search history.

(56) References Cited

U.S. PATENT DOCUMENTS

| 5,808,614 A | 9/1998 | Nagahara et al. |
| 5,815,786 A | 9/1998 | Isemura |
| 5,963,641 A | 10/1999 | Crandall et al. |
| 5,988,899 A | 11/1999 | Benson et al. |
| 6,046,818 A | 4/2000 | Benson |
| 6,091,930 A | 7/2000 | Mortimer et al. |

(Continued)

FOREIGN PATENT DOCUMENTS

| JP | 9161097 | 6/1997 |
| JP | 2002196901 | 7/2002 |

(Continued)

OTHER PUBLICATIONS

Apple_ILIFE_The New iPhoto webpage; apple.com/ilife/iphoto; c. 2004 Apple Computer, Inc.; Dec. 1, 2004; 3 pages.

(Continued)

*Primary Examiner* — David Zarka
*Assistant Examiner* — Sohum Kaji
(74) *Attorney, Agent, or Firm* — Duane C. Basch; Basch & Nickerson LLP

(57) ABSTRACT

A system and method for a pre-print, three-dimensional virtual rendering of a print piece is disclosed. A plurality of modular/pipelined architectural layers are managed, operated, and organized by a controller. A product definition is provided to a job ticket adaptation layer where it is transformed into a physical model. The physical model is then transformed into a display model via the product model layer. The display model is transformed into a scene that can be displayed on a graphical user interface as a three dimensional virtual rendering by a rendering layer, where the binding elements may further include 3D binding models as well as 2D textures on 3D surfaces to simulate 3D models.

18 Claims, 42 Drawing Sheets

(56) References Cited

U.S. PATENT DOCUMENTS

| | | | |
|---|---|---|---|
| 6,134,568 A | 10/2000 | Tonkin | |
| 6,243,074 B1 | 6/2001 | Fishkin et al. | |
| 6,311,142 B1 | 10/2001 | Glassner | |
| 6,327,050 B1 | 12/2001 | Motamed et al. | |
| 6,518,963 B1 * | 2/2003 | Waupotitsch et al. | 345/419 |
| 6,545,680 B1 | 4/2003 | Delas et al. | |
| 6,616,702 B1 | 9/2003 | Tonkin | |
| 7,577,902 B2 | 8/2009 | Hong et al. | |
| 2002/0010721 A1 | 1/2002 | Crimmins et al. | |
| 2002/0114004 A1 | 8/2002 | Ferlitsch | |
| 2002/0116439 A1 | 8/2002 | Someshwar et al. | |
| 2002/0171871 A1 | 11/2002 | Catt et al. | |
| 2003/0140315 A1 | 7/2003 | Blumberg et al. | |
| 2003/0189726 A1 | 10/2003 | Kloosterman et al. | |
| 2004/0066527 A1 | 4/2004 | Kloosterman et al. | |
| 2004/0111418 A1 | 6/2004 | Nguyen et al. | |
| 2005/0174349 A1 | 8/2005 | Watson | |
| 2005/0222791 A1 | 10/2005 | Masumoto et al. | |
| 2006/0114490 A1 * | 6/2006 | Rolleston | 358/1.14 |
| 2006/0133664 A1 | 6/2006 | Hong et al. | |
| 2007/0097203 A1 | 5/2007 | Yamada et al. | |
| 2007/0239787 A1 * | 10/2007 | Cunningham et al. | 707/104.1 |
| 2007/0240042 A1 | 10/2007 | Sato | |
| 2007/0268513 A1 | 11/2007 | Enloe | |
| 2008/0141151 A1 | 6/2008 | Saur | |
| 2008/0165141 A1 * | 7/2008 | Christie | 345/173 |
| 2009/0222724 A1 | 9/2009 | Stewart et al. | |
| 2010/0095246 A1 * | 4/2010 | Shepherd | 715/835 |
| 2012/0081738 A1 | 4/2012 | Seki | |
| 2012/0084781 A1 | 4/2012 | Isaka | |
| 2012/0092704 A1 | 4/2012 | Kumazawa | |
| 2012/0124187 A1 | 5/2012 | Onda et al. | |
| 2012/0307309 A1 | 12/2012 | Ikegaya | |
| 2013/0010326 A1 | 1/2013 | Mochizuki | |
| 2013/0076727 A1 | 3/2013 | Rolleston et al. | |
| 2013/0076728 A1 | 3/2013 | Rolleston et al. | |
| 2013/0076729 A1 | 3/2013 | Rolleston et al. | |
| 2013/0076730 A1 | 3/2013 | Rolleston et al. | |
| 2013/0076731 A1 | 3/2013 | Rolleston et al. | |
| 2013/0076734 A1 | 3/2013 | Rolleston | |
| 2013/0077113 A1 | 3/2013 | Rolleston et al. | |

FOREIGN PATENT DOCUMENTS

| | | |
|---|---|---|
| JP | 2004005513 | 1/2004 |
| JP | 2004029471 | 1/2004 |
| JP | 2004164151 | 6/2004 |
| JP | 2006185437 | 7/2006 |
| WO | WO2004097703 | 11/2004 |

OTHER PUBLICATIONS

Buchner, T.; Kinematics of 3D Foldiong Structures for Nanostructured Origami; MIT, Department of Mechanical Engineering; Cover + pp. 1-94; Dec. 2003.

Dreamworks+hp webpage; weloome.hp./com/country/us/en/msg/corp/flashdreamworks.html; c. HP Deveopment, LP;Dec. 1, 2004; 1 page.

IBM Visual Job Ticketing; IBM Printing Systems: c. IBM Corporation 2002.

JP2002196901__Abstract and machine translation of Japanese Publication JP2002196901 published Jul. 12, 2002; JP application 2001-274081 filed Sep. 10, 2001; Inventor Tomotoshi; Assignee Ricoh.

JP2004005513—Abstract and machine translation of Japanese publication JP2004-005513 published Jan. 8, 2004; application JP2003-085578 filed Mar. 26, 2003; Applicant: Matsushita Electric Works Ltd; Inventors Kiyotoshi et al.

JP2004029471—Abstract and machine translation of Japanese Publication JP2004029471; published Jan. 29, 2004; application JP2002-186801 filed Jun. 26. 2002; Applicant Fuji Xerox; Inventor Masayoshi.

JP2004164151—Abstract and machine translation of Japanese Publication JP2004164151; published Jun. 10, 2004; application JP 2002-327744 filed Nov. 12, 2002; Applicant Dainippon Printing Co Ltd; Inventor Naoki.

JP2005348074—An unofficial copy of the prosecution history for Japanese Patent Application JP2005-348074 filed Dec. 1, 2005 (published Feb. 13, 2006 as JP2006-185437); corresponding to U.S. Appl. No. 11/001,431.

JP2006185437—Abstract and machine translation of Japanese Publication JP2006185437, published Jul. 13, 2006; Japanese application JP2005-348074 filed Dec. 1, 2005; Applicant Xerox Corporation; Inventor Rolleston.

JP9161097—Abstract and machine translation of Japanese Published Application Publication JP9161097; published Jun. 20, 1997; application JP07-318741 filed Dec. 7, 1995; Applicant Matsushita Electric Ind Co Ltd; Inventor Michimasa.

Mercurio, P.J.; 3-D Hardcopy: The Hoyosa Cube; Pixel. Mar.-Apr. 1991; 7 pages un-numbered.

Mimeo—Your Online Print Center webpage: mimeo.com/demo/demo.htm; 1-800-Go-Mimeo; 2001 Mimeo.com, Inc. Dec. 1, 2004; 1 page.

Mimeo—Your Online Print Center webpage; mimeo.com/enterprise/features.htm; 1-800-466-4636; c. 1999-2004 Mimeo, Inc.; Dec. 1, 2004; 4 pages.

WO2004097703—Abstract WO2004097703 published Nov. 11. 2004; JP application PCT/JP2003/005635 filed May 2, 2003; Inventor Masumoto, Applicant. Fujitsu; (US national Stage US20050222791).

GB1216452.1—An Unofficial Copy of a UK Search Report Issued Mar. 11, 2013 for GB1216452.1 filed Sep. 14, 2012; Corresponding to U.S. Appl. No. 13/239,960 Inventor: Robert J. Rolleston et al.

* cited by examiner

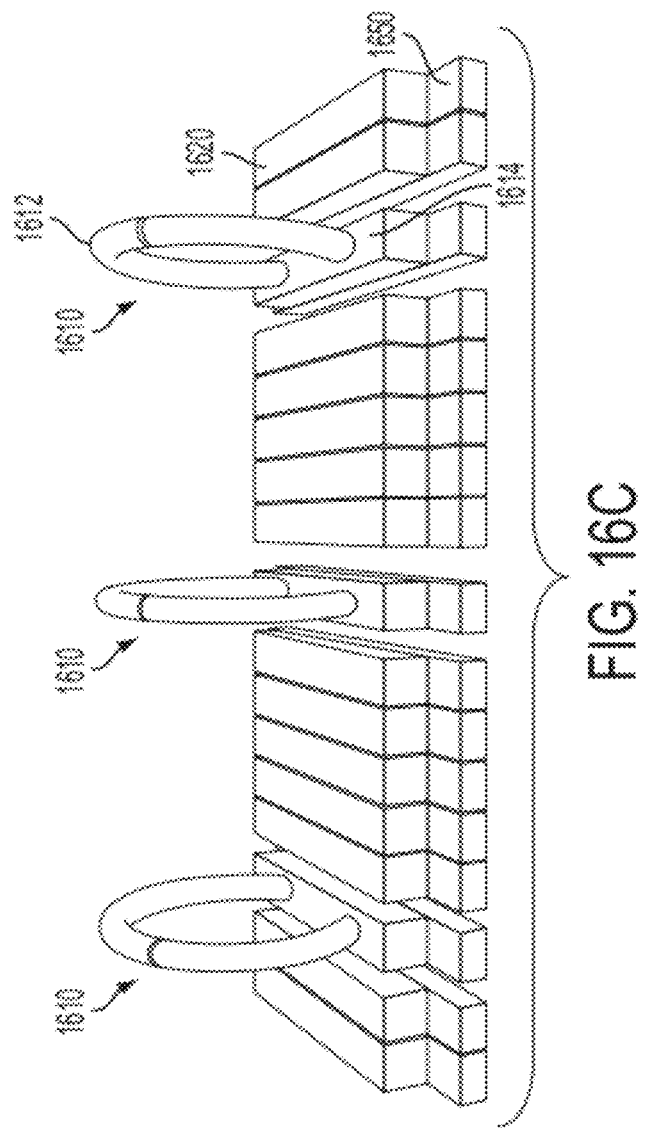

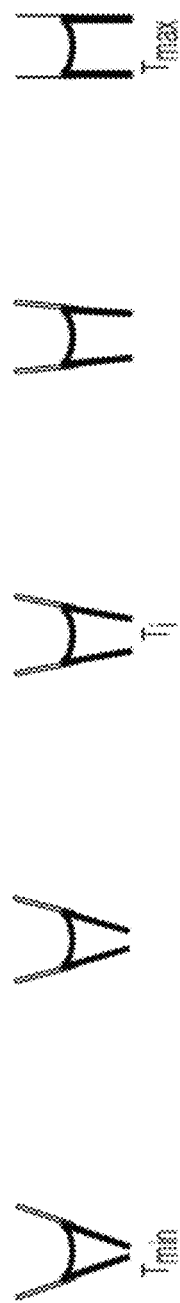
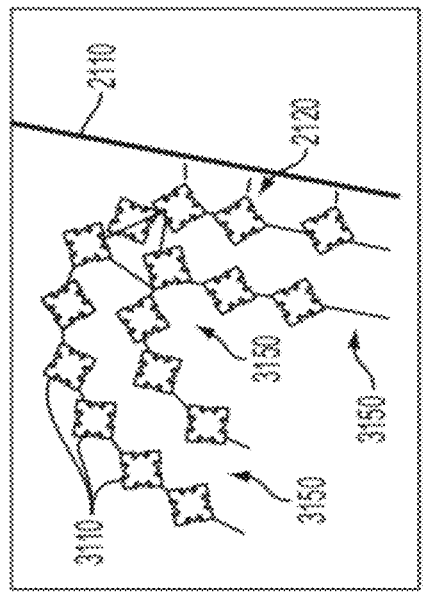
FIG. 31
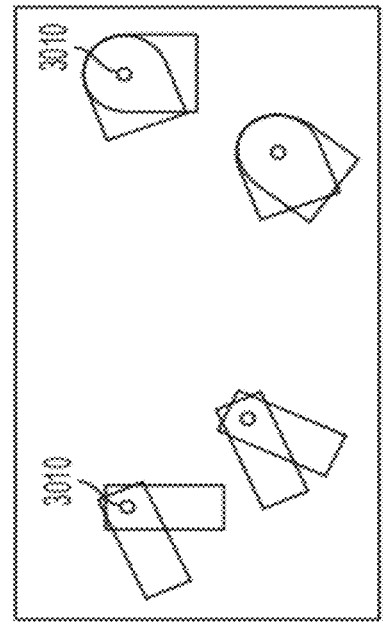
FIG. 30

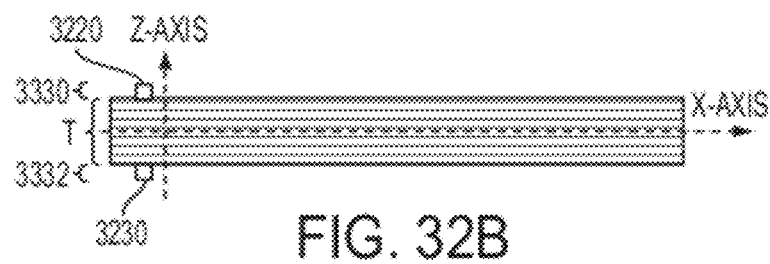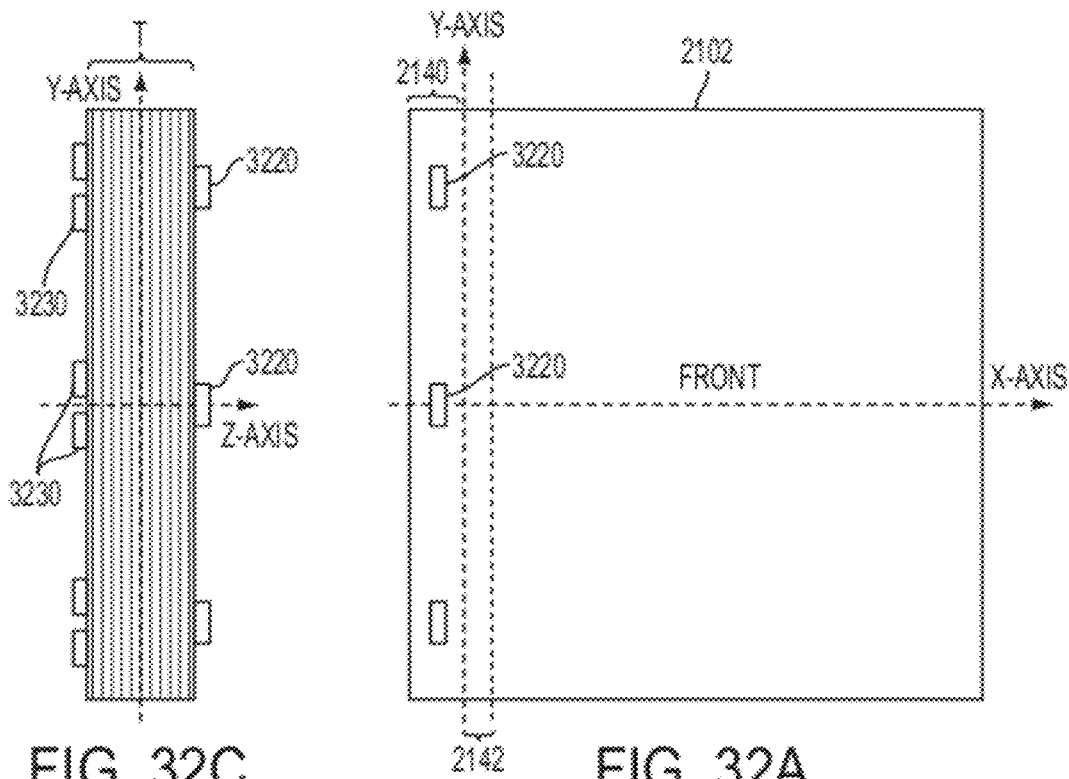

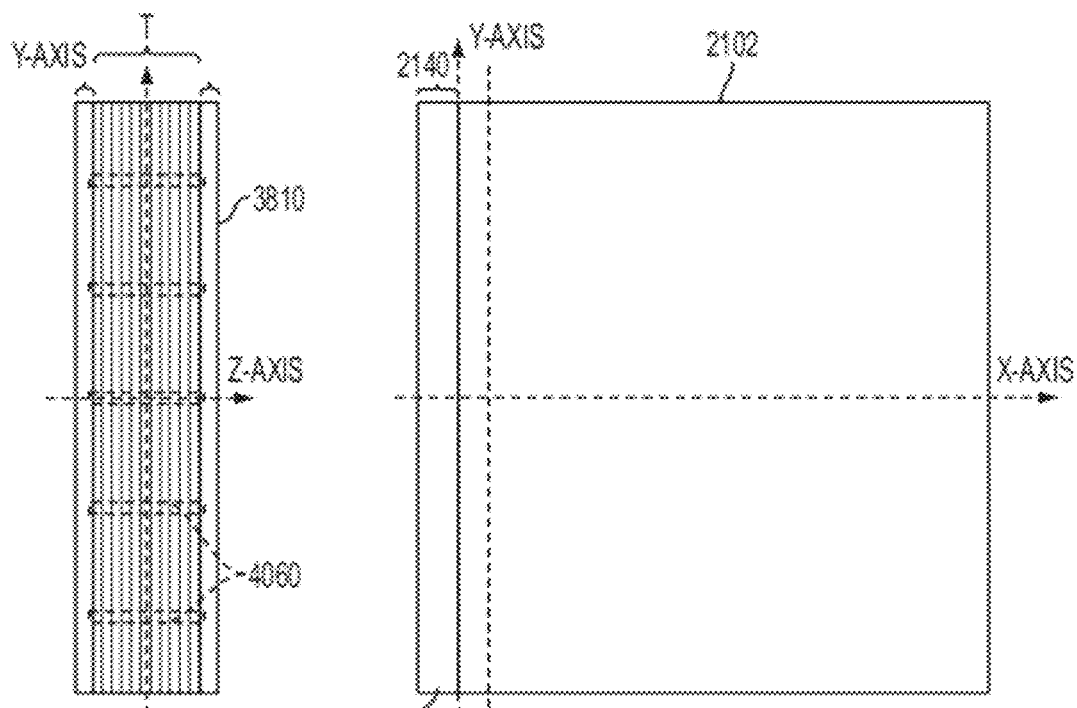

SYSTEM ARCHITECTURE FOR VIRTUAL RENDERING OF A PRINT PRODUCTION PIECE

CROSS-REFERENCE TO RELATED APPLICATIONS

Priority is claimed from U.S. Provisional Patent Application No. 61/427,364 by Rolleston et al., filed Dec. 27, 2010 for "SYSTEM ARCHITECTURE FOR VIRTUAL RENDERING OF A PRINT PRODUCTION PIECE," and cross reference is made to the following application, U.S. Patent Application Publication No. 2006/0114490, U.S. Ser. No. 11/001,431, entitled "SYSTEM AND METHOD FOR DOCUMENT PRODUCTION VISUALIZATION," filed Dec. 1, 2004 by Robert J. Rolleston, both of which are hereby incorporated by reference in their entirety for their teachings. Cross reference is also made to the following concurrently-filed applications that are each hereby incorporated by reference in their entirety:

a) U.S. Ser. No. 13/239,908), for a SYSTEM AND METHOD EMPLOYING 3D MODELS IN VIRTUAL RENDERING OF A PRINT PRODUCTION PIECE, by R. Rolleston et al. filed concurrently herewith;

b) U.S. Ser. No. 13/239,946), for a SYSTEM AND METHOD EMPLOYING SEGMENTED MODELS OF BINDING ELEMENTS IN VIRTUAL RENDERING OF A PRINT PRODUCTION PIECE, by R. Rolleston et al. filed concurrently herewith;

c) U.S. Ser. No. 13/239,960), for a SYSTEM AND METHOD EMPLOYING RING-TYPE BINDING ELEMENTS IN VIRTUAL RENDERING OF A PRINT PRODUCTION PIECE, by R. Rolleston et al. filed concurrently herewith;

d) U.S. Ser. No. 13/239,019), for a SYSTEM AND METHOD EMPLOYING VARIABLE SIZE MECHANICAL BINDING ELEMENTS IN VIRTUAL RENDERING OF A PRINT PRODUCTION PIECE, by R. Rolleston et al. filed concurrently herewith;

e) U.S. Ser. No. 13/239,988), for a SYSTEM AND METHOD EMPLOYING VARIABLE SIZE BINDING ELEMENTS IN VIRTUAL RENDERING OF A PRINT PRODUCTION PIECE, by R. Rolleston et al. filed concurrently herewith; and f) U.S. Ser. No. 13/239,932), for a SYSTEM AND METHOD EMPLOYING TEXTURE TO SIMULATE BINDING ELEMENTS IN VIRTUAL RENDERING OF A PRINT PRODUCTION PIECE, by R. Rolleston et al. filed concurrently herewith.

BACKGROUND AND SUMMARY

The teachings provided herein are directed generally to pre-print virtual rendering and depiction of a print job. The method and apparatus disclosed herein include a print system architecture and methodology for Document Production Visualization (DPV) for viewing of a document as a 3D image which can be inspected, manipulated and modified by an end user before committing the job to print-out. More particularly, a modular architecture for document production visualization is disclosed which may be implemented as a stand-alone application, or as a client-server application, which supports the input of different product formats as the print job definition, and allows for the plug-in use of different 3D rendering engines. Additionally, a system and method for managing and adjusting 3D models of binding elements is disclosed.

The printing industry is in a rapid state of change. The economics of the print market are forcing print manufactures to adopt such practices as lean manufacturing and computer integrated manufacturing (CIM), from order entry to delivery and invoice. Job definition format (JDF) and job management format (JMF) are two technical standards being proposed to help ease the flow of data, information, and content within and among the printing industry. The job definition format and job management format standards are perceived as enablers for the printing industry to move to a computer integrated manufacturing type of production process.

Thus, the printing industry is always looking for ways to improve how it conducts business. Of particular interest are ways to reduce production costs and improve efficiency. The system and methods disclosed herein transform the current production print practice by creating an easy to use document production visualization system.

The existing technologies that produce virtual renderings of a finished print piece are generally limited to providing only a two dimensional perspective. There are a few applications that provide a 3D rendering, but they are commonly implemented as a vector graphics-based animation application with full-screen navigation interfaces, graphic illustrations, and simple interactivity in an antialiased, resizable file format that is small enough to stream across a normal modem connection (e.g., FLASH™) or high-level computer programming languages that allow small application programs to be downloaded from a server to a client along with data that each program processes (e.g., JAVA™) and may require users to install undesirable plug-ins or run special applications. Thus, there exists a need for a system architecture that allows for a true 3D rendering in a browser with the ability to utilize various input formats and components (e.g. JDF, PDF), output rendering engines (e.g. JAVA3D™, FLASH™, Silverlight™, HTML5, SVG) and provide for flexibility of deployment (e.g. stand-alone application or client-server).

The systems and methods disclosed below and generally referred to herein as a document production visualization (DPV) system, has the value of allowing print buyers and print suppliers to deal with the growing complexity of the data and information associated with on-demand digital printing. U.S. patent application Ser. No. 11/001,431, incorporated by reference above, describes a system and method for the animated viewing of a 3D image of a document. Moreover, the system disclosed herein leverages the "virtual reality" computing power typically available on today's computer workstations and allows for a bi-directional flow of information. One aspect of document production visualization is the virtual rendering of the document being described by a job definition format (JDF) or similar standardized input. This virtual rendering has the advantage of allowing the user to "see" and even manipulate in 3D, the document before further time and materials are committed to a proofing or production process. The document may be viewed as it will appear in its final finished form, or alternatively at any stage of a given production process. Also provided are software controls so a user may interact with and modify the 3D image depiction of the document, directly altering the job definition format instructions, and thereby indirectly altering the actual completed final delivered physical print piece result.

The following summary is provided to facilitate an understanding of some of the innovative aspects unique to the teachings herein and is not intended to be limiting. A full appreciation of the various aspects of the embodiments disclosed herein is gained by taking the entire specification, claims, drawings, and abstract together as a whole.

One aspect of the following disclosure describes improved document production visualization systems and methods.

It is another aspect of the teachings herein to provide for a system that can be implemented as either a stand-alone application or a client-server application.

It is a further aspect of the teachings herein to provide bi-directional flow of information such that a user can alter a three dimensional virtual image display of a print piece and those alterations could be fed backwards through the system to alter the product definition.

It is a further aspect of the teachings herein to describe a system and method for managing and creating 3D models of binding objects of various types (e.g., coil, comb, spring clips, paper clips, bulldog clips, rings including "O" and "D" shapes, staples, Velobind™, glue, tape, etc.), and the customization of said 3D models.

Disclosed herein is a modular document production visualization system, comprising: a controller; a print product definition; a plurality of architecture layers managed and organized by the controller wherein the plurality of architecture layers include a print job ticket adaptation layer, a physical model layer, a display model layer, and a rendering layer; the print job ticket adaptation layer transforming the print product definition into a physical model; the physical model layer transforming the physical model into a display model; and the display model layer transforming the display model into a scene displayed as a three dimensional virtual rendering of the print product definition by the rendering layer on a graphical user interface.

Also disclosed herein is a document production visualization method, comprising: transforming a print product definition into a physical model utilizing a job ticket adaptation layer; transforming the physical model into a display model utilizing a physical model layer; transforming the display model into a scene utilizing a display model layer; and displaying said scene as a three-dimensional virtual rendering utilizing a rendering layer transform to a graphical user interface.

Further disclosed herein is a computer storage medium for generation of a three dimensional virtual rendering, the computer-usable medium embodying computer program code, the computer program code comprising computer executable instructions configured for receiving as input a print product definition, and generating a physical model from the print product definition utilizing a job ticket adaptation layer. The method also entails generating a display model from the physical model utilizing a physical model layer, and generating a scene from the display model utilizing a display model layer. The scene is displayed as a three dimensional virtual rendering of the print product definition on a graphical user interface utilizing a rendering layer. The method includes providing a controller configured to organize and manage the job ticket adaptation layer, the physical model layer, the display model layer, and the rendering layer.

The aforementioned aspects and other objectives and advantages of the disclosed embodiments can be achieved as described in further detail below.

BRIEF DESCRIPTION OF THE DRAWINGS

The accompanying figures, in which like reference numerals refer to similar elements throughout the separate views and which are incorporated in and form a part of the specification, further illustrate the embodiments and, together with the detailed description, serve to explain the embodiments disclosed herein. It is also noted that the drawings may not have been drawn to scale and that certain regions may have been purposely drawn disproportionately so that depicted features and concepts could be properly illustrated. The drawings are for purposes of illustrating various embodiments and are not to be construed as limiting, wherein:

FIG. 16C is an illustration of the three-ring binder elements in accordance with an embodiment of the invention;

FIG. 29 is an illustration of a range of spring clip binding models of varying sizes for an alternative model;

FIGS. 30-31 depict alternative modeling techniques for flexible portions of binding elements such as spring clips;

FIGS. 32A-C are illustrations of the face, top and side views of a document setting forth the model parameters for a staple binding;

FIGS. 40A-C are illustrations of the face, top and side views of a document setting forth the model parameters for a Velo™ binding;

DETAILED DESCRIPTION 1.0 System and Architecture

Figure 1:
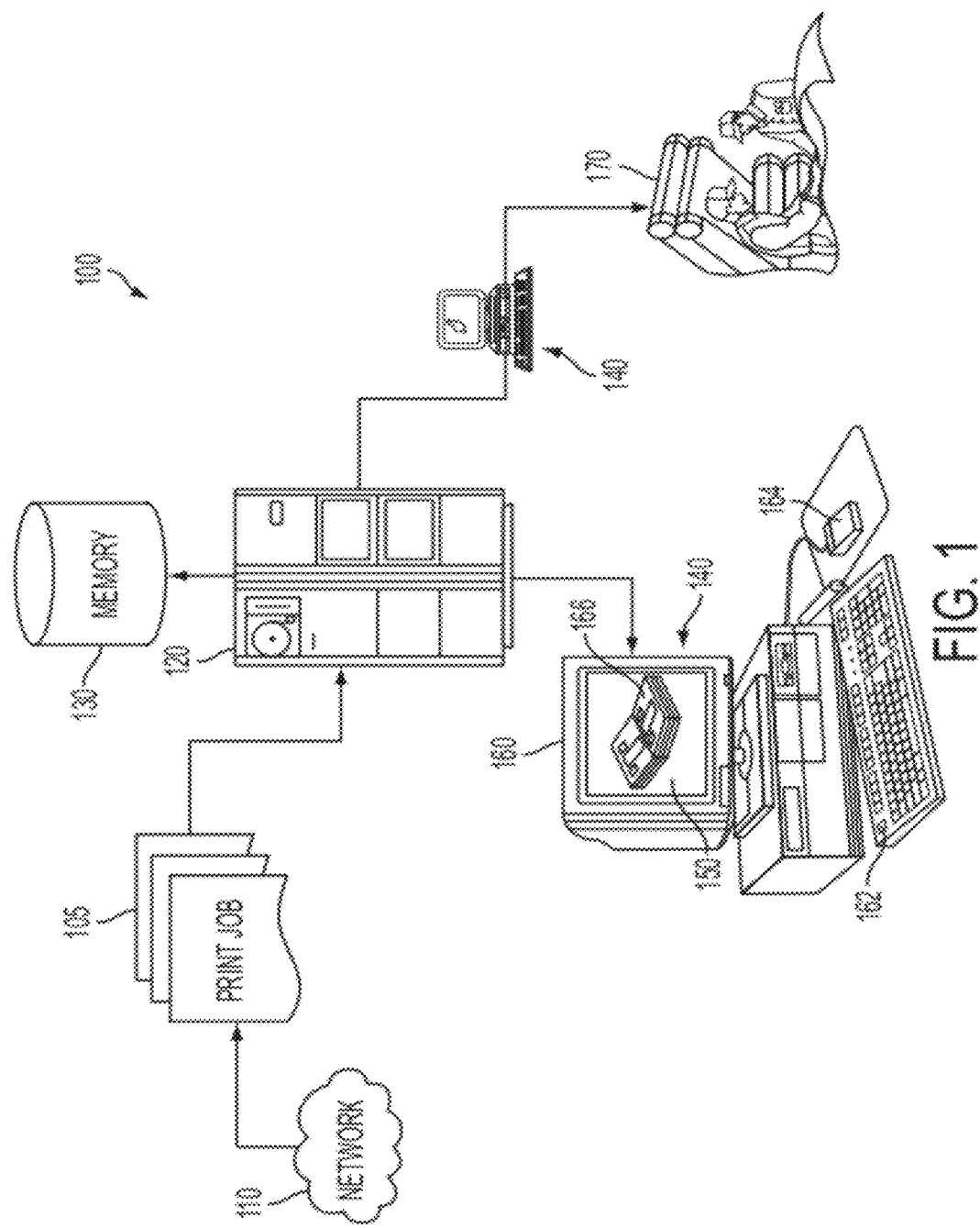
FIG. 1 illustrates an exemplary system upon which the architecture and methodology disclosed herein may be implemented.

In FIG. 1 there is depicted an exemplary system 100 upon which the following disclosure and methodology may be implemented. It is to be understood that certain aspects of the system would operate in accordance with pre-programmed instructions stored on various media and used to operate a local or networked computer system to carry out such features, and perhaps across a plurality of interconnected computers at a time. Such a system might include a commercially available personal computer with appropriate graphics rendering capability, that can also be associated with a computer storage medium (e.g., removable disk or similar portable media, RAM, ROM, and other non-transitory means for storing digital information that may be at least read by a computer) or similar memory devices and where the system is accessible, perhaps via an Internet or intranet for submission of print jobs. It is also contemplated that one or more aspects of the system may be implemented on a dedicated computer workstation such as 140 depicted in FIG. 1. Such a system may be embodied solely in a stand-alone workstation as well.

Initially, the content for a printing job 105 (pages, documents, etc.) is provided by the customer in a print product definition form acceptable to the system. Although depicted as an Internet connection 110, it will be appreciated that various computer storage media and communication techniques may be available for a user to supply the necessary printing job 105 content in a digital form. A networked processor, such as a server 120, operates in accordance with suitable pre-programmed software, which may also be obtained from such computer storage media, to store the content for the printing job in a computer storage medium such as memory 130 and to carry out the conversion of the data into suitable objects for virtual rendering on a workstation 140 or similar device with a display.

In one embodiment of the document production visualization system a customization module or service may be employed, where a core component of the customization module is a CustomizationService, which will be used by the system. The CustomizationService will provide a set of methods to retrieve meta-data for a particular model, to transform a particular model with given values for the properties, etc. A customization servlet may be used as an entry point for the preview system/tool and will navigate through a set of web pages for getting the values for the parameters supported by the model. The servlet may also transform the model based on the parameter values provided by the user and store the content as a HTTP session attribute.

As will be appreciated, the manner in which a client-server model divides the functionality of the system and methods disclosed herein is dependent upon a number of factors, including the storage capability, processing power, communication speed, etc. for the client and server. Thus, the customization service and its associated operations may reside on the server in one embodiment, on the client in another embodiment and may even be shared between the client an server.

Depending upon the environment and the requirements of the document production visualization system, the other functions described herein may be similarly directed to the server or the client, or may even be configured as a stand-alone application operating without interaction with a server. In yet another embodiment, the system could be configured as primarily a server-based application that simply provides the rasterized pages as you need them.

It should also be recognized that the embodiments and alternatives disclosed herein further contemplate that the system may provide the ability, perhaps through a user interface 150 or similar input feature, to change a binding element via another service operating on the client. Thus, the system would be able to provide updates to not only the 3D (and 2D) objects, but also to page images and other objects that could be changed.

Considering an exemplary embodiment as set forth in FIG. 1, workstation 140 provides a graphical user interface 150 in the form of a display 160, a keyboard 162 and a mouse 164 or similar pointing device, or as will be understood by one skilled in the art, any device for capturing and communicating user gestures of commands including but not limited to: scroll keys; "F" or "Function" keys; mouse pads; styli, track balls; wands; microphone/audio commands, touchscreens (e.g., touch-sensitive user interface, iPad, smartphone,) etc. Once the user has approved the 3D virtual rendering 166 for production, the approved job definition format (JDF) and associated virtual rendering data is again stored or updated on memory 130. Subsequently, the pressman or production planner may access the information stored in memory 130 to review the job—prior to, during and/or after production on the printer 170.

1.1 Layers & Models

Figure 2:
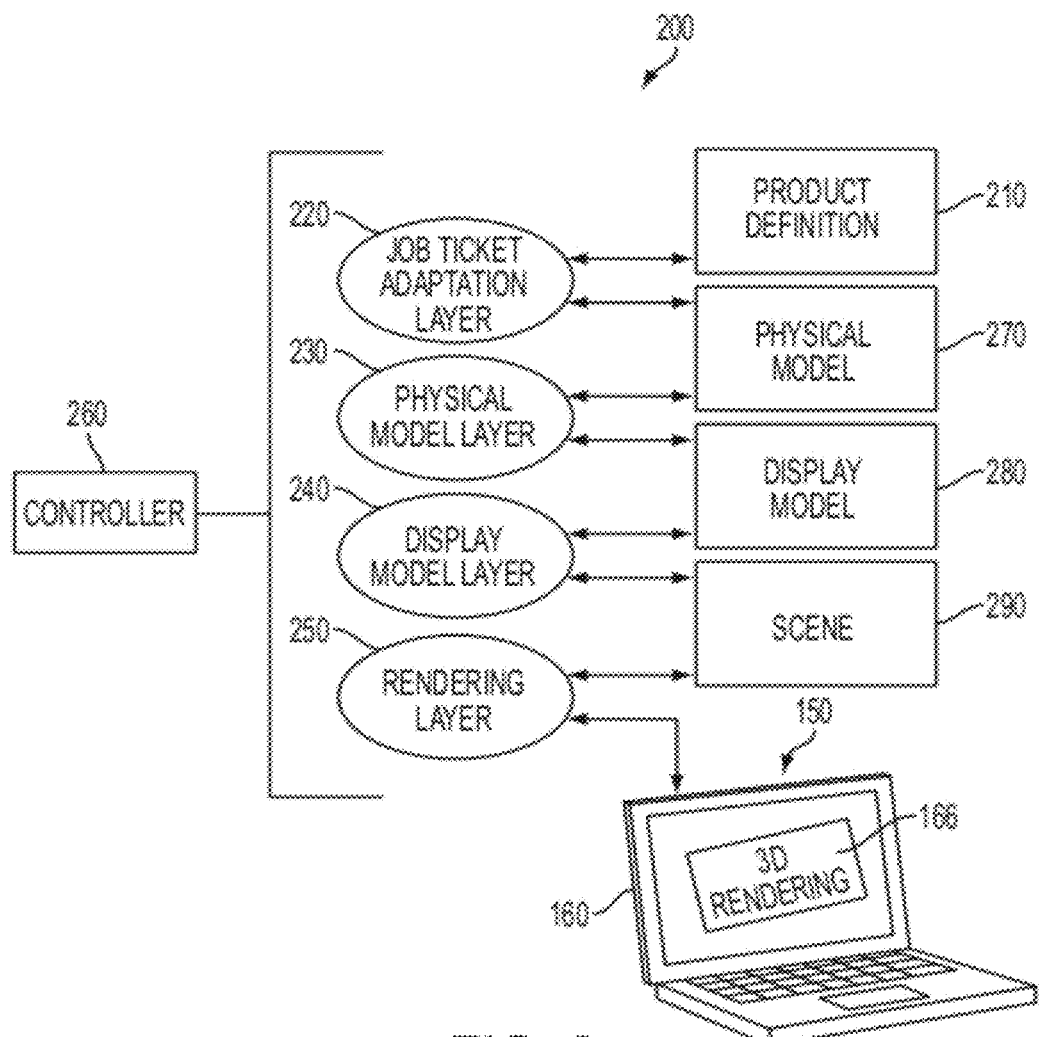
FIG. 2 illustrates a document production visualization system in accordance with one embodiment.
Figure 9:
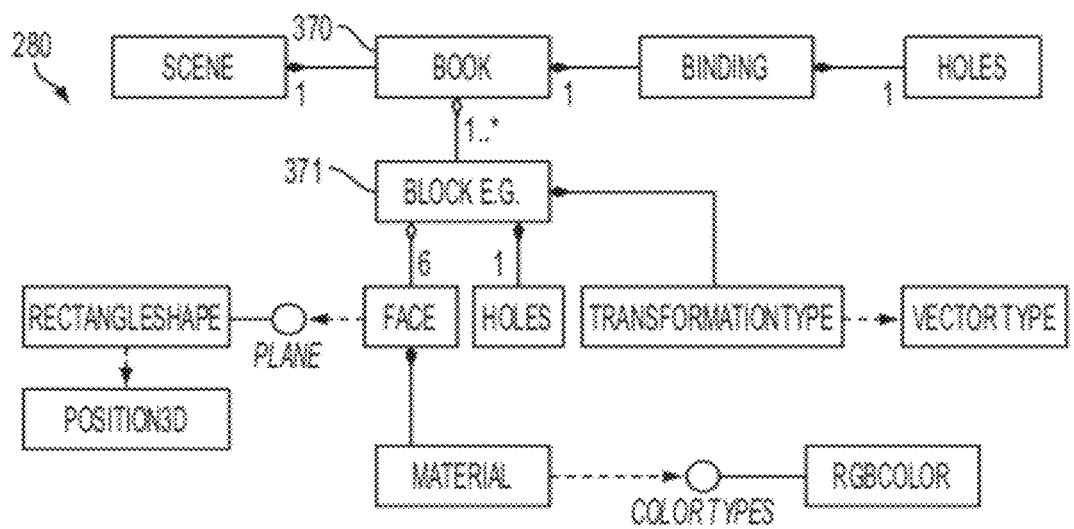
FIG. 9 depicts an exemplary display model representation of a print job.

FIG. 2 illustrates a document production visualization system 200 that can be implemented in accordance with one embodiment and an associated architecture. As will be understood by those skilled in art, and in accordance with an alternate embodiment, system 200 may also be linked to another system (not shown) that validates and/or modifies a print job product definition 210 based on the production capabilities of a particular target print shop, particularly the equipment and capabilities of equipment in such a shop. The document production visualization system 200 generally consists of four architectural layers 220, 230, 240 and 250, which are organized and managed by a controller 260. The job ticket adaptation layer 220 is designed to read a product definition 210 and convert it into to a physical model 270 that describes the static nature of the print job to be rendered. More specifically, layer 220 enables importing job tickets expressed in a job description format via methods in the controller that call an XSL transform and use a data-binding parser to load the physical model into memory. The physical model 270 is then transformed into a display model 280 within the physical model layer 230 by utilizing combinations of extensible stylesheet language transformations (XSLT), JAVA™, JAVA Script™, a multi-paradigm, object-oriented programming language such as C# (e.g., Microsoft .NET framework), servlets and similar programming techniques and use a data-binding parser to load the physical model into memory. An exemplary representation of a display model 280 can be seen in FIG. 9.

A display model layer 240 then transforms the display model 280 into a scene 290 that, when transformed by rendering layer 250, can be displayed on a graphical user interface (GUI) 150 as a 3D display rendering 166 for viewing by the user via display 160. The rendering layer adapts to a given rendering package (e.g., Java3D, in one embodiment), and may be implemented as a set of extensions of display model layer classes and other classes, as needed. The user may then manipulate the perspective of the displayed 3D rendering 166 through use of user gestures to zoom, pan, rotate, turn pages, etc. The display model layer 240 also responds to requests from the rendering layer 250 to update spatial relationships in response to user gestures. The system 200 can be configured to support a bi-directional flow of information such that the user may also alter attributes of the 3D rendering 166 as desired changes to the print job, and such changes then fed backwards through the system in order to produce an updated product definition 210 that may be stored in memory and/or passed on to the printer.

In one embodiment the document production visualization (DPV) system is comprised of four architectural layers, a controller, and various utility and graphical user interface (GUI) software modules. The system may be partitioned into a plurality of modules and third-party components. Each of the modules may be organized as a project of an integrated development environment, such as NetBeans integrated development environment project (e.g., www.netbeans.org), Eclipse IDE, and VisualStudio. The controller organizes and manages the architectural layers, to present the virtual job artifacts and to respond to user gestures. The architecture, however, is generally made up of the layers and controller.

The physical model is designed to convey all of the physical aspects of a job that the document production visualization system 200 needs and/or can understand, to enable visualization of the job. The physical model avoids binding the document production visualization system too closely to any specific job specification language or format, and as such thereby enables the document production visualization system to be adapted (via an implementation of the job ticket adaptation layer) to any desired job specification language or format. The physical model, per se, may be a data structure. Thus, there are other software modules which provide the behavior to extract page images from PDF files, to construct 3D models of bindings, and to manage the display model 280.

The display model 280 is a representation of a job, using abstractions that represent various artifacts produced by the job in a form that is independent of the particular rendering package used. The display model was also created in order to avoid binding the document production visualization system too closely to a specific rendering package, and as such enables the document production visualization system 200 to be adapted (via the rendering layer 250) to any desired rendering package. The display model, per se, may be implemented largely as a data structure. Thus, there are also other software modules which provide the behavior required to drive the rendering layer.

The rendering layer 250 adapts the document production visualization system to a given rendering package (e.g., Java3D™, in one implementation). The rendering layer is implemented as a set of extensions of display model layer 240 classes and other classes, as needed.

Due to the modularity of the architecture for the document production visualization system 200, a range of implementations can be achieved, from integrating all of the architectural layers into a single stand-alone application, to splitting the layers (e.g., job ticket adaption layer 220, physical model layer 230, display model layer 240 and rendering layer 250) across computational platforms to achieve a client-server application. The client-server implementation may be any of a number of possible configurations, for example a client, where only the 3D rendering occurs on the client, or as a thick client, wherein the user gestures and display state are also managed on the client. Also contemplated is a super-thin client where, for example, Flash or Java is employed to serve up renderings of the objects in the visualization. In the alternative, a super-thick client may be employed, possibly even as a stand-alone application noted herein. From the various alternatives suggested it will be appreciated that in a client-server configuration, various segmentations of functionality between the client and server may be used to implement the document production visualization system.

Figure 8:
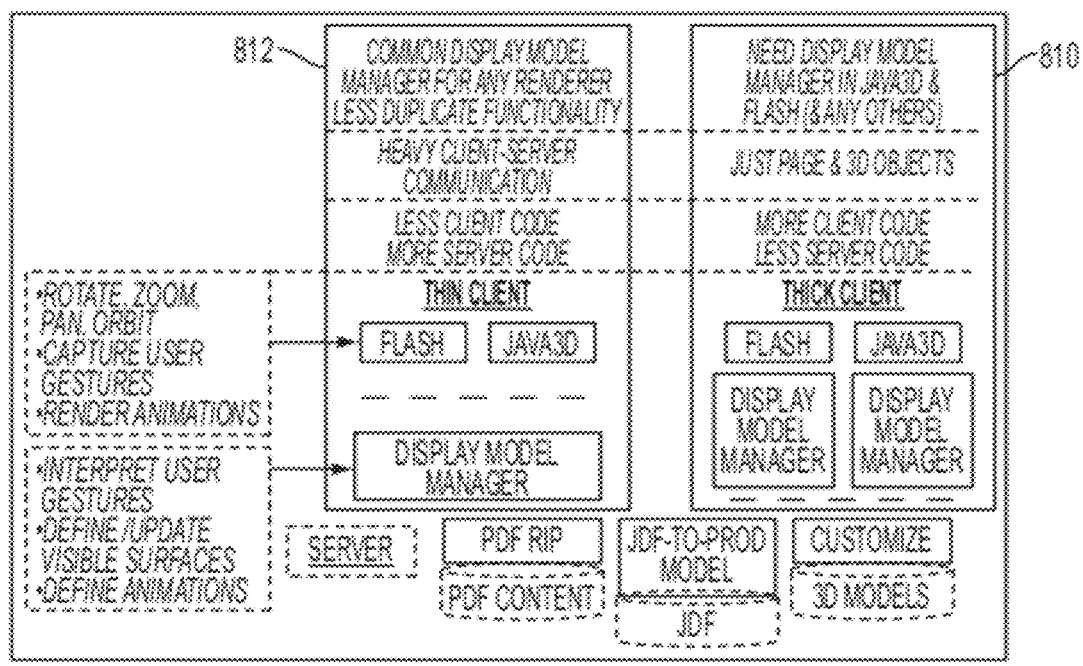
FIG. 8 is a general depiction of two exemplary client-server embodiments for virtual rendering of a print production piece.

As a further example, because of the modularity of the disclosed architecture, a range of implementations are possible in what may be referred to as a split pipeline approach. All the layers/functions described above can be integrated into a single stand-alone application. The client-server split supports different divisions of functionality between the client and server. Referring briefly to FIG. 8, two possible client-server implementations are contrasted. One embodiment (rightmost) uses a "thick-client' 810 implementation where much of the processing is handled by the client. Another embodiment (leftmost) may utilize a 'thin' client 812 which may employ a common 'display model manger' on the server, and only the 3D rendering on the client. The thin client implementation has the advantage of using common display model code for different graphics rending engines, but requires communications of all user gestures from the client back to the server. The 'thick' client ties 'display model manager' much closer to the 3D rendering on the client. This has the advantage of having all the user gestures, and display state managed on the client, but requires more code re-write or duplication for each type of rendering engine supported.

Figure 3:
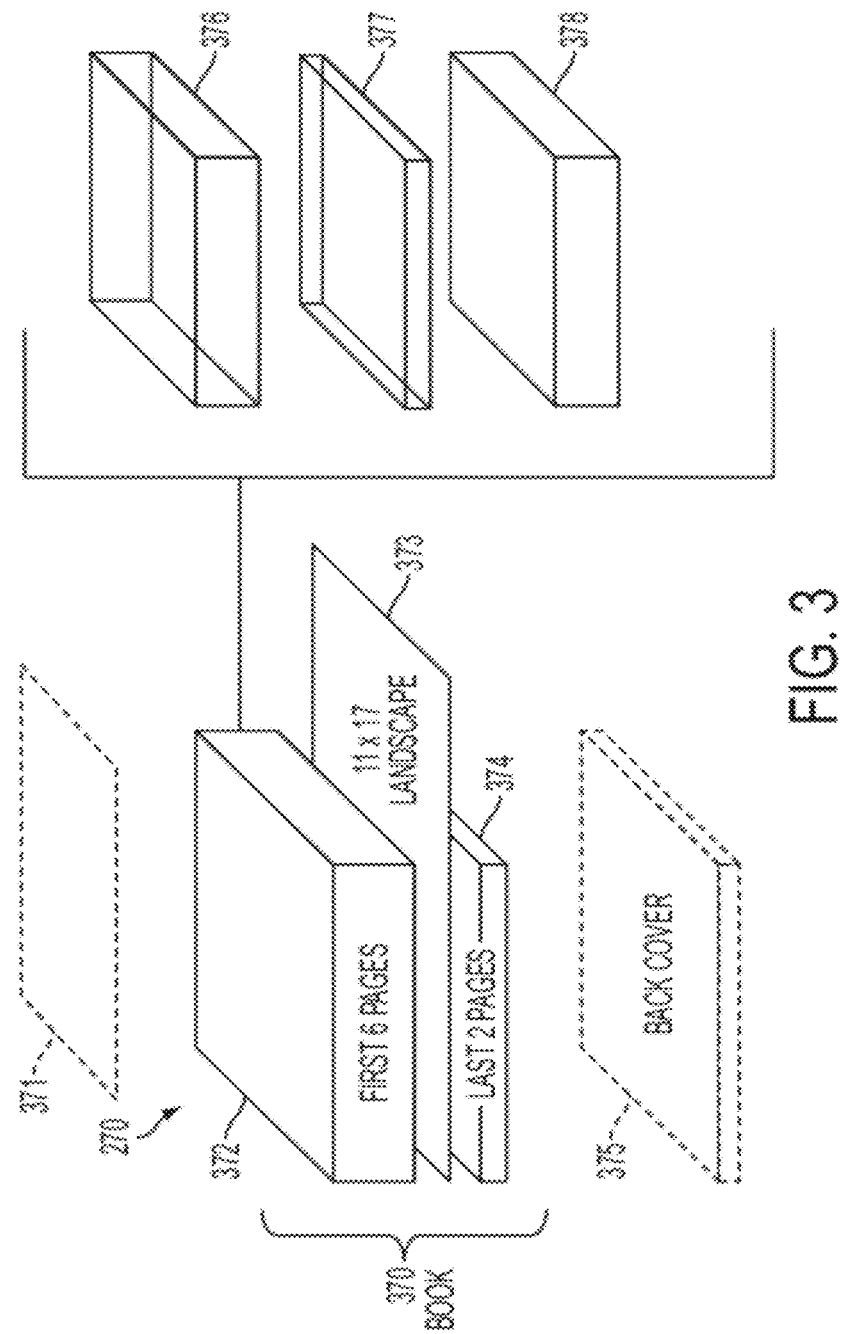
FIG. 3 illustrates a physical model as represented by physical model blocks, which in turn are represented by display model blocks.

Referring next to FIGS. 2 and 3, within the document production visualization system 200 there is a data construct roughly equivalent to the "Section Name" from Adobe™ Acrobat™, or the "Input Resource Component" from the job definition format (JDF). This data construct is the notion of a "block" (e.g., 372) within the physical model data structure. Illustrated in FIG. 3 is a physical model 270 represented by physical model blocks (PM blocks) as used in the makeup of a scene 290. The physical model blocks represent, in the illustrated scene, a set of adjoining sheets of the same media with the same orientation. Thus one can trace this construct all the way back to the original page description file (PDF), where the media type (size, orientation, etc.) was defined for any particular set of pages, and to the creation of the job definition format (JDF) where more media attributes (color, finish, thickness, etc. . . . ) could be defined. The example document shown in FIG. 3 is a book, but other print pieces may be also be represented by the system 200 using a physical model 270. The example depicted here in FIG. 3 is comprised of: pages 1-6 that are provided in 8.5"×11" portrait mode; page 7 which is provided in 11"×17" landscape mode; and, pages 8-9 which are provided once again in 8.5"×11" portrait mode. Thus, the book is represented by various physical model blocks, including in the depicted example: an optional cover block 371 8.5"×11" pages blocks 372 and 374; an 11"×17" landscape block 373; and an optional back cover block 375. These mixed page sizes will have the effect of creating different "Pages Sections" within the Adobe™ job definition format (JDF), and different "Blocks" within the document production visualization system. Although the media change here is page size and page orientation, any change in media should typically result in different page sections and blocks.

1.2 Physical Model & Display Model Relationship

Each physical model block is then mapped to at least three display model blocks 376, 377 and 378 (depending on the status of the block: opened, closed, and turning) or more as needed. The display model blocks 376-378 being six sided objects (front, back, left, right, top, and bottom) are be displayed by the rendering layer 250 in a scene 290 with the visibility of each block determined based upon its presence on the right, left, or turning collections of blocks. These three display model blocks for each physical model block are necessarily associated with the three physical positions needed for 3D display of a set of pages: e.g. stack on right, stack on left, or rotating/turning.

The left model blocks 376, by default, have the same dimensions as the media but do not have a defined thickness until they are made visible. Thus, display model block 376 is not created until it is needed. The rotating display model block 377, by default, has the same dimensions as the media, and a height of one sheet. However in other scenarios, the rotating block can also be a collection of blocks of different sizes. So for example, suppose a user selects to go straight from the front to the next to last page in the document. Then it would be necessary to turn all the 8.5×11 blocks, and all the 11×17 blocks, and some of the remaining 8.5×11 pages to conform to the animation of turning a number of pages at once. This display model block 377 is created only for animation. The right display model block 378 by default has the same dimensions as the media and is initially visible. When the book is opened to the right display model block 378 the showing face data is fetched and made visible. The side faces are almost always visible. The height for the right display model block 378 is calculated by multiplying the page count times media thickness for each block on the right, and then summing them for a total thickness.

It is recognized that the similar attributes can be assigned for documents bound on any edge or any corner. The display model blocks 376 can be assigned different physical attributes of the final book such as dimensions, face material, texture, media stiffness, etc. Display model blocks can be assigned different face materials. Material or textures that are defined and will be assigned as front image or back image because these faces are rendered at all times and thus need to be fetched and displayed.

Figure 4:
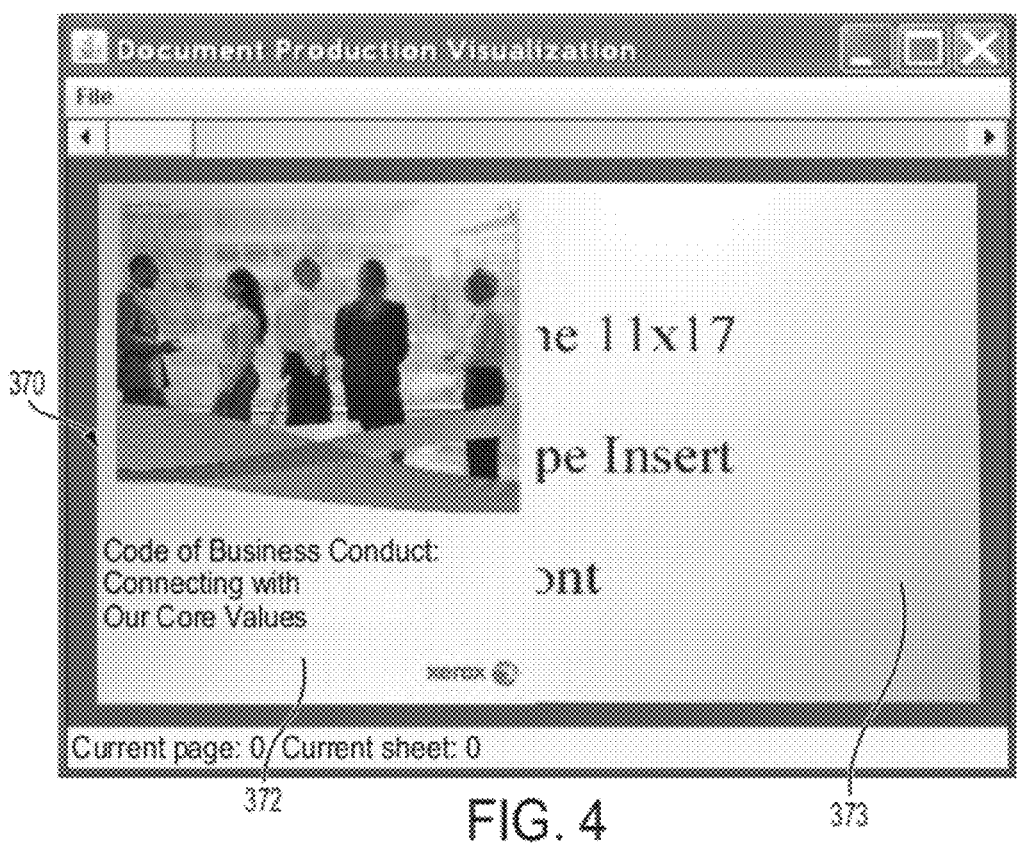
FIG. 4 depicts a multi-block book, closed, and viewed from the front.

FIG. 4 is an exemplary screen shot from a workstation or similar display and provides a depiction of the 3-block book 370, closed, viewed isometrically from the front or facing the top of the book. The initial position (e.g. viewed from front) and state (e.g. closed) of the book is shown. In this case only the first two physical model blocks are visible: top block 372 the first six 8.5×11 portrait pages; and the right-most part of the 11×17 landscape block 373 page which is not obscured by the six pages of top block 372 on top of or in front of it. The last bock 374 is obscured in this view.

Figure 5:
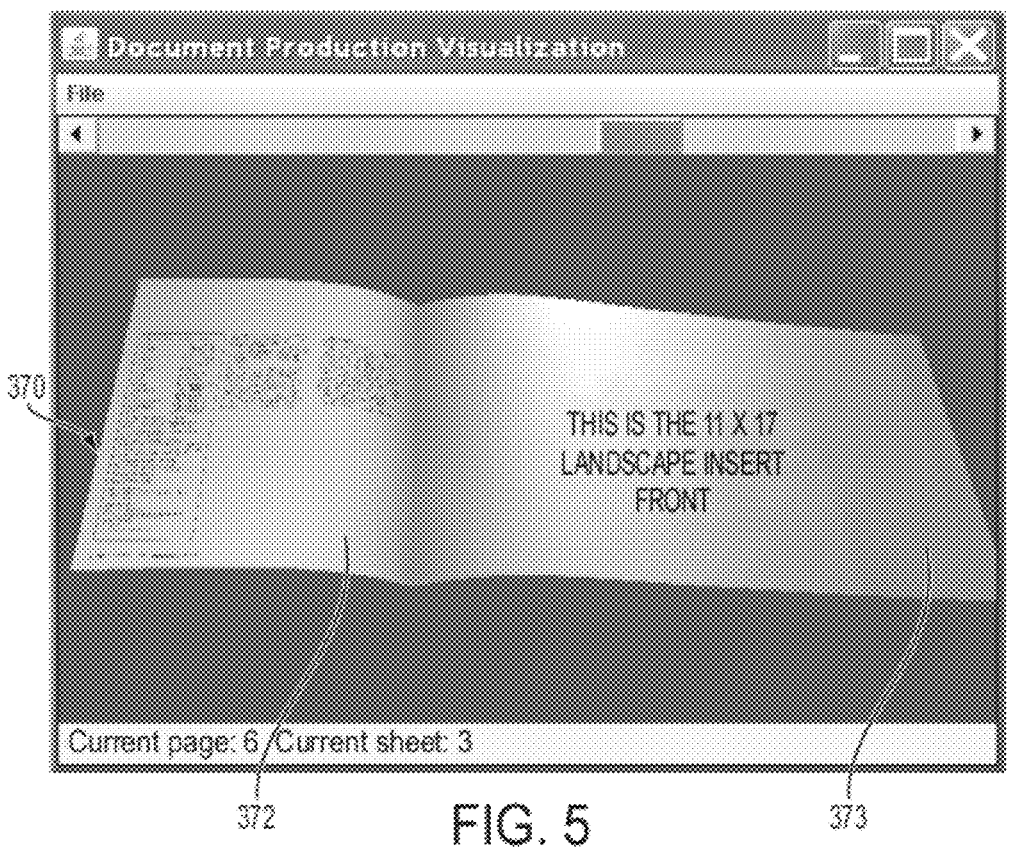
FIG. 5 shows, in a 3D rendering, the book of FIG. 4 much as a user would find it exhibited, but opened to a boundary between blocks.

The view of the book 370 can then be updated by turning to page 7, and slightly changing the viewing angle as shown by the example depicted in FIG. 5. The scene of FIG. 5 shows in a 3D rendering much as a user would find the book exhibited. More specifically, the multi-block book of FIG. 3 opened to a boundary between the top block 372 and middle block 373. In this scene the back (left display model 376) of the physical model block 372 (page 6, back) and the front of the middle physical model block 373 (page 7, front) are visible. The remaining physical model block depictions are still not visible (although they do have a representation within the display model block data structure) because they are obscured by the larger page 373 in front. The only part of the following pages that could be visible from this view is the bottom edge. However, there are so few pages as to make perceiving this part of the remaining physical model block depictions difficult and of little value. In one embodiment the user can, if needed, zoom in on the bottom edge to see these thin blocks.

Figure 6:
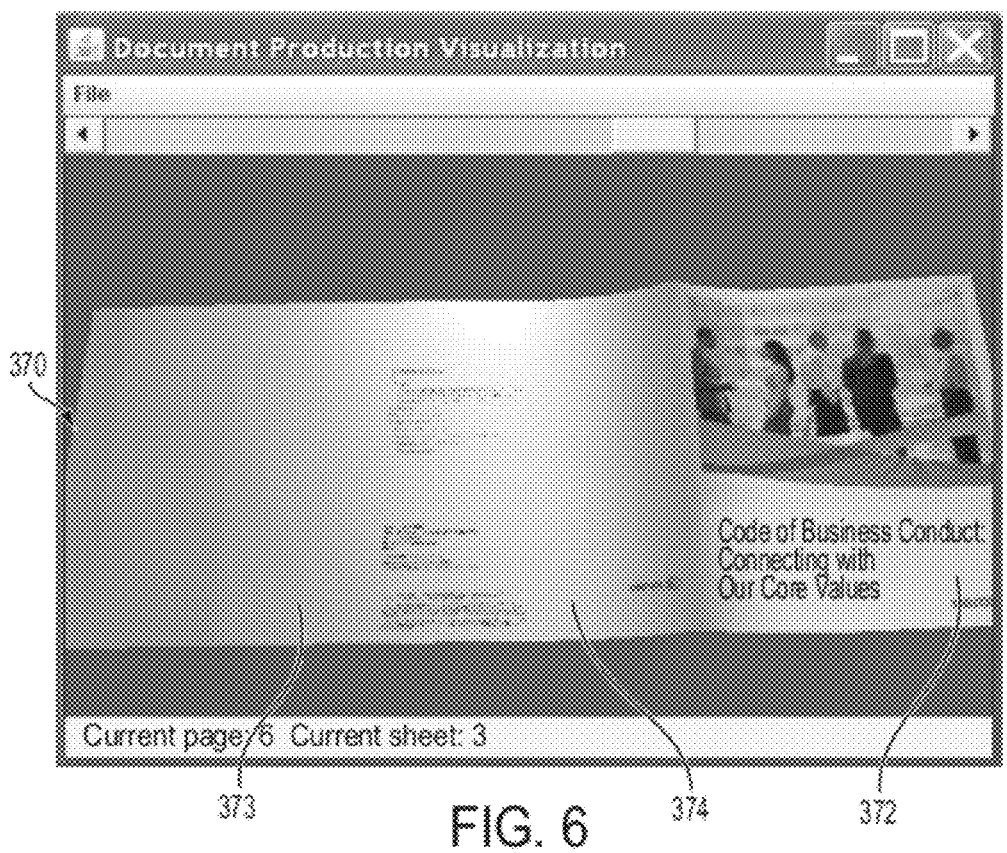
FIG. 6 depicts a scene in the same state of the book as shown in FIG. 5 but viewed from an alternative perspective.

Considering, now, the same state of the book (e.g. open to page 7), but viewed from behind, the scene appears as depicted in the display window of FIG. 6. In this scene a user can now see the back of the last physical model block (the back pages on 8.5×11 sheets, block 374) which partially covers the depicted back of the middle physical model block (the 11×17 landscape sheet block 373). While not shown here, a page turning operation (as initiated by user gestures on an interface or within the window) creates blocks 377 which are only visible during the animation sequence. They then lay on top of the left or right block as appropriate, where they briefly obscure the underlying block(s), then become invisible as the right and left blocks are updated appropriately.

1.3 System Operation

Figure 7:
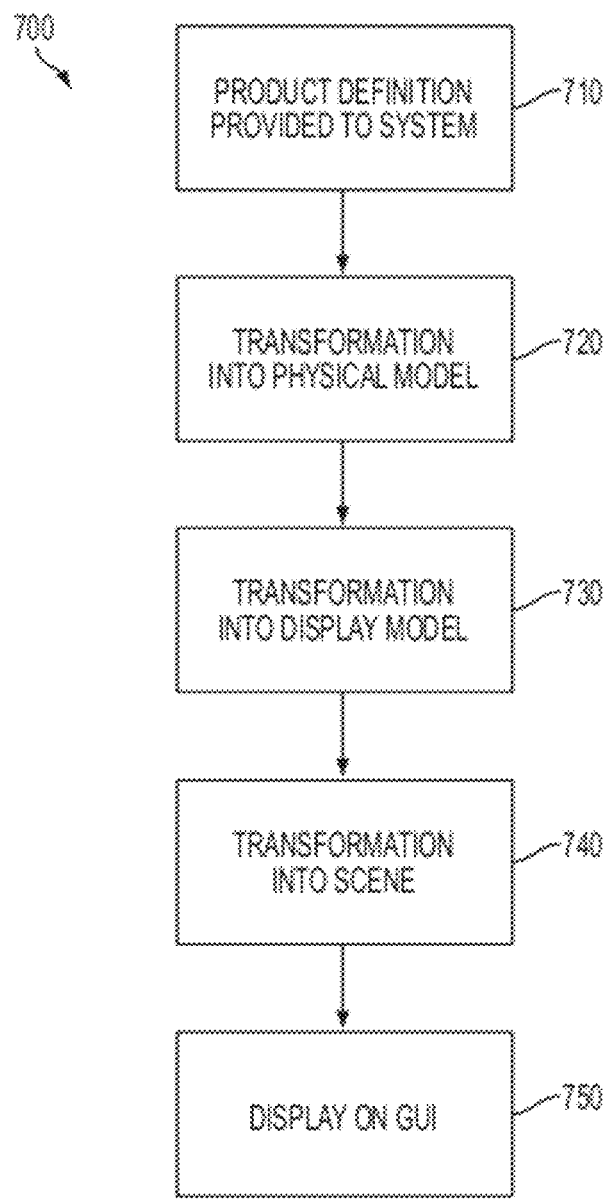
FIG. 7 is a flow chart illustrating logical operational steps for a method of generating a 3D virtual rendering of a print job using a document production visualization system disclosed herein.

Illustrated in FIG. 7 is a detailed flow chart of several operations illustrating logical operational steps of a method 700 for generating a 3D virtual rendering of a proposed print job using the document production visualization system 200 depicted in FIG. 2. As will be understood by one skilled in the art, the method 700 can be implemented in the context of a computer-usable and/or readable storage medium (i.e., fixed in a non-transitory state for some period of time) that contains a program or software application. A user provides a printing job 105 as a well defined product definition 210 to the system 200, as indicated in step 710. The job ticket adaptation layer 220 allows for the product definition 210 to be provided as job definition format (JDF) or as any other descriptive job ticket or template without having to make changes, alterations, additions or modifications to other parts of the system. As represented by step 720, a job ticket adaptation layer 220 transforms the provided product description 210 into a physical model 270 utilizing any appropriate data transformation methodology such as extensible stylesheet language transformations (XSLT). The transformation resolves the product description 210 into artifacts that are then utilized to create a description of the physical attributes of the desired product piece (i.e. the physical model 270).

As represented by step 730 of FIG. 7, the physical model layer 230 transforms the physical model 270 into a display model 280. The display model 280 is then transformed by the display model layer 240 into a scene 290 containing information regarding elements in the scene 290 and their spatial relationships, as indicated by step 740. The scene 290 can then be displayed on a graphical user interface (GUI) 150, indicated by step 750, by utilizing the rendering layer 250 that transforms the display model into operations on a graphic library. The separation of the display model from the rendering of a scene allows for different rendering engines (e.g. JAVA3D™, FLASH®, Google™/O3D, HTML-5, etc.) to be connected and employed as required without the need to make any changes, alterations, additions or modifications to other parts of the system. The rendering layer 250 is responsible for maintaining the state of the display model to accurately reflect what is being displayed at a particular moment. The rendering layer 250 is also capable of receiving user gestures that manipulate the objects in the scene 290 and sending requests to the display layer 240 to change the objects or spatial relationships within the scene 290.

Shown below is one exemplary embodiment of a data structure for a finished document. In this example there is the high level 'scene', within which there is one 'book' The 'book' contains a black coil binding, and four 'blocks'. The first 'block' is a single sheet, constituting the clear transparent cover. The second block is a single light yellow sheet constituting the title page. The third and fourth blocks are white paper, but with different dimensions. Finally, there is a list of the holes required to hold the pages within the coil binding.

```xml
<?xml version="1.0" encoding="UTF-8"?>
<pm:scene xmlns:pm="http://www.xerox.com/dpv/physicalModel"
xmlns:C="http://www.collada.org/2005/11/COLLADASchema"
xmlns:jdfs="http://www.CIP4.org/JDFSchema_1_1"
xmlns="http://www.xerox.com/dpv/physicalModel"
xmlns:xsi="http://www.w3.org/2001/XMLSchema-instance"
xsi:schemaLocation="http://www.xerox.com/dpv/physicalModel
physicalModel.xsd">
    <pm:book>
        <!--WNYIP2008_TransCoverCoil-->
        <pm:binding xsi:type="coilBinding">
            <pm:edge>Left</pm:edge>
            <pm:color xsi:type="rgbColorType" name="Black">
                <pm:red>0</pm:red>
                <pm:green>0</pm:green>
                <pm:blue>0</pm:blue>
            </pm:color>
            <pm:offset>inch:0</pm:offset>
            <pm:bend>inch:0</pm:bend>
            <pm:blockid="ID20090230" ReaderPageCount="1"
sheetCount="1" sides="TwoSidedHeadToHead"
ProductType="Transparency">
            <!--Cover-Clear Transparency-->
            <pm:media>
                <pm:surface>
                    <pm:type>transparency</pm:type>
                    <pm:color xsi:type="rgbColorType"
 name="LightGray">
                </pm:surface>
            </pm:media>
            <pm:width>inch:8.5</pm:width>
            <pm:height>inch:11</pm:height>
            <pm:thickness>inch:0.0047244</pm:thickness>
        </pm:block>
        <pm:blockid="ID20090263" ReaderPageCount="1"
sheetCount="1" sides="TwoSidedHeadToHead"
ProductType="Body">
            <!--Cover-Title Page-->
            <pm:media>
                <pm:surface>
                    <pm:type>paper</pm:type>
                    <pm:color xsi:type="rgbColorType"
 name="LightYellow">
                </pm:surface>
                <pm:width>inch:8.5</pm:width>
                <pm:height>inch:11</pm:height>
                <pm:thickness>inch:0.0047244</pm:thickness>
            </pm:media>
            <pm:width>inch:8.5</pm:width>
            <pm:height>inch:11</pm:height>
            <pm:thickness>inch:0.00472440944</pm:thickness>
        </pm:block>
        <pm:block id="ID20090115" ReaderPageCount="11"
sheetCount="6" sides="TwoSidedHeadToHead"
ProductType="Body">
            <!--Page Section-->
            <pm:media>
                <pm:surface>
                    <pm:type>paper</pm:type>
                    <pm:color xsi:type="rgbColorType"
 name="White">
                </pm:surface>
                <pm:width>inch:8.5</pm:width>
                <pm:height>inch:11</pm:height>
                <pm:thickness>inch:0.0047244</pm:thickness>
            </pm:media>
            <pm:width>inch:8.5</pm:width>
            <pm:height>inch:11</pm:height>
            <pm:thickness>inch:0.028346456</pm:thickness>
        </pm:block>
        <pm:block id="ID20090122" ReaderPageCount="5"
sheetCount="3" sides="TwoSidedHeadToHead"
ProductType="Body">
            <!--Page Section-->
            <pm:media>
                <pm:surface>
                    <pm:type>paper</pm:type>
                    <pm:color xsi:type="rgbColorType"
 name="White">
                </pm:surface>
                <pm:width>inch:8.263888888</pm:width>
```

```
            <pm:height>inch:11.6944444</pm:height>
            <pm:thickness>inch:0.0047244</pm:thickness>
        </pm:media>
        <pm:width>inch:8.2638888888888</pm:width>
        <pm:height>inch:11.694444444444</pm:height>
        <pm:thickness>inch:0.014173228</pm:thickness>
    </pm:block>
    <pm:Holes>
        <pm:Shape>Round</pm:Shape>
        <pm:ShapeX>0.17</pm:ShapeX>
        <pm:ShapeY>0.17</pm:ShapeY>
        <pm:Position>0.25 -5.666667</pm:Position>
        <pm:Position>0.25 -5.333333</pm:Position>
        <pm:Position>0.25 -5</pm:Position>
        <pm:Position>0.25 -4.666667</pm:Position>
        <pm:Position>0.25 -4.333333</pm:Position>
        <pm:Position>0.25 -4</pm:Position>
        <pm:Position>0.25 -3.666667</pm:Position>
        <pm:Position>0.25 -3.333333</pm:Position>
        ...
    </pm:Holes>
    </pm:book>
</pm:scene>
...
```

1.4 System Example

In one embodiment, the document production visualization (DPV) systems and methods disclosed herein may be employed to move from a portable document format (PDF), to a job definition format (JDF), and then into data structures for a DPV system. The following description will briefly describe an example of how a PDF is converted to JDF, how JDFs are modified and examined and then the transformation of data structures from JDF to the physical model and display model data structures. In the various examples set forth below for the DPV, the examples started as PDF files. These PDF files were used as the basis for creating JDF files using Adobe Acrobat Pro. In some cases the JDF files were then modified using the JDF Editor V2.1.3.50 from CIP4, or on some occasions the XML was hand edited. For example, the Adobe Acrobat software, using a "Create New Job Definition" dialog window may be used to create/edit a JDF file.

Figure 10:
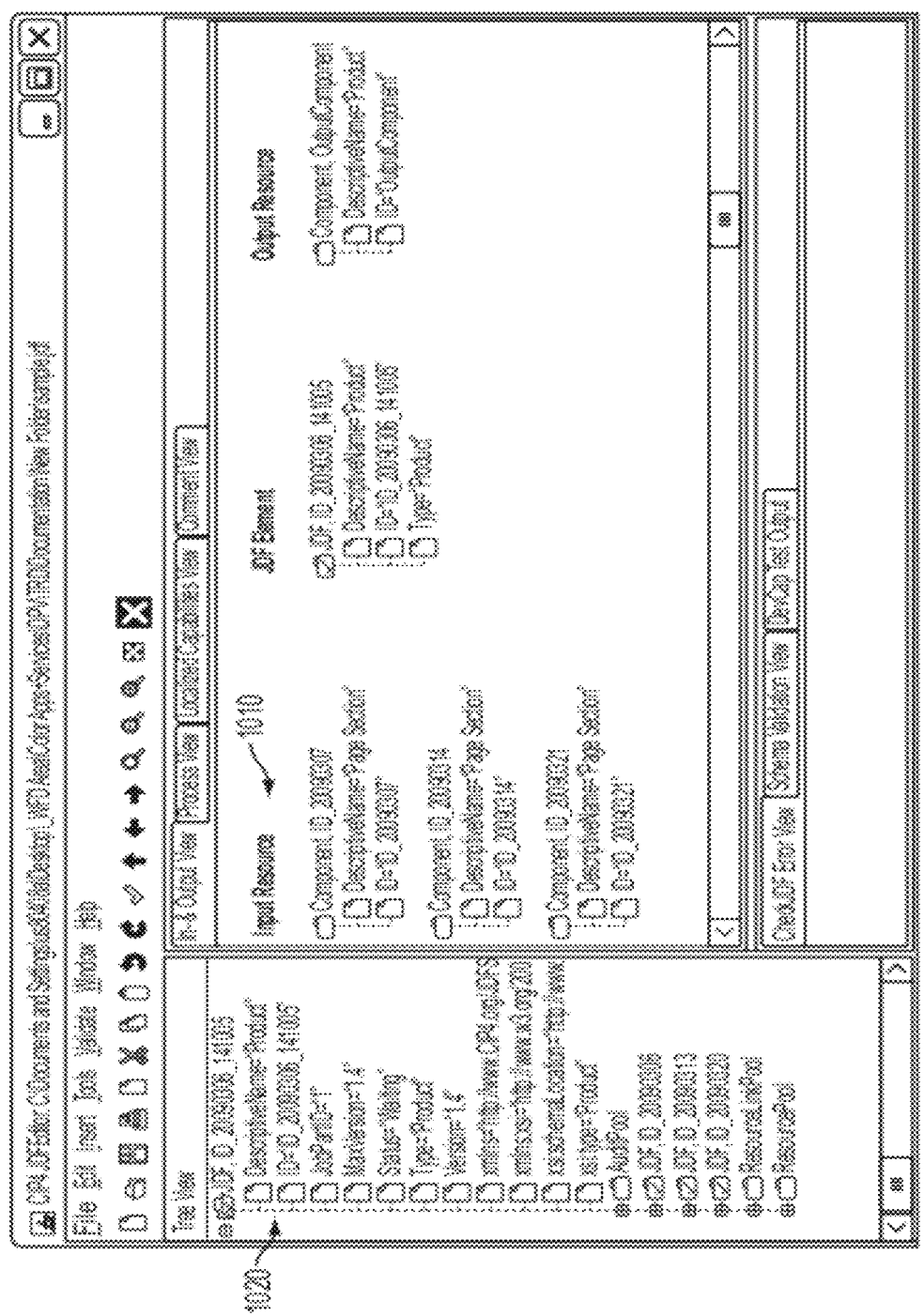
FIG. 10 is a window providing an exemplary view of the a JDF Editor in use to view the content of a file.

Once created, the JDF can be examined with a JDF Editor. Upon opening the JDF with, for example, a CIP4 editor, the information is displayed as illustrated in the example of FIG. 10. FIG. 10 provides an exemplary view of the CIP4 JDF Editor in use to view the content of a JDF file. Three different "Page Sections" from the Adobe Acrobat tool are referenced as three different "Input Resource Components" in region 1010. The first Input Resource component corresponds to pages 1-6 of the original PDF, which was the first "Page Section" in Adobe Acrobat. Notice that the DescriptiveName="Page Section" has been preserved. A similar examination of the next two Input Resource components shows similar information, and selecting the corresponding element in the tree view section 1020 would allow examination of specifics relative to such components (e.g., color intent, layout intent, runlist, layout elements, etc.). JDF represents the three input "Page Sections" as components in the "Resource Pool". The corresponding XML representation is:

```
<ResourcePool>
    <Component ID="OutputComponent" Class="Quantity"
    Status="Unavailable" ComponentType="FinalProduct"
    DescriptiveName="Product"/>
    <ComponentID="ID20090307"Class="Quantity"
    Status="Unavailable"ProductType="Body"
    ComponentType="PartialProduct"DescriptiveName="Page
    Section"ReaderPageCount="6">
    <Component ID="ID_20090314" Class="Quantity"
    Status="Unavailable" ProductType="Body"
    ComponentType="PartialProduct" DescriptiveName="Page
    Section" ReaderPageCount="1"/>
    <Component ID="ID_20090321" Class="Quantity"
    Status="Unavailable" ProductType="Body"
    ComponentType="PartialProduct" DescriptiveName="Page
    Section" ReaderPageCount="2"/>
</ResourcePool>
```

Information under Component ID="ID__20090307 is the reference to the first six pages of the PDF. There is also a 'DescriptiveName=PageSection', which could have been modified in the Adobe JDF Editor tool. In particular, the first component is:

```
<JDF ID="ID_20090306" Type="Product" Status="Waiting"
xsi:type="Product" JobPartID="1.1" DescriptiveName="Page Section">
<ResourceLinkPool>
    <ComponentLink rRef="ID_20090307" Usage="Output"/>
    <ArtDeliveryIntentLink rRef="ID_20090308" Usage="Input"/>
    <LayoutIntentLink rRef="ID_20090311" Usage="Input"/>
    <ColorIntentLink rRef="ID_20090312" Usage="Input"/>
</ResourceLinkPool>
<ResourcePool>
    <ArtDeliveryIntent ID="ID_20090308" Class="Intent"
    rRefs="ID_20090310" Status="Available">
        <ArtDelivery ArtDeliveryType="DigitalFile">
        <RunListRef rRef="ID_20090310"/>
        </ArtDelivery>
    </ArtDeliveryIntent>
    <RunList ID="ID_20090310" Class="Parameter" Pages="0~5"
    Status="Available">
        <LayoutElement>
        <FileSpec URL="Case%2D2.pdf"/>
        </LayoutElement>
    </RunList>
        <LayoutIntent ID="ID_20090311" Class="Intent"
        Status="Available">
        <FinishedDimensions DataType="ShapeSpan"
        Preferred="612 7920"/>
    </LayoutIntent>
    <ColorIntent ID="ID_20090312" Class="Intent"
    Status="Available">
        <ColorStandard DataType="NameSpan"
        Preferred="CMYK"/>
        <ColorsUsed/>
    </ColorIntent>
</ResourcePool>
</JDF>
```

This first component can again be recognized as the first "Page Section" from Adobe Acrobat, or the "Input Resource Component" from the JDF editor, or the first six 8.5×11 pages from the original PDF document. The underlined text above indicates the page range (JDF counts from 0, whereas PDF counts from 1), the source PDF, and the finished dimensions. All three of these data fields are used by the DPV system. Within the DPV system there is a data construct roughly equivalent to the "Section Name" from Adobe Acrobat, or the "Input Resource Component" from the JDF editor, or the Component from the JDF XML; this is the notion of a "Block" within the PM data structure, which was described earlier in Sections 1.1 and 1.2 above.

2.0 Bound Document Models & Binding Objects

A physical model (or PM for Physical Product Model) block represents a set of adjoining sheets of the same media, as depicted, for example, in FIG. 3 (left side). In other words, one can trace this construct all the way back to the original PDF, where the media type (size, orientation) was defined for any particular set of pages, and to the creation of the JDF where more media attributes (color, finish, thickness, plex, etc. . . . ) could be defined.

A display block (or DM for Display Model) is a six sided object to be displayed, and forms the basic "building block" in relation to the DPV system. A physical model block is generally mapped to up to three display model blocks (depending on the status of the block; for example, opened, closed, and turning). Blocks can be assigned different faces, materials or textures that are defined and will be assigned as front image or back image because these faces are rendered at all times and thus need to be fetched and displayed. Thus, each PM block would have corresponding DM data elements shown in FIG. 3 (right side).

Briefly referring to FIG. 3 once again, display model data elements or blocks 376, 377 and 378 are illustrated for a single physical model block 372 of book or bound document 370. All the display model blocks in the system are part of the scene graph. In this way the graphics rendering engine determines what part of what block is visible at any given time. For the example discussed this results in the renderings shown in the windows of FIGS. 4-6 (top, opened and back views, respectively). More specifically, block 376 represents the left block by default and has the same dimensions as the media but doesn't have a height. This is not created until it is needed. Block 377 represents the rotating model block by default and has the same dimensions as the media and a height of one sheet. This is created only for animation. Lastly, block 378 represents a right block by default and also has the same dimensions as the media. Block 378 is initially visible. When the document or book is opened to the block the showing faces are visible. The side faces are always visible, and the height is calculated by multiplying page count by the media thickness. While not specifically illustrated, it will be appreciated from the discussion of element 377, a page turn creates blocks which are only visible during the animation (e.g., turning) sequence. Subsequent to the page turn the left or right blocks are laid on top of the turned page, where they obscure the underlying block, update the thickness and surface images, and the turning blocks become invisible.

As will be further appreciated from the example described above, the document production visualization system is also able to illustrate or simulate the appearance of various binding means and mechanisms that may be applied to the documents that are being visualized.

3.0 3D Binding Objects in the System

Having described the general nature of the document product visualization system 200 (e.g., FIG. 2) and associated architecture (e.g., FIGS. 2-3), the following disclosure is directed to further aspects and alternative embodiments that may be included with the disclosed system to enable the rendering of display model items.

One difficulty with systems which support a 3D virtual rendering of a finished document is the multitude of different binding types (e.g. coil, comb-wire, comb-plastic, ring, clip, staples, etc) which come in different sizes (length & diameter), pitch, color, etc. The 3D rendering system may need access to several thousand different 3D models depending upon the specifics of a particular shop configuration. Aspects of the system and methods described herein provide for the efficient storage and subsequent presentation of realistic 3D models for a number of binding types with a large assortment of customization attributes.

In one embodiment, there are generally two operations involved in the creation of the necessary 3D objects:
1) The offline design and preparation of a base element; and
2) The runtime manipulation or customization of the base element into the desired final object.

Considering the example embodiment of a coil object, there are base objects created for coil bindings of pitch 2.5, 3.0, 4.0 and 5.0 coils/inch. These values were chosen by exploring what coil bindings are generally available today, and it will be recognized that alternative pitches may be used. The real time manipulation of the base element into the desired final object entails manipulation of a base object and assembly into a final element. Such real-time manipulation allows for choice of diameter, color, and length of the final 3D coil bind object and permits the rapid alteration thereof via input from a user interface (e.g., change color). In order to have some control over the size of the base model repository, one embodiment limits these variables to an enumerated set, although it is conceivable that one or more variables may be entirely user-controlled. For example, the color value could be any defined RGB value. The diameter, however, was limited to commercially available sizes, whereas the length is limited to an integer number of base units for ease of the current implementation, but this is not a requirement.

For the example of a coil object, the total number of combinations is on the order of 7 (color)×14 (length)×6 (diameter)×4 (pitch)=2352. The disclosed embodiment permits the accurate rendering of all of these possible combinations using only four base models (e.g. one for each pitch). It is further contemplated that a slightly more complex model may be employed such that a single pitch model may be used and through the use of a "stretching" operation the pitch could be further varied to achieve a plurality of different or even customized pitches. Such a configuration would further reduce the storage requirements for base model data, but is also contemplated to increase the computational demand on the processor(s) in order to customize the model and render the visualization. It is further envisioned that any of the parameters may be adjusted in real time, or defined as pre-built models.

To enable rendering of 3D elements, the system employs a small base component for each type of binding along with associated meta-data, and then programmatically combines modified versions of the base element to create a new 3D object which meets the required specifications for the elements. The types of base models and the modifications which can be performed vary across the different binding types as will be described in more detail below. In one embodiment the base elements are stored in a standard format (COLLADA; open standard schema for exchanging digital assets among graphics software applications), which is XML-based but other formats could be used. To create a specific binding element, the XML data file and associated meta information are read, and the data values (polygon vertices, colors, textures, etc) are replicated and modified to create a new 3D object. This new 3D object may be a single COLLADA XML object that is delivered to the graphics rendering system for placement within the document production visualization scene.

Figure 11:
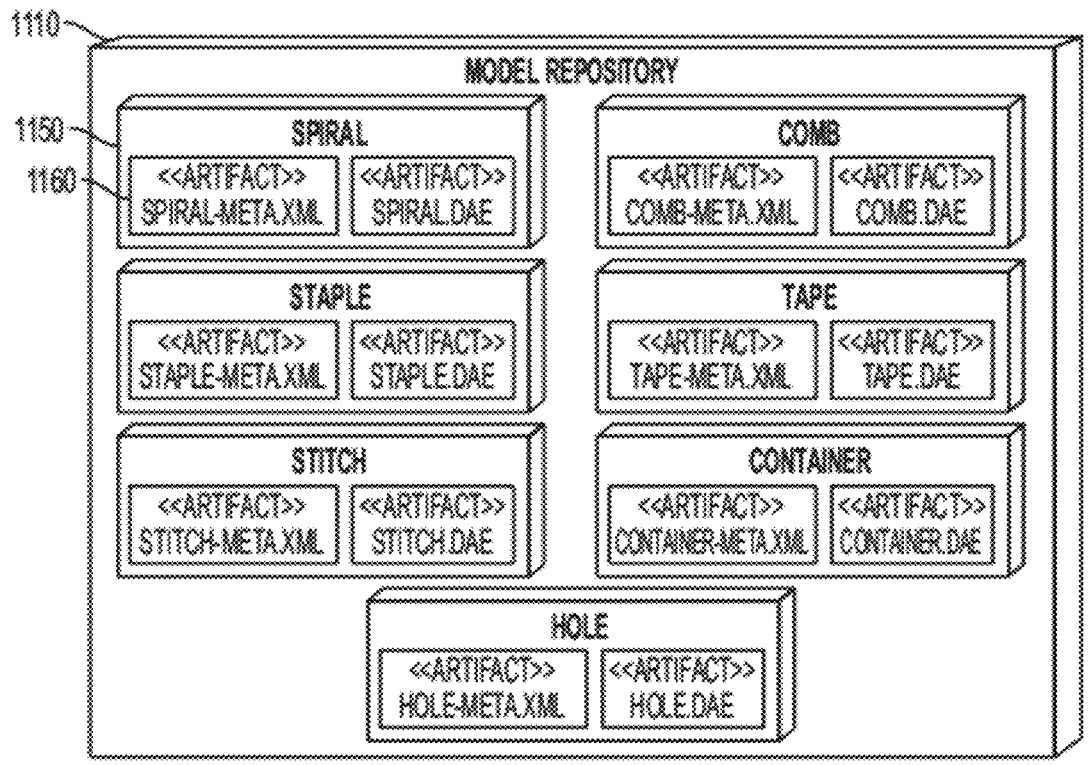
FIG. 11 is an exemplary representation of a model repository employed with the document production visualization system.
Figure 12:
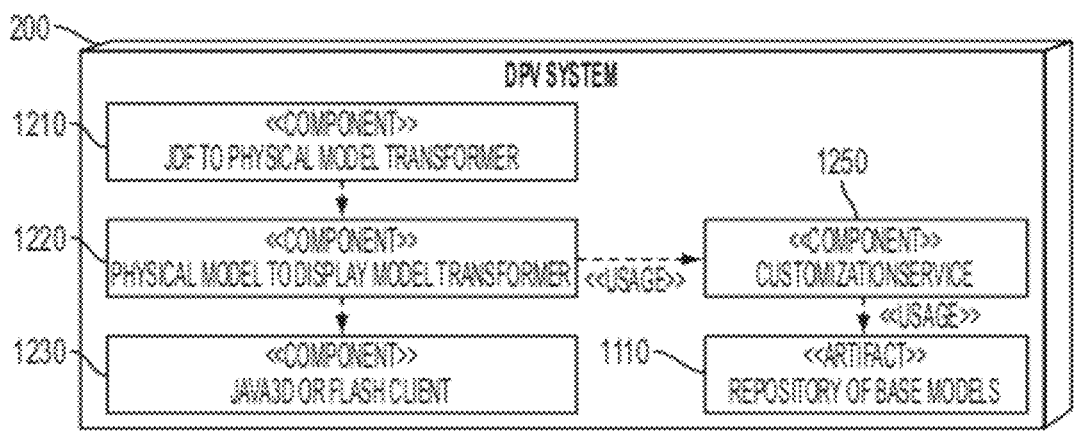
FIG. 12 is an illustrative example of the interactive relationship between several operations carried out in the document production visualization system.

The meta-data file will contain information about what properties of the 3D object can be modified, and an enumerated set of values for each of those properties. In one embodiment the creation and updating of the objects may be accomplished using standard tools such as 3dsMax, Google Sketch UP, and Blender. In one embodiment, these operations are expected to be done off-line, and used to populate a repository storing 3D binding objects, for example, the model repository 1110 illustrated in FIG. 11. Similarly, the meta-data file associated with each object will be created off-line. The end-use of the repository will be within the visualization system 200 as further represented in FIG. 12, where the DPV system 200 is depicted as including model transforms 1210, 1220, a rendering means 1230 and a customization service 1250. In the embodiment of FIG. 12, the DPV system requests an object from the CustomizationService, with certain parameters (e.g. type, color, diameter, length) for incorporation into a visualization.

3.1 Customization Service

The CustomizationService 1250 and repository 1110 will reside on a server in one embodiment, but may be part of a single application as well. One embodiment of the repository includes all objects necessary to meet the documented binding technologies and methods, but it is easily extensible to include other binding objects. An illustration of an exemplary model repository is found in FIG. 11 as noted above. The CustomizationService interface defines an application programming interface available to the system to interact with the customization module. The overloaded transform methods return customized binding objects (e.g. 2D, 3D) by transforming the requested base model object with the given property values (e.g., JDF specifications).

As will be further appreciated, an independent method or procedure may be employed to return the meta-data defined for a particular binding object for a given object type or name. A model transformer class may be used to provide support for simple transformations such as setting the color of a binding object, scaling the object in a particular axis, etc. Model specific and complex transformations can be implemented as individual classes that take care of model specific rules and conditions for the property changes. For example, a transformer to lengthen a spiral binding model will specifically define the method to modify the length of the object and may have a set of dependency transformers that will shape up the object to a specific size and shape before the main transformer can act. A meta-data schema is bound to a set of java types with a model representing the root element of the meta-data, and property representing each property declared in the meta xml and class representing each modifier/transformer declared in the meta xml.

Each model 1150 in the repository 1110 has a collection of artifacts 1160. It is required to have at least one object and the associated meta file of information about the object. As described herein, the binder requirement specification may be defined by user interaction with at least a menu provided by a graphical user interface, wherein the user not only selects the type of binding to be applied, but similarly identifies characteristics of the binding (e.g., color, size, etc.). The disclosed system needs to be able to adapt the job or binding object based upon changes to the job description, thus the controller supports the bi-directional flow of information with the graphical user interface. Moreover, the binder requirement specification is defined with values used to modify properties as provided by the meta-data in interaction with the graphical user interface menu.

As further described, the system includes a base model repository (e.g., FIG. 11) where at least a portion of each of the plurality of 3D binding elements and associated meta-data are managed by the controller. And, as noted above, the system may be implemented as a plurality of architecture layers managed and organized by the controller, including: a print job ticket adaptation layer 1210, a physical model layer 1220, and a display model layer 1230; the print job ticket adaptation layer transforming the print product definition into a physical model; the physical model layer transforming the physical model into a display model retrieving the 3D binding elements and associated meta-data from the model repository as per the binder requirement specification; and the display model layer transforming the display model into the print product display model that can be displayed as the virtual 3D rendering of the print product and binder. In one embodiment the graphical user interface receives input in the form of user gestures in interaction with the graphical user interface menu, where the input is subsequently used to modify properties provided by the model. As will be further appreciated the Document Production Visualization (DPV) system may be developed using a software tool to facilitate the creation and management of binding objects themselves as well as the database or repository of objects/elements.

Other binding model types that may employ base models in accordance with the various embodiments described herein include spiral binder, comb binder, plastic comb binder, wire comb binder, staple, stitch, tape binder, ring or container, staple, tape, glue, stitching, saddle stitching, round-head fastener, 2-prong fastener, VeloBind®, spring clips, bulldog clips, various forms of paper clips, O-rings, rings, nickel rings, D-rings, brass fasteners, etc. For purposes of clarification VeloBind® is a binding-type that involves punching several holes along the edge of an unbound document, then a strip of plastic with extending tines inserted into the holes from the top of the book, and a strip with corresponding holes is placed on the back with the tines extending through. Document is placed in a machine that clamps the document while the excess length of the tines is cut and the remaining tine tips melted to complete the bind. VeloBind® is a trademark of the General Binding Corporation. Binding models may also be employed to represent embossing, foils, special inks or stickers applied to the document. Several examples of the information that may be employed in the creation of display models for such bindings is found in the following Table 1.

TABLE 1

| | |
|---|---|
| Binding Examples | Coil, Wire Comb, Plastic Comb |
| Key Attribute | Replication of segments (with possible rotations around the Y-axis to align ends). |
| Customizable Parameters defined in meta-data | Color<br>Length<br>Diameter<br>Thickness (of plastic)<br>Pitch (# per inch) |
| Modifiers/Transformers | SimpleModelTransformer - handles transformation of color.<br>LengthTransformer - generic length modifier<br>CombModelTransformer - handles comb specific diameter of the ring, thickness. For pitch it is contemplated to load different object for a given pitch value. |
| Binding Examples | Ring Binders, Nickel rings |
| Key Attribute | Replication and Spacing of base models along a spine, with possible fill-in of spine between rings |
| Customizable Parameters defined in meta-data | Diameter<br>Color<br>Number of rings |
| Modifiers/Transformers | SimpleModelTransformer - handles transformation of color. |

TABLE 1-continued

| | |
|---|---|
| Binding Examples | Spring Clips, BullDog Clips, Paper Clips, Staples, Brass Fasteners |
| Key Attribute | Spacing between two pre-built faces with an appropriately scaled connector. |
| Customizable Parameters defined in meta-data | color<br>Size (length × width)<br>x-indents from edge<br>y-centers staple-to-staple<br>angle (how to describe corner staples?) |
| Modifiers/Transformers | SimpleModelTransformer - handles transformation of color.<br>Size Transformer - generic size transformer |
| Binding Examples | Tape, Velo, Glue |
| Key Attribute | Stretching (along Y) to match the height of the page, and the stretching of the spine to match the thickness of the document. |
| Customizable Parameters defined in meta-data | color<br>Overlap (how far over the front/back over the tape extends)<br>Spine (the thickness of the document)<br>Thickness of material |
| Modifiers/Transformers | SimpleModelTransformer - handles transformation of color.<br>SizeTransformer - thickness can be obtained by scaling through the y axis, if the tape object is assumed to be a flat cuboid and scale factor can be restricted to a few fractions.<br>LengthTransformer - generic length modifier |

3.2 Use of Base Models

The base models of the 3D binding elements may be created in a number of ways using any of a variety of 3D design software packages. It will be appreciated, however, that specific operations are applicable to the creation of base models for other 3D binding types, for example, comb bindings (wire and plastic), channel/clamp bindings and the like dependent upon the design tool being used. Although a coil binding element is referred to herein as an example, it will be appreciated that the use of base models applies to a number of binding types as more specifically set forth below.

Having established the base models by any of several possible methods, it is then possible to manipulate the base models. For example, the method described below customizes a base or unit model of coil binding based on the requirement specification. The base models are created and exported in a format called COLLADA (spec by Khronos group), which is an XML format. Changing the values of the elements in the XML, will change the model's look and shape. Listed below is an edited version of a Collada .dae file. The following features are noted:

1) A set of phong shading parameters to define the surface properties or effects such as color.
2) A geometry mesh composed of:
   a. Position
   b. Normals
   c. UV Texturing coordinates
   d. Vertex
   e. Triangles
3) Placement of object in the scene The following example of a file listing produces the representation of a coil segment as illustrated in FIG. 13A.

```
<?xml version="1.0" encoding="utf-8"?>
<COLLADA version="1.4.0"
xmlns="http://www.collada.org/2005/11/COLLADASchema">
    <asset>...</asset>
    <library_effects>
        <effect id="wire_115115115_001-fx"
name="wire_115115115_001-fx">
            <profile_COMMON>
                <technique sid="blender">
                    <phong>
                        <emission>...</emission>
                        <ambient>...</ambient>
                        <diffuse>...</diffuse>
                        <specular>...</specular>
                        <shininess>...</shininess>
                        <reflective>...</reflective>
                        <reflectivity>...</reflectivity>
                        <transparent>...</transparent>
                        <transparency>...</transparency>
                    </phong>
                </technique>
            </profile_COMMON>
        </effect>
    </library_effects>
    <library_materials>...</library_materials>
    <library_geometries>
        <geometry id="Spring02_wire_115_006-Geometry"
name="Spring02_wire_115_006-Geometry">
            <mesh>
                <source id="Spring02_wire_115_006-Geometry-Position">
                <source id="Spring02_wire_115_006-Geometry-Normals">
                <source id="Spring02_wire_115_006-Geometry-UV">
                <vertices id="Spring02_wire_115_006-Geometry-Vertex">
                <triangles count="348"
material="wire_115115115_001">
```

```
      </mesh>
    </geometry>
  </library_geometries><library_visual_scenes>...</library_visual_scenes>
  <library_physics_materials>...</library_physics_materials>
  <library_physics_models>...</library_physics_models>
  <library_physics_scenes>...</library_physics_scenes>
  <scene>...</scene>
```

The Coil binds (binding elements) are available in different lengths, colors, diameter and possibly pitch values. Although described relative to one of several pre-determined pitch values, it is further contemplated that the use of a stretching operation may further eliminate the need to include several pitch models for certain bindings, where the pitch itself is a function of a stretch factor applied to a common (single-pitch) base model. Other than the pitch property all the other properties are transformed or customized programmatically in response to the job description. And, for each property a transformer class is defined to handle that particular property. In other words, property transformers are provided for color, length, diameter and pitch. A simple transformer used to change the color of the model just changes the values of diffuse and ambient components in the effect profile defined. This is a generic transformer applicable to any COLLADA model that uses phong technique to define material color. Relative to diameter, the base model is assumed to have a diameter of 1 inch. The transformer customizes the diameter by scaling up or down the coil's X and Z axes uniformly (assumed that an objects' length runs through the Y axis).

Figure 13B:
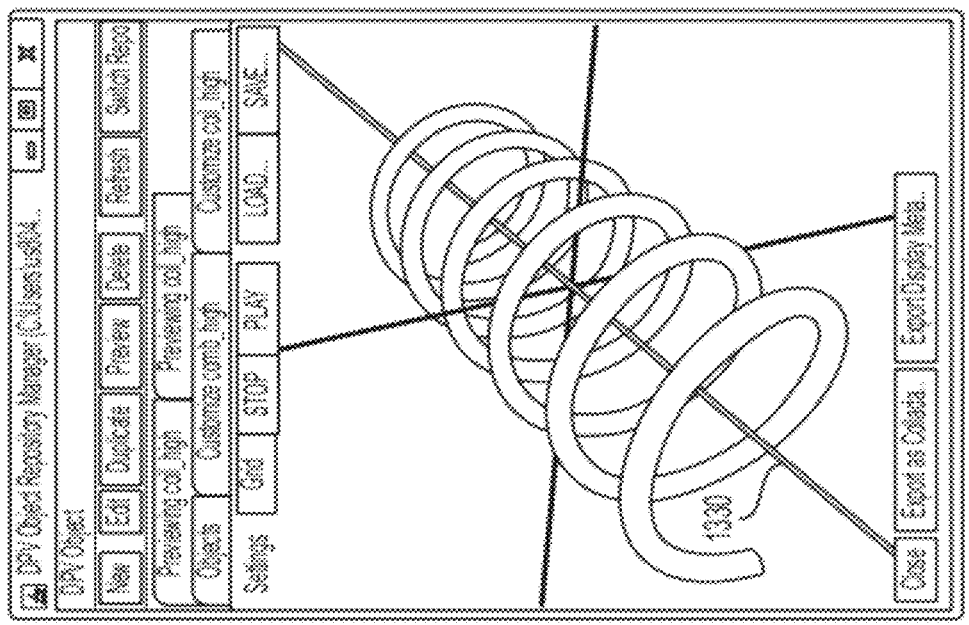
FIGS. 13A-B are illustrative examples of a display window depicting a single coil segment and an assembled coil element in accordance with one embodiment of the disclosed visualization system.
Figure 13A:
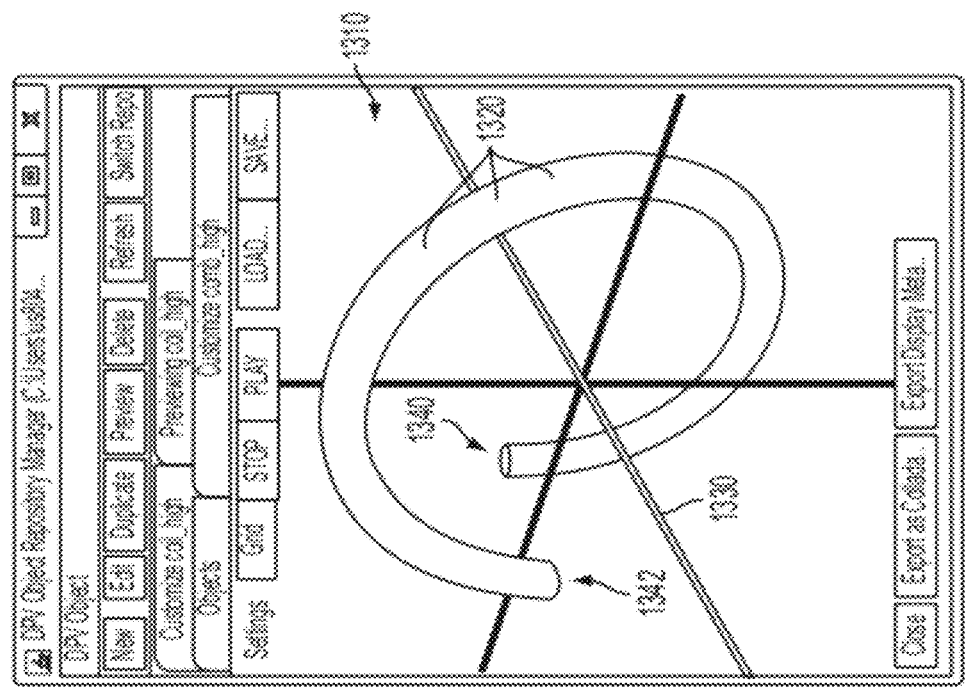

The basic idea of elongation of this type of object is by appending the unit/base model a number of times until the desired length is achieved (see e.g., contrast between FIGS. 13A and 13B). Basic length transformation does not apply to coils. There are two things to be taken care for coils. First, the second coil object to be appended should be mirrored on the X axis so that it fits with the first coil's end. Next, the second coil should begin where the first coil ends. For coils the delta or the thickness of the wire is also to be taken care of so that the final coil looks like a single piece; i.e. the starting face of the second coil perfectly matches with the ending face of the first coil. The adjustments described are done for each base model appended and finally a coil model of desired length is obtained.

3.3 3D Binding Element Summary

In summary, the print document production visualization system includes: a controller for controlling and carrying out the various transforms; a print product definition determined, for example, by the job description, and a binder requirement specification, the details of which are similarly set forth in the job description. In order to produce a visualization of the required binding, the system also includes a repository such as a memory for storing a plurality of 3D binding elements and associated meta-data managed by the controller, where the controller is configured to transform the binding elements and associated meta-data, as specified by the binder requirement specification, into a 3D binder display model for inclusion in the transformation of the print product definition (including the binder requirement) into a print product display model displayed as a virtual 3D rendering of the print product and binder by rendering on a graphical user interface. As will be further appreciated, the binder display model may be retained or stored as only a portion of the binder element, and the system produces a print product display model displayed as a virtual 3D rendering of the print product and associated binder by building multiple binders based upon the partial models for rendering on a graphical user interface.

Also described herein is a method or process operating on a computer system or controller for print document production visualization. The method includes receiving and storing, in a repository of base models in a computer memory, at least one 3D binding element model and associated meta-data. The method then receives a print product definition and a binder requirement specification. This information is employed, along with the base models, to transform a 3D binding element model in the repository, and associated meta-data, into a 3D binder display model as specified by the binder requirement specification. Then the print product definition is transformed into a 3D display model, including the 3D binder display model, to provide a 3D virtual rendering of the print product definition on a graphical user interface. As will be appreciated, user interaction with the graphical user interface menu provides input to the binder requirement specification or it is defined within the JDF, or derived from document properties such as the size of the document.

4.0 Segmented Bindings

Coil & Comb Examples

Referring to FIGS. 13A-B and 13C-D, one aspect of the 3D bindings is the replication of model segments (with possible rotations around the Y-axis to align ends) in order to provide a rendering of the binding over the desired length (e.g., an edge of a bound document). This applies to other bindings which have these properties, and for which coils and combs are described herein as examples, The following description pertains to an exemplary embodiment for a coil binding, but aspects thereof are applicable to other 3D binding elements such as combs (plastic and wire types), etc. Coil or spiral bindings come in assorted lengths, colors, diameters, and pitch (e.g., coils/inch). Illustrative examples of several coil bindings are depicted in FIG. 14. However, the proto-object or base model for a coil binding has just a single or at most a few cycles, an example of which is shown in FIG. 13A.

4.1 Base Models for Coil & Comb Bindings

As will be appreciated the base model of a coil binding element includes a defined shape, which in the example, is reflected by structure 1310 having surface structure components 1320. The coil binding model has an axis 1330 and defined end points 1340, 1342, where the model may be interfaced with additional model segments in order to produce a binding of a specified length as illustrated in the window of FIG. 13B.

Figure 49:
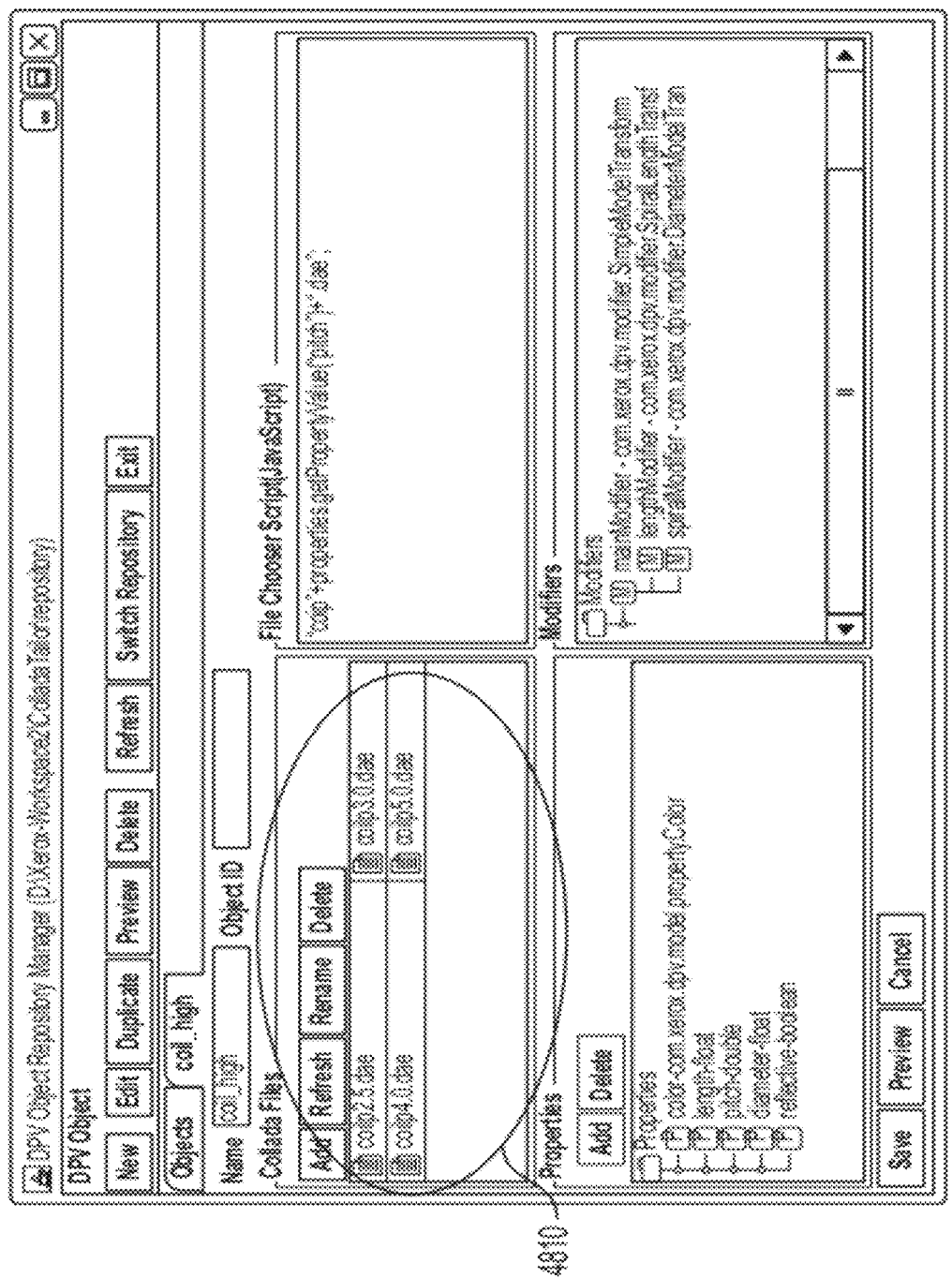
FIG. 49 is a representative illustration of a user-interface window showing models in a document repository.

As previously mentioned the pitch of a coil is not programmatically customized in one embodiment (although possible using a stretch operation), but an appropriate COLLADA model for the given pitch value is loaded from the repository. This is done by a script which returns the filename of an appropriate COLLADA file based on the property values (e.g., pitch) supplied. As illustrated, for example, in the user-interface screen of FIG. 49, the document production visualization objects for a coil binding type are listed in region 4810. In the lower-left region of the interface screen in FIG. 26, the properties of an exemplary coil binding are listed. The objects represented as COLLADA files are indeed those that are used for creation of and stored in the repository for access by the visualization system when a user has selected a coil binding for a job. It will also be appreciated that although only four exemplary files are illustrated in FIG. 49, a plurality of coil, comb and other types of binding files may be included in the repository as discussed herein, and as reflected in FIG. 11.

Figure 13D:
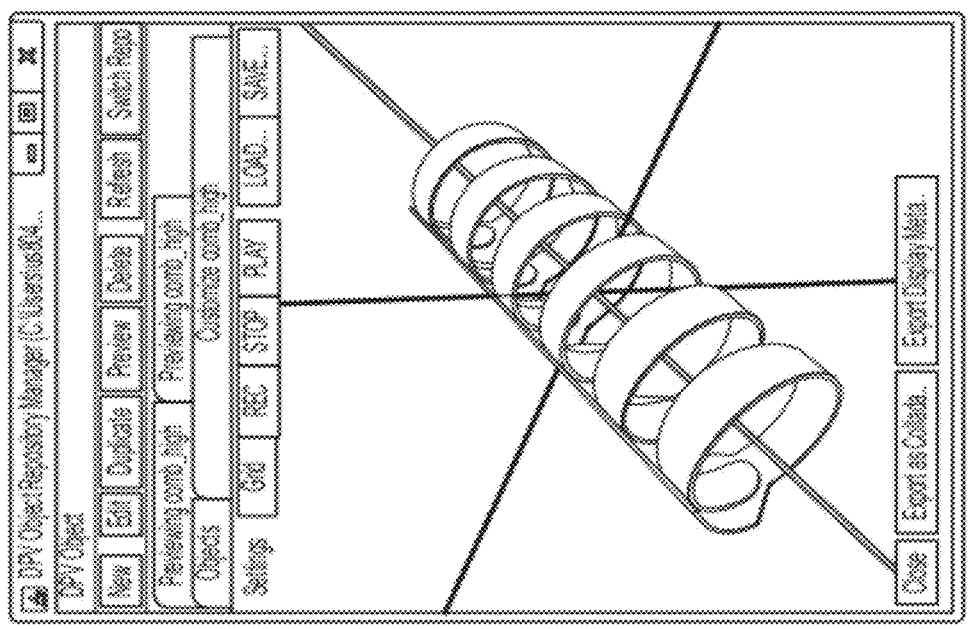
FIGS. 13C-D are illustrative examples of a display window depicting a single comb segment and an assembled comb element in accordance with one embodiment of the disclosed visualization system.
Figure 13C:
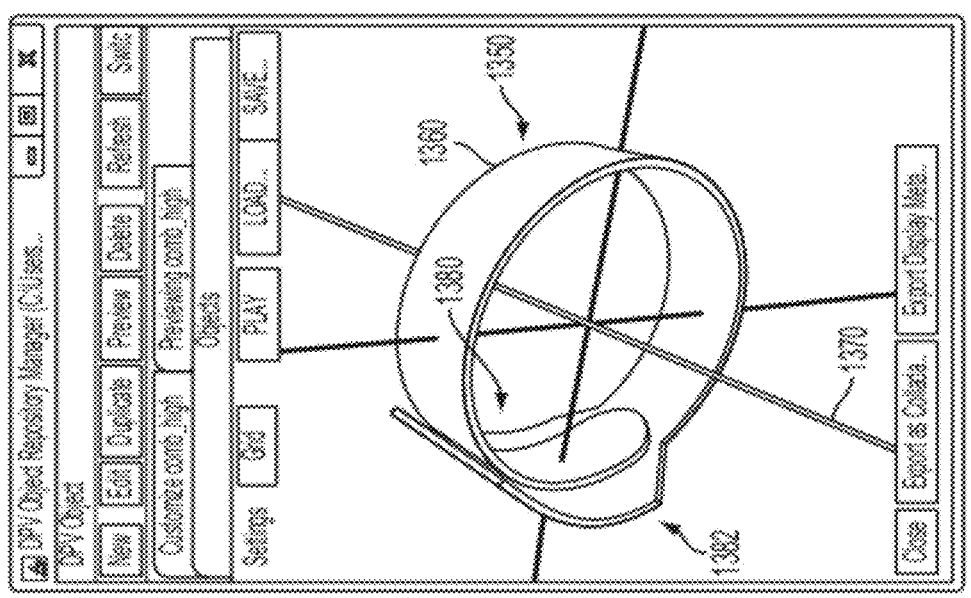
Figure 14:
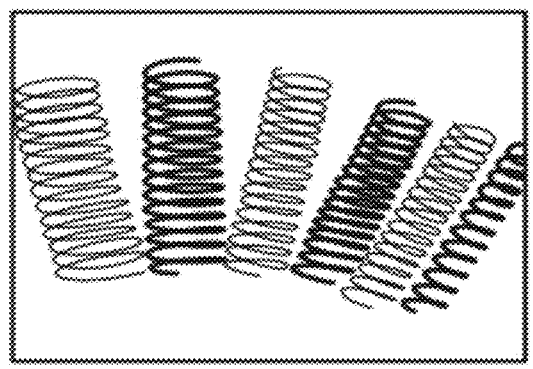
FIG. 14 is an illustration of various coil-type bindings that may be displayed in accordance with the disclosed visualization system.

Considering, also, FIGS. 13C-D, depicted therein are illustrations of a plastic comb-type binding. The base model of a comb binding element includes a defined shape, which in the example, is reflected by structure 1350 having surface structure components 1360. The coil binding model has an axis 1370 and defined end points 1380, 1382, where the model may be interfaced with additional model segments in order to produce a comb binding of a specified length as illustrated in the window of FIG. 13D

4.2 Customization of Coils/Combs

Figure 15B:
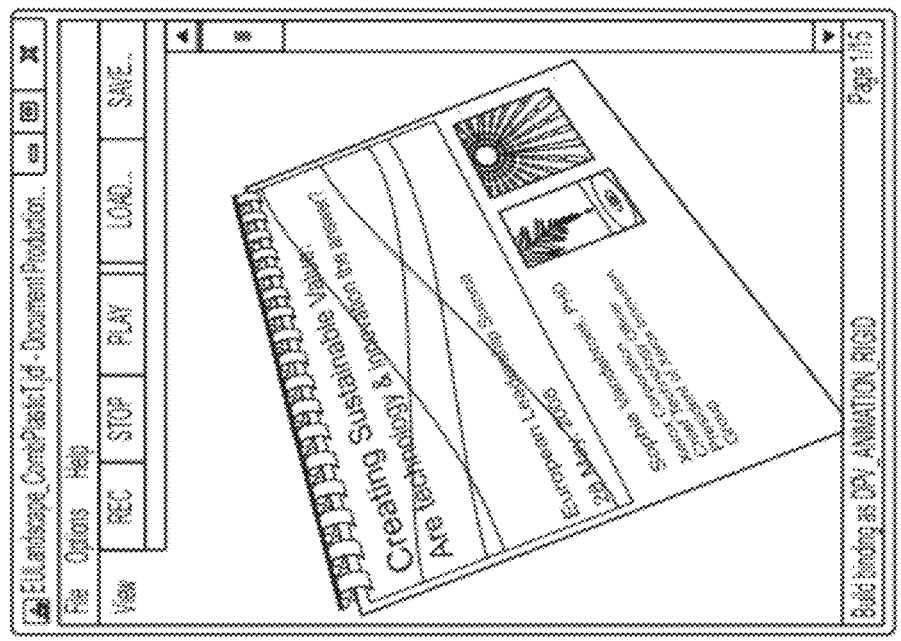
FIGS. 15A and B are, respectively, illustrations of exemplary display windows depicting 3D rendering of coil and comb bindings as applied to a print job.
Figure 15A:
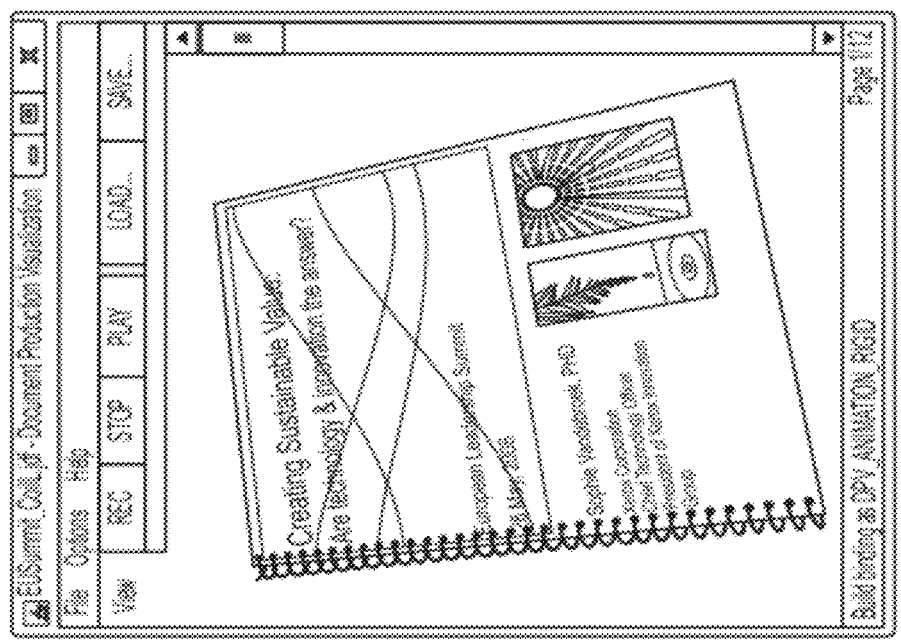

When the CustomizationService is run, for example with a request for a "red, 6-inch, pitch of 2.5, diameter of 1.0 inch coil binding", the object is generated and returned is for display. The object is created by programmatically modifying the geometry and scene values that are encoded in the base model. This may include modifying the vertices, normals, positions, and colors of one or more geometries in the proto-object in order to place the object in the scene as needed. It will also be recognized that different types of binding objects will have different meta-files, proto-objects, and code to combine and modify the proto-objects into new single objects. Examples of coil and comb bindings are illustrated in FIGS. 15A and B, respectively, where it is apparent that the geometries of the proto-object have indeed been modified in accordance with the scene.

5.0 Ring Bindings

Figure 19A:
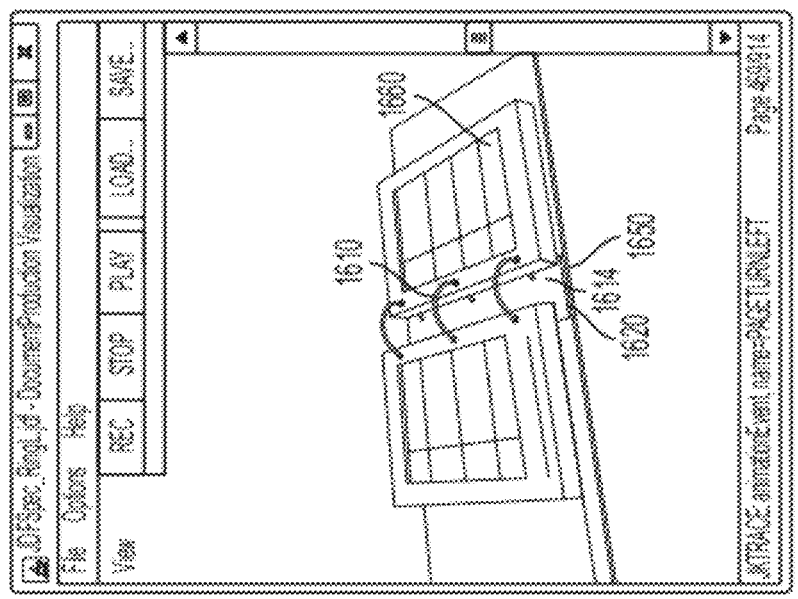
FIGS. 19A-C are illustrative display windows depicting examples of virtual documents illustrates with various ring-type bindings in accordance with an aspect of the disclosed visualization system.
Figure 19C:
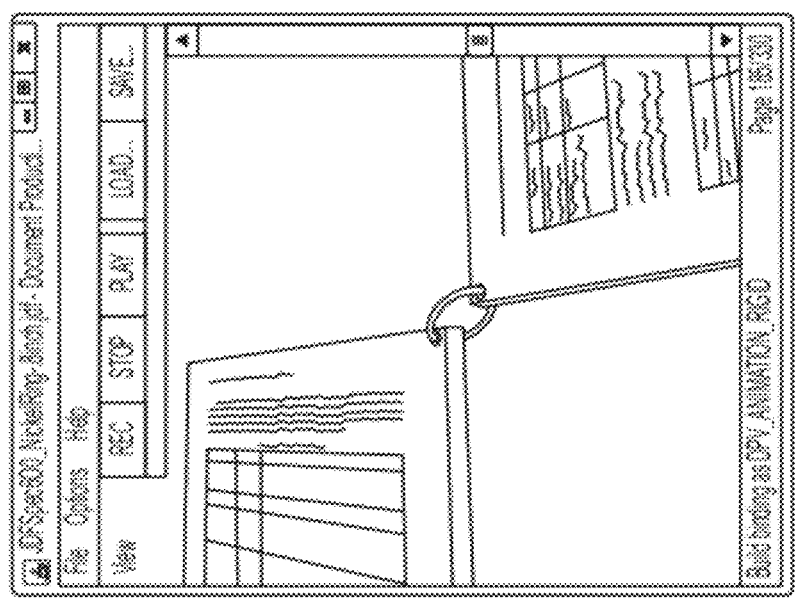
Figure 19B:
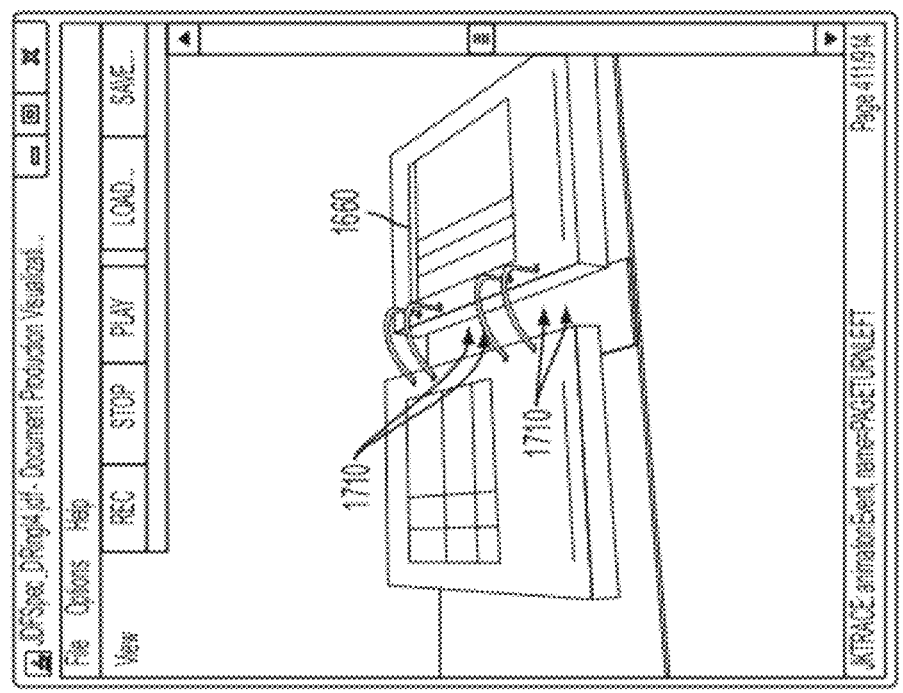

Another binding attribute is illustrated by reference to various types of ring binding components (e.g., 3-ring binders as depicted in FIGS. 19A-B, for example), where the size, spacing and location of a required number of rings (e.g., ring binders and nickel rings) is incorporated in the rendering of the print product. This applies to other bindings which have similar properties, and ring binders are example embodiments that will be further discussed herein.

More specifically, this ring binding type may be provided for visualization in the disclosed systems and methods as a single or multi-ring-type binder that is capable of holding a number of documents or pages with different thicknesses and any of a number of ring positions. The ring binders come in three general types: O-Ring and D-Ring binders with associated metal connectors and covers as depicted in FIGS. 19A-B, as well as loose page bindings using a single 'Nickel Ring' as depicted in FIG. 19C. While the O-Ring and D-Ring systems exhibit different motions when opening and closing, they have very similar structures overall, and the variations between the types have simple differences in the shape of the ring used to bind. For O-Rings the shape is a simple circular ring whereas for D-Rings the rings are of a general D shape. For O-Ring binders the rings are generally fastened to a metallic plate which is fixed to a spine of the binder, whereas for D-Ring binders the rings are generally fastened to a plate which is generally fixed to the inside of the back cover of the binder adjacent the spine. The 'Nickel Ring" is a single ring, with no metal connecting spine.

In the ring binders, the rings come in different sizes (typical diameter values 0.5, 0.75, 1.0, 1.5, 2.0, 3.0 inches, etc.) and the folder may have N number of rings where N is any positive natural value (commonly 3 rings). There are a variety of ring binders with different number of rings positioned in very many possible ways. It is also possible that rings may be employed without a plate for binding manuals and other documents. Accordingly, the size and positioning of the rings must be individually customizable to assure the greatest flexibility in a document production visualization system.

5.1 Base Models for Rings

Referring to FIGS. 16A-19C, as with the prior binding types, there are two principal steps involved in the creation of the 3D objects necessary to represent the ring-type binders. Preparation of a base model or objects created for O and D ring bindings include various ring "diameters" or sizes such as ½", ¾", 1¼", 1½", 2" and 3". For each size, there may also be a metallic plate that approximately matches the ring diameter. As noted above, for the O-ring binder the rings and associated plate are attached to a spine whereas for the D-ring binder they are attached to the back cover. And, the cover size is generally a function of the size and calculated thickness of the book.

5.2 Customization of Rings

Figure 16B:
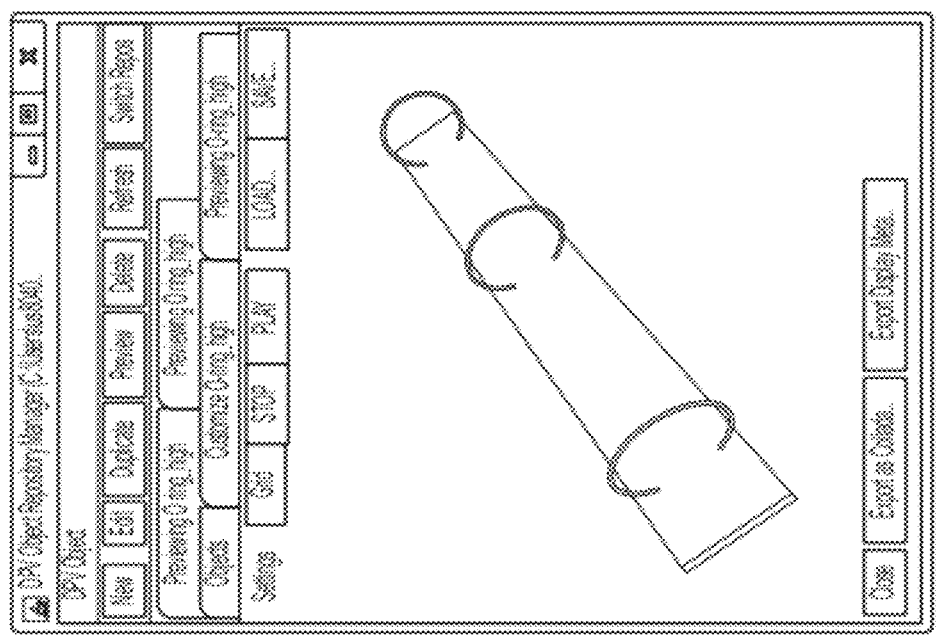
FIGS. 16A-B illustrate exemplary display windows with a virtual O-ring binding element and a virtual three-ring binder using O-rings, respectively.
Figure 16A:
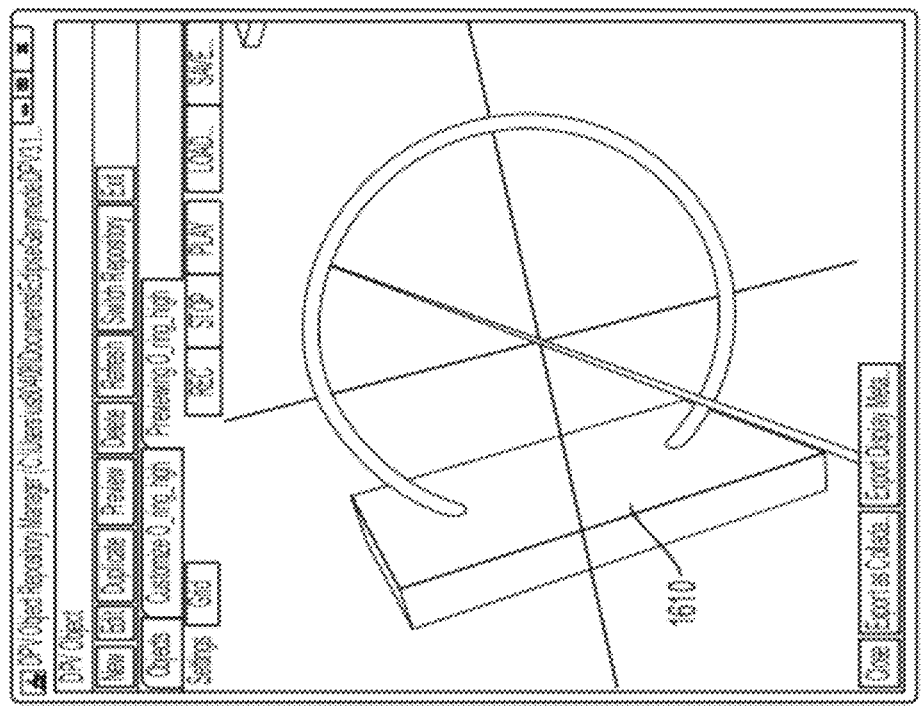

Referring to FIGS. 16A-C, real-time creation of a 3D object of the ring binder to match the desired document thickness and length is based upon selection of a base object or model 1610 to match the document thickness (T), and then the base model is appended a number of times (e.g., as required based on the document length) with associated spacing (metallic or plastic plate block 1620 without a ring) between each ring as requested by the job description. It is further noted that while a conventional 3-ring binder is depicted, the number of rings (N) is specified by the binder requirement specification, where N is any positive integer. More specifically, ring elements 1612 along with associated backing plate portions 1614 and the non-ring portions of the backing plate 1620 are used to construct the ring binder for visualization. As shown, the number of rings and spacing therebetween may be customized by the selection of the appropriate model. FIG. 19A illustrates a visualization of a document bound using a ring binder as described, where the ring binder is an O-ring type having a backing plate 1620 affixed or mounted along the spine of the cover 1650, and where the three rings are illustrated as passing through the pages 1660 of the document. As illustrated the ring elements 1610 are held in a spaced-apart relationship by the backing plate elements 1620.

Figure 17B:
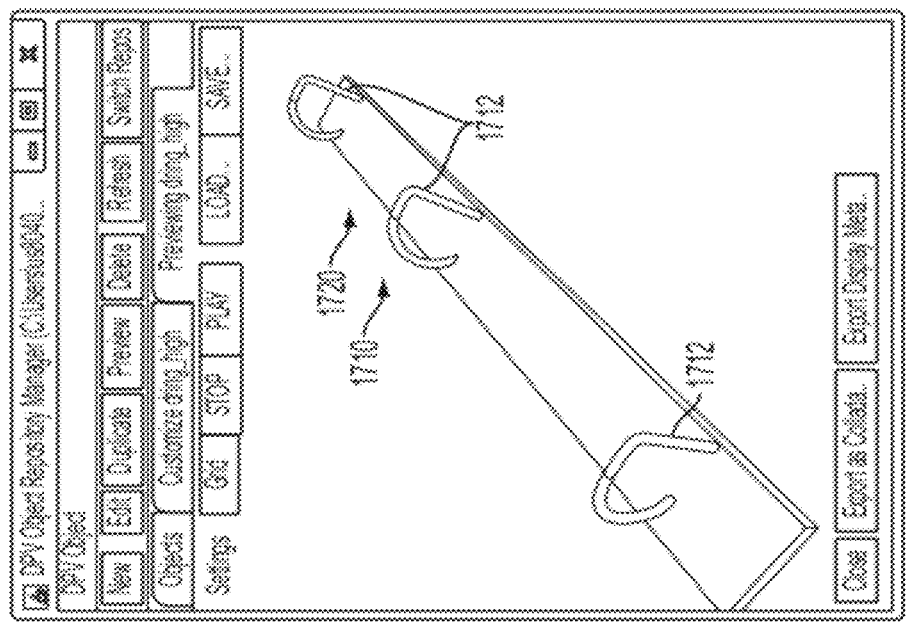
FIGS. 17A-B illustrate exemplary display windows with a virtual D-ring binding element and a virtual three-ring binder using D-rings, respectively.
Figure 17A:
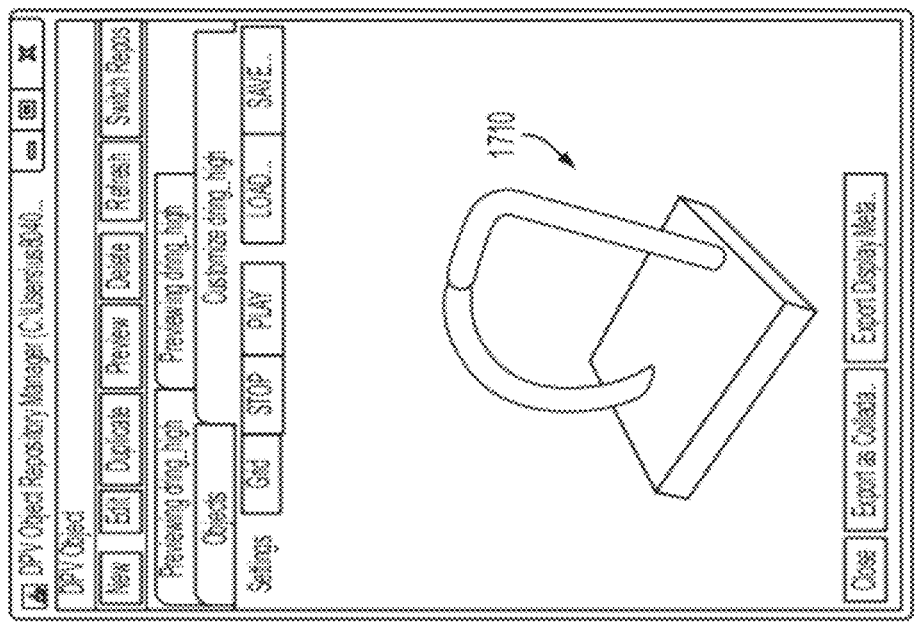

Referring to FIGS. 17A-B, real-time creation of a 3D object of the D-ring binder to match the desired document thickness and length is based upon selection of a base object or model 1710 to match the document thickness (T), and then the base model is appended as required based on the document length with associated spacing block 1720 that does not have a ring as required by the job description. It is further noted that while a conventional 3-ring binder is depicted, the number of rings (N) is again specified by the binder requirement specification, where N is any positive integer. FIG. 19B illustrates a visualization of a document bound using a D-ring binder as described. As illustrated the three ring elements 1712 are held in a spaced-apart relationship by the spacing block or backing plate elements 1720.

Figure 18:
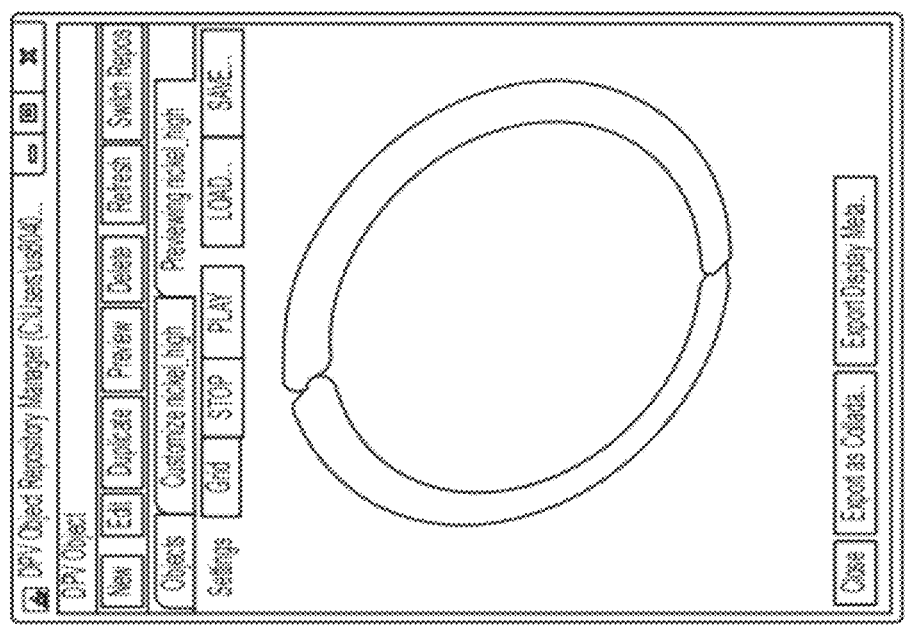
FIG. 18 illustrates an exemplary display window with a virtual binding ring.

Lastly, considering FIG. 18, depicted therein is a display window illustrating a virtual binding ring that may be used for binding documents. Creation of a 3D object of the binding ring to match the desired document thickness is based upon selection of an object or model 1810 to match the document thickness (T). It is further noted that while a single binder is depicted, for example in FIG. 19C, the number of rings (N) is again specified by the binder requirement specification, where N is any positive integer. Moreover, although FIG. 19C reflects a single rind binding the corner of the document pages, it is possible that one or more rings may also bind pages along an edge thereof.

5.3 Ring-Type Binding Summary

In summary, the print document production visualization methods disclosed herein may also include creating a multi-component 3D ring binding element repository in a memory managed by a controller having access to the memory, where the repository includes 3D ring binding element models for each type of ring binding available for visualization along with associated meta-data. In response to a print product definition including or in association with a ring binder requirement specification, the multi-component 3D ring binding element model is transformed using associated meta-data from the repository into a multi-component 3D ring binder display model as specified by the ring binder requirement specification and the print product definition. And, the print product definition is further transformed into a 3D display model including the multi-component 3D ring binder display model to provide a 3D virtual rendering of the print product definition on a graphical user interface.

As discussed in more detail below, the method for presenting a virtual representation of a ring-bound document may also employ a 2D binder display model to represent at least a portion of the ring binder requirement (e.g., the hole through which a ring of said ring binder would pass) as a 2D rendering associated with a 3D surface of the print product. Once again, the ring binder definitions may be provided to the system via a user interface and thereby become part of the print product definition, or can be derived from properties of the document, or defined with a set of default values. Moreover, the interface may permit the user, via user gestures in interaction with the graphical user interface, to select one or more characteristics of the binder (e.g., ring type/shape (O or D), ring finish (nickel, chrome, etc.), ring size, binder cover color, etc). Creation of the repository for the ring-type binding would thereby include, for each of the binding types, creating a plurality of 3D binding elements. And, particularly for the ring binders having a backing plate and cover, a plurality of objects including a variable size element such as a backing plate spacer(s). The variable size elements include the binder ring and binder plate components (matched size according to ring diameter), where the size may be determined as a function of the thickness of the document(s) to be included in the binder.

6.0 Clip Bindings

Spring Clip, Bulldog Clip, and Paper Clip Examples

When considering various clip bindings (e.g. Paper clips, Spring clips, Bulldog clips, one important aspect of each clip binding is the spacing between two pre-build faces with an appropriately scaled connector. This applies to various clip-type bindings which have these properties. For purposes of illustration, the following disclosure applies to particular clips but will be appreciated as relevant to a number of clip-type bindings or other bindings having similar characteristics, and example embodiments.

6.1 Base Models for Clips

As mentioned above, another binding type that may be handled in accordance with aspects of the disclosed embodiments is a spring-clip or similar binding element (e.g., bulldog binding, paper clip, etc.). Referring to FIGS. 20A-27, these figures show examples of clips associated with document pages as will be discussed in more detail below relative to the specific examples. In order to present such bindings in a document production visualization system, the components of such bindings need to be adjustable so as to permit them to be properly displayed in the product visualization for user review. Moreover, the clip-type bindings further impact the page layout, much in the same way that punched holes may impact the layout for a ring-bound document, and the visualization system needs to reflect such impacts in the virtual rendering of the document and associated clips. Once again, while it may be possible to provide detailed simulations for all such clips, at least one embodiment of the visualization system disclosed herein contemplates pre-construction of such clips and the like via components that may then be appropriately modeled and sized when rendered for visualization.

Considering, for example, spring clips 2100 as illustrated in FIGS. 20A-C, 21 and 22, one difficulty with systems which support a true 3D virtual rendering of a finished document is the creation of a 3D model of a spring clip that is capable of holding any number of documents with different thicknesses (T). It will be appreciated that, in reality, the angles of the clip handles 2110 and outermost legs 2120 will vary with document thickness. These variations in angle present a problem in the real time construction of 3D objects. Accordingly, a method for easily modifying a few base models (e.g. different clip sizes) to accommodate different thickness of documents has been employed to present a reasonable approximation to the true physical clip.

Spring clip binders come in a set of finite sizes (width: capacity: 2", 1¼":½", ¾":¼", etc.). The size of any one clip is related to the "width" of the clip and the maximum thickness or capacity which the clip can hold. Creating 3D models which have the proper clip end opening (e.g. to match a given document thickness (T)), and creating the corresponding angles of the handles is difficult. Hence the disclosed embodiment employs independent components to represent a clip, including a variable thickness "connector-plate" 2130, and fixed angle handles to easily create a realistic rendition of a binder clip in use. The variable thickness connector-plate 2130 is modified in real-time to match the thickness of the document, and is then attached to two fixed handles 2110, to create a single 3D object for rendering. The handles are chosen from a set of pre-built objects to best match the thickness of the document. The handles are kept at a fixed angle in accordance with the disclosed embodiment, although it would be contemplated that several angles of handles may be used based upon the number of documents bound by the spring clip. Also, although not specifically discussed, it will be appreciated that a bulldog clip or paper clip may be similarly employed, where a variable size component is "connected" between fixed or standard sized ends or legs in order to permit virtual rendering of the binding type.

6.2 Customization of Clips

The document production visualization system brings the interactive 3D graphics into a browser-based server-client system and further permits the visualization of a wide range of binding types. For the representation of clips, there are two principal operations involved in the creation of the necessary 3D objects; the offline design and preparation of a base element, followed by real-time creation of a single 3D object of the spring clip binder to match a desired document thickness.

6.3 Spring Clip Example

Figure 20B:
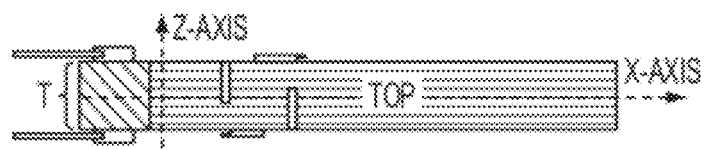
FIGS. 20A-C are illustrations of the face, top and side views of a document setting forth the model parameters for a spring clip binding.
Figure 20C:
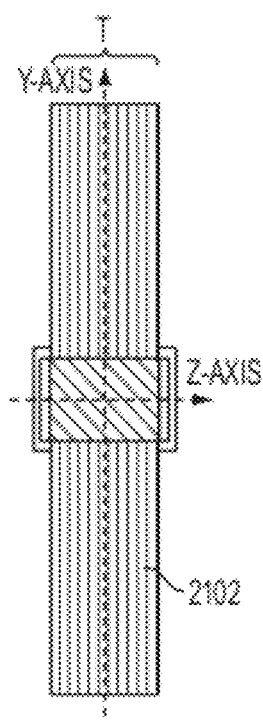
Figure 20A:
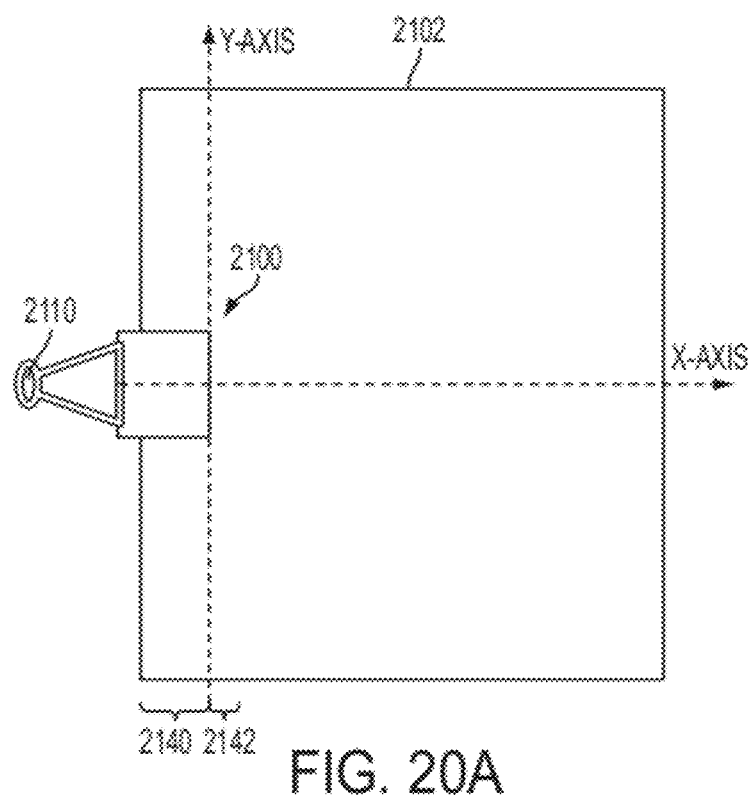
Figure 22:
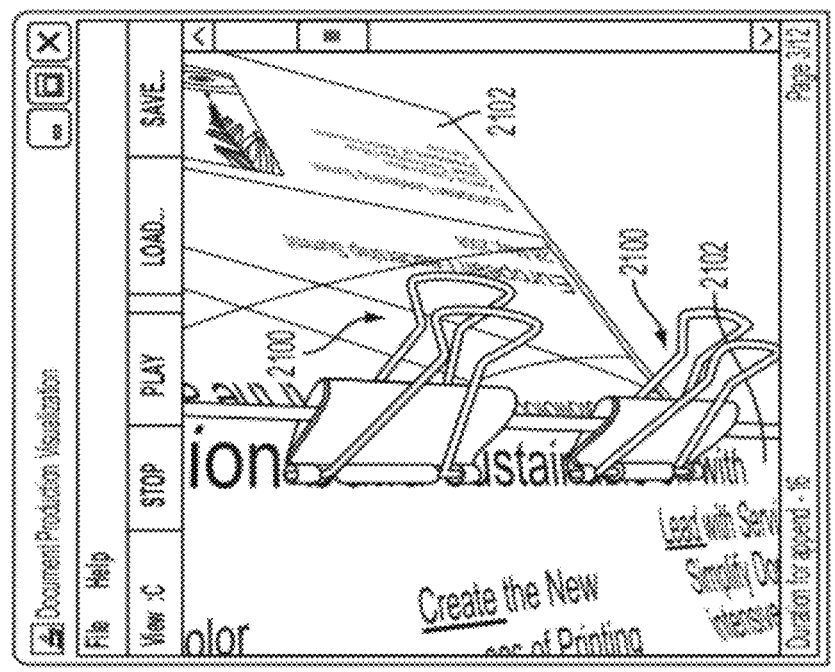
FIGS. 21 and 22 are, respectively, illustrative examples of a spring clip model and the spring clip model included in a visualization window.
Figure 21:
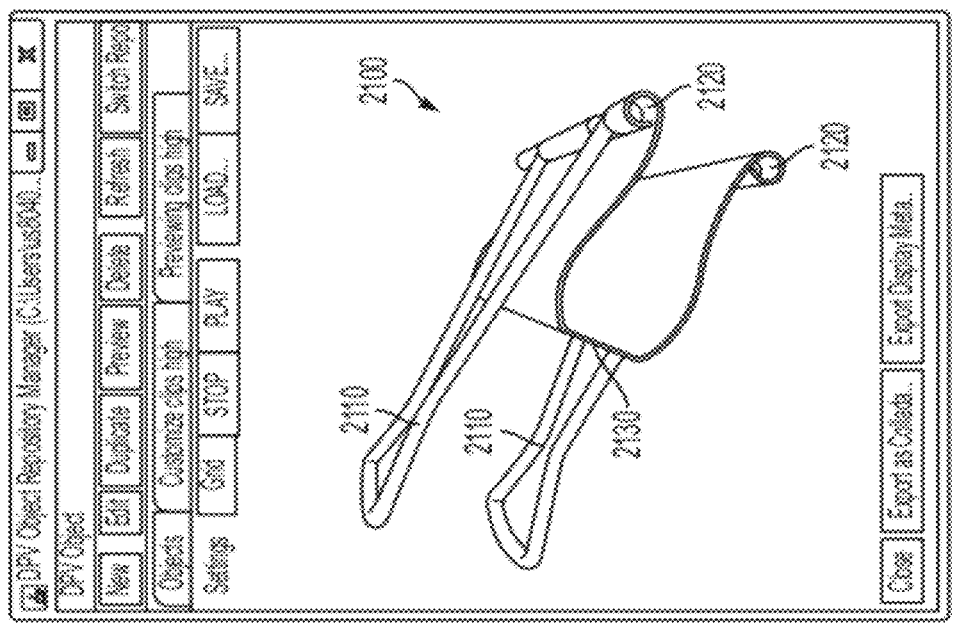

In one embodiment, as represented by FIGS. 20A-21, a pair of handle objects 2110 are first created for clip bindings of widths ½", ¾", 1¼", and 2" for example. For each size, there are both front and back handle objects 2110 created. In addition a default "connector-plate" 2130 of matching width and variable thickness is created for each clip size. Next, the real-time creation of a single 3D object of the clip to match the desired document thickness is accomplished using the following general steps:
  a. Choose the base object to match the document thickness (T)
    i. $0.00 < T - < 0.25 \rightarrow$ ½" clip
    ii. $0.25 <= T < 0.50 \rightarrow$ ¾" clip
    iii. $0.50 <= T < 0.75 \rightarrow$ 1¼" clip
    iv. $0.75 <= T < 1.00 \rightarrow$ 2" clip
    v. $1.00 < T$ not supported
  b. Modify the values of the "connector-plate" to have a thickness=T
  c. Append the front and back handles to the edges of the connector-plate Referring briefly to FIGS. 20A-C (front, top and side views, respectively), the location of a single binder clip 2100 on a document 2102 is illustrated. As discussed above the width thickness (T) of the clip 2100 is variable whereas the other dimensions (size of legs 2120 extending along the top and bottom pages, and associated handles 2110, is dependent upon the basic clip size selected by a user in setting up the printing job. As further illustrated in the exemplary visualization of FIG. 21, a rendered version of the resulting 3D models is shown. Referring briefly to FIG. 22, a user display window showing a virtual rendering of a document that is bound using two clips along the top edge of the document having pages 2102 opened is illustrated. As will be appreciated, when bound by clips 2100 the document is unable to be opened within block offset region 2140 and further includes a bend offset region 2142 where the pages 2102 are bent about the ends of the spring clip legs. The dimensions (e.g., width) of the block and bend offsets are a function of clip size, and may also be impacted by the number of pages, the paper stock, etc. For example, as the number of pages approach the clip capacity, the bend offset may be increased.

Figure 23A:
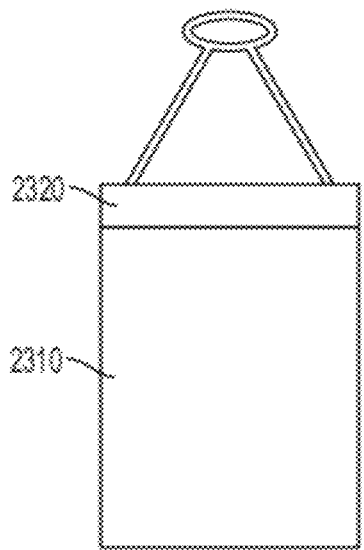
FIGS. 23A-C are illustrations of an alternative modeling technique for representing spring clip bindings.
Figure 23B:
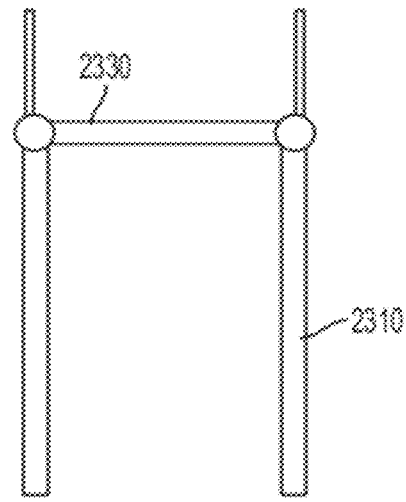
Figure 23C:
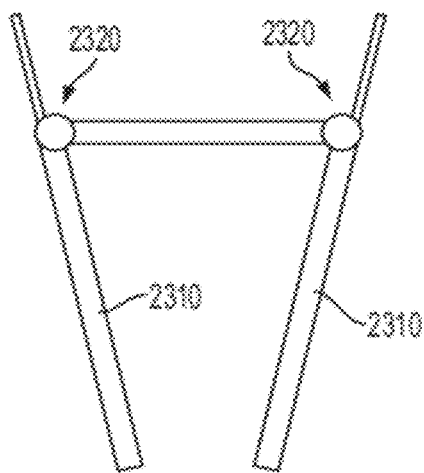

In an alternate embodiment, another possible method to construct spring clips for accurate rendering would be to build or model a clip having "hinges." The purpose of the hinges would be to hide the possible gaps formed by the rotations of the handles in the embodiment described above. With this method the connecting-plate would be kept at a fixed size, and built in real time to match the true size of the clips. A simple schematic of such a construction is shown in the views of FIGS. 23A-C. It will be further appreciated that the alternative components (legs 2310, hinges 2320 and backing member 2330 as depicted in FIGS. 29A-C) may also be suitable for the visualization of a paper clip or a bulldog type clip, where the clip itself is essentially a spring-loaded hinge biasing the two legs into contact with the pages or items therebetween.

As disclosed relative to the spring clip binding, print document production visualization method comprises: creating an adjustable or directly proportional sized (variable-sized) 3D binding element repository in a memory managed by a controller having access to the memory, where the repository includes at least one basic 3D binding element model for each type of adjustable and directly proportional sized binding available for visualization along with associated meta-data. For clarification, variable sized is intended to indicate that the binding model permits the binding to be rendered in direct proportion to the thickness of the document, versus selection of a pre-defined binding size suitable for the document. In other words, rendering the binding would include adjusting a dimension of the binding in proportion to the thickness (T) of the document being bound. Upon receiving a print product definition and a binder requirement specification, the stored model is employed for transforming the adjustable directly proportional sized 3D binding element model, or at least the adjustable portion(s) thereof, and associated meta-data from the repository into the desired directly proportional sized 3D binder display model as specified by the binder requirement specification and the print product definition. And the print product definition is transformed into a 3D display model including the adjustable directly proportional sized 3D binder display model to provide a 3D virtual rendering of the print product definition on a graphical user interface.

Once again, the binder details may be input via the user interface, particularly via user interaction with a graphical user interface. As noted the directly proportional sized binding may be selected from a spring clip type of binding, a bulldog clip and a paper clip or similar items. For each of these types of bindings, the directly proportional sized 3D binding element represents a binding model having a variable size element (e.g., a connector plate of a spring clip type of binding).

As previously noted a print document production visualization system that is suitable for rendering directly proportional size binding elements may include a controller along with a repository storing a plurality of directly proportional size 3D binding elements and models and associated meta-data managed by the controller. The controller is configured to transform the binding elements and associated meta-data, as specified by the binder requirement specification, into a directly proportional size 3D binder display model for inclusion in the transformation of the print product definition into a print product display model displayed as a virtual 3D rendering of the print product and directly proportional size binder by rendering on a graphical user interface. Again, the directly proportional size binder requirement specification may be defined by user interaction with at least a menu provided by a graphical user interface, and the system may be further configured to support a bi-directional flow of information with the graphical user interface in order to iteratively select and modify the directly proportional size binder.

6.4 BullDog Clip Example

Figure 24B:
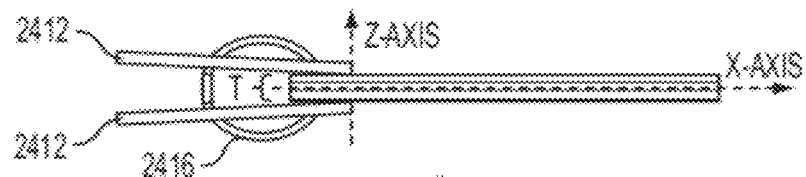
FIGS. 24A-C are illustrations of the face, top and side views of a document setting forth the model parameters for a BullDog clip binding.
Figures 24A, 24C:
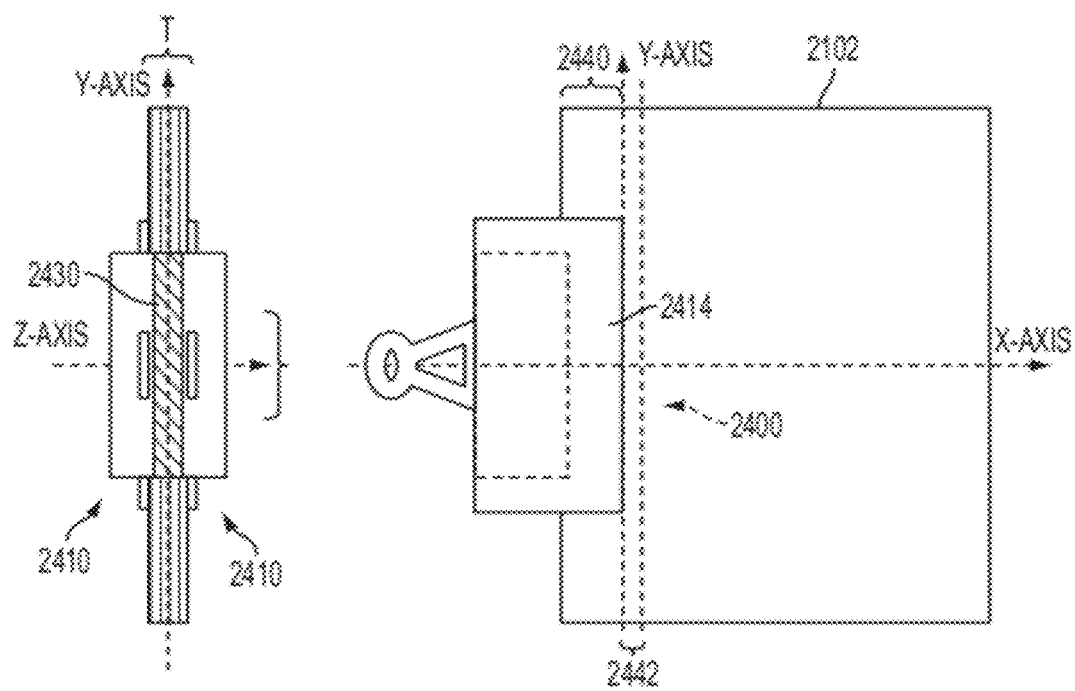
Figure 25B:
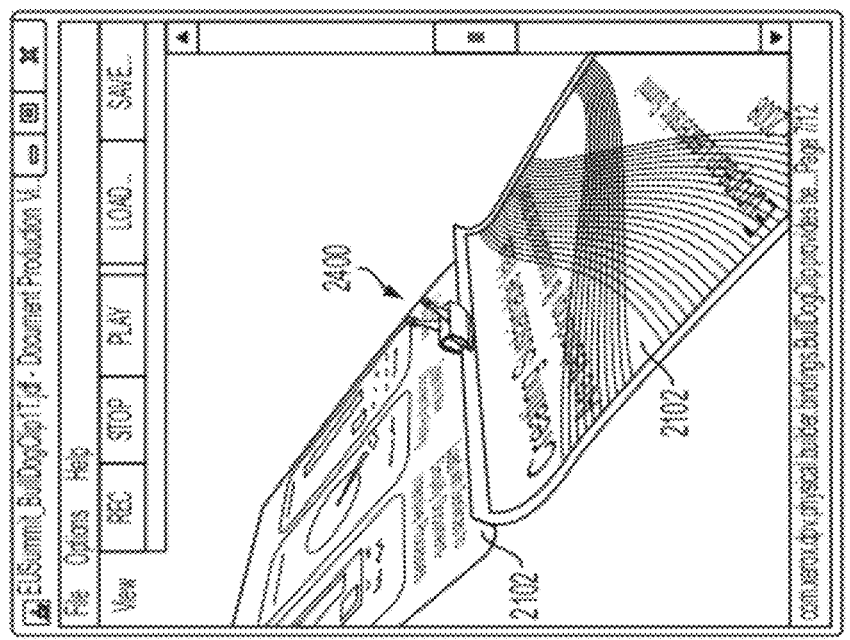
FIGS. 25A and 25B are, respectively, illustrative examples of a BullDog clip model and the model included in a visualization window.
Figure 25A:
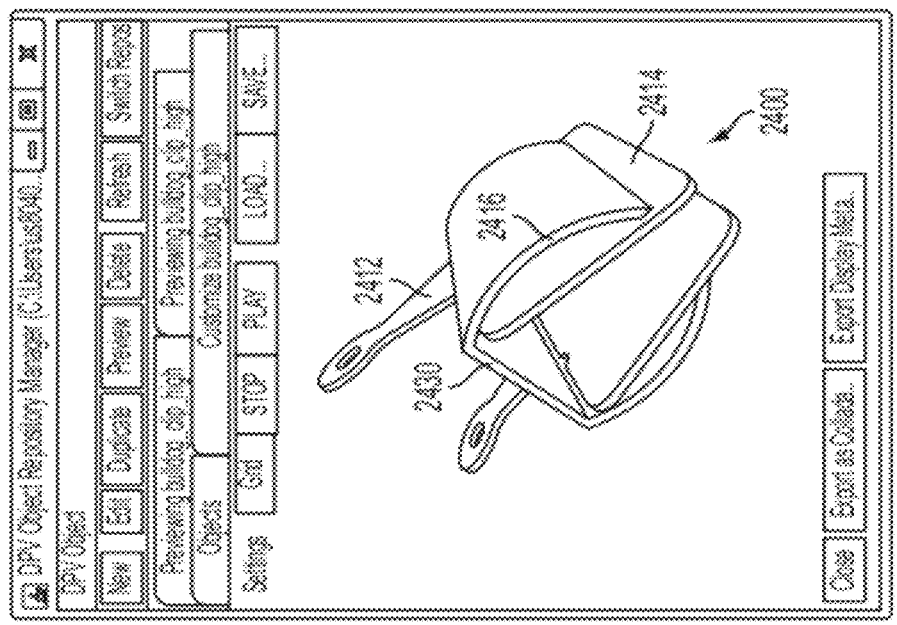

In the embodiment for virtual representation of a BullDog-like clip binding element, as represented by FIGS. 24A-25, a pair of handle objects 2410 are first created for clip bindings having approximate widths of ½", ¾", ¼", and 2" for example. For each size, both front and back handle objects 2410 are created. The handle objects include handle tab 2412, page plate 2414 and a spring section 2416, in combination and which are connected by a default "connector" 2430 of matching width to the spring section 2416. As with the spring clip, the connector 2430 is of variable thickness and is created for each clip size. Next, the real-time creation of a single 3D object of the clip to match the desired document thickness is accomplished using general steps as outlined for the variable-size or directly proportional size clips:

a. Choose the base object to match the document thickness (T)

b. Modify the values of the "connector-plate" to have a thickness=T c. Append the front and back handle objects to the edges of the connector Referring briefly to FIGS. 24A-C (front, top and side views, respectively), the location of a single Bulldog clip 2400 on a document 2102 is illustrated. As discussed above the width thickness (T) of the clip 2100 is variable whereas the other dimensions (size of handle objects 2410 extending along the top and bottom pages is dependent upon the basic clip size selected by a user in setting up the printing job. As further illustrated in the exemplary visualizations of FIGS. 25A and 25B, a rendered version of the resulting 3D model for the Bulldog clip 2400 is shown. In a manner similar to that discussed above relative to spring clips, when bound by clip 2400 the document is unable to be opened within block offset region 2440 and further includes a bend offset region 2442 where the pages 2102 are bent about the ends of the clip handle objects. In addition to the dimensions of the connector 2430 being adjusted by the number of pages in the document, the dimensions (e.g., width) of the block and bend offsets are a function of the clip size, and may also be impacted by the number of pages, the paper stock, etc. For example, as the number of pages approach the clip capacity, the bend offset may be increased due to the fact that it may be more difficult to fold or bend the large number of pages. As will be appreciated, the block and bend offsets are a factor that is incorporated into the model for the clips in order assure that the virtual representation of the 3D bound document is accurate.

6.5 PaperClip Example

Figure 26B:
FIGS. 26A-E are illustrations of the face, top, side, enlarged top and back views of a document setting forth the model parameters for a paperclip binding.
Figure 26D:
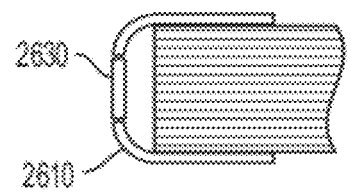
Figures 26A, 26C, 26E:
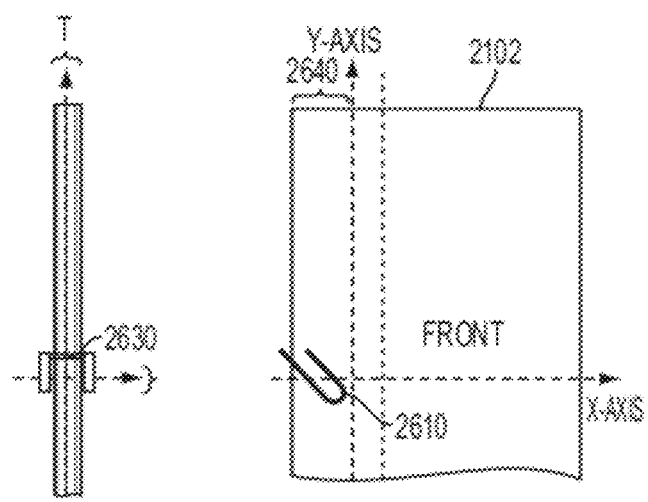
Figure 27:
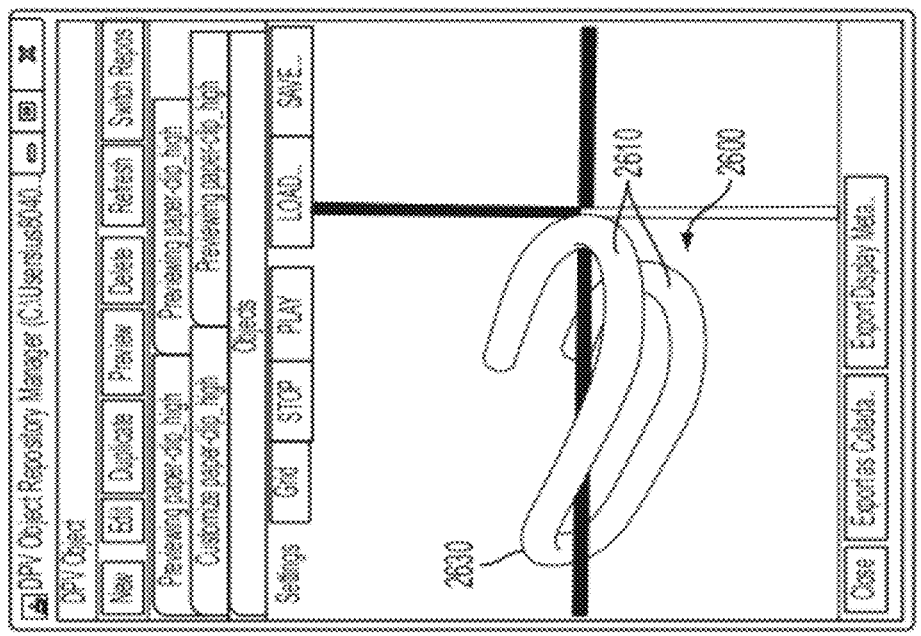
FIGS. 27 and 28 are, respectively, illustrative examples of a paperclip model and the paperclip model included in a visualization window.

Another type of variable or directly proportional sized 3D binding element is a bent wire, or sometimes plastic, fastener typically referred to as a paperclip such as that illustrated in FIG. 27, although it will be appreciated that various designs and sizes of paper clips are available and may also be incorporated as models in accordance with the systems and methods disclosed herein. Referring to FIGS. 26A-27, in the embodiment for virtual representation of a paperclip binding element 2600 a pair of face objects 2610 are first created for the paperclip bindings having approximate lengths of about 1-2 inches and widths of about ¼-½ inches for example. The diameter or gauge of the wire may also be adjusted for the models, using a larger diameter wire for the larger paperclips. This may be accomplished by using different models or may be similarly enabled using a common model and a scaling operation. For each size, both front and back face objects 2610 are created. In a simplistic model, the front and back face object portions of the clip may be the same. The face objects each include a U-shaped loop and are connected by a default "connector" 2630 of matching wire gauge. Connector 2630 is of variable length and may be created for each clip size. Real-time creation of a single 3D object of the clip to match the desired document thickness is accomplished using general steps as outlined above for the other directly proportional size clips:

a. Choose the base object to match the document thickness (T)

b. Modify the values of the "connector" to have a thickness=T c. Append the front and back face objects to the edges of the connector Referring briefly to FIGS. 26A-E, FIGS. 26A-C represent the front, top and side views, respectively. FIG. 26 D is an enlarged view of the clipped edge of FIG. 26B, and FIG. 26 E is a view of the back of document pages 2102 bound with the paper clip. The location of a single paperclip 2600 on a plurality of document pages 2102 is illustrated.

An alternative paperclip model is represented in the lower portions of FIGS. 26A, 26C and 26E (below the break lines), where the model employs slightly different sized face objects 2610 for the front and back, as well as assures that the connector 2632 is placed at an angle across the thickness of the documents, as illustrated specifically at the bottom of FIG. 26C.

Figure 28:
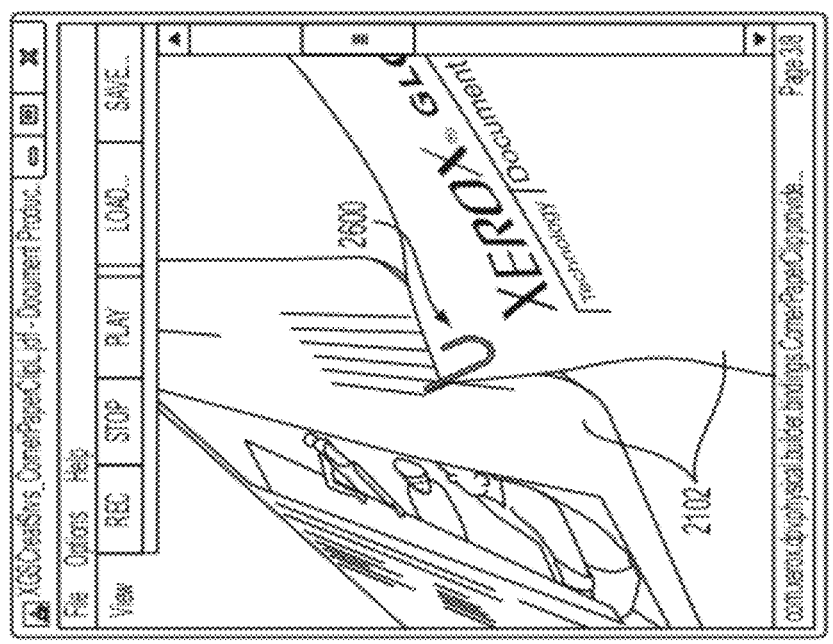

As previously discussed the width thickness (T) of the clip 2600 is variable whereas the other dimensions (size of face objects 2610 extending along the top and bottom pages of the document are dependent upon the paperclip size selected by a user in setting up the printing job. As further illustrated in the exemplary visualization of FIGS. 27-28, a rendered version of the resulting 3D model for the paperclip 2600 is shown. In a manner similar to that discussed above relative to other clips, when bound by paperclips 2600 the document being rendered will further include a block offset region 2640 and a bend offset region 2642 where the pages 2102 are bent about the ends of the paperclip faces.

6.6 Alternative Clip Modeling

In addition to the various alternatives noted with respect to the clip binding models described above, FIGS. 29-31 further illustrate a number of alternative methods that the clips may be modeled. The various examples depicted in the figures are for spring clip bindings, but it will be appreciated that some of the alternatives presented may be applicable to other types or styles of clips.

Referring to FIG. 29, depicted therein is a series of spring-type clips of varying capacities for document pages. In this model approach, a number of clip models are used, each being applicable to a particular document thickness. In other words, independent models are built for a finite set of document (page) thicknesses and when the binding clip is to be depicted in the virtual scene, the model that is the "best" fit is chosen, where the thickness is between $T_{min}$ and $T_{max}$. Although the figure depicts a total of five discrete models, it will be further appreciated that the total number of models may determined in accordance with a visual quality metric. Event though a number of models may be used in this alternative, the models would be built and further adjustments could be made to each model.

FIG. 30 is intended to illustrate an alternative clip model where a portion of the clip or similar binding element can be represented as a hinge or pivot 3010. In these embodiments, elements of the model may be linked or associated with one another and the behavior of the model, and its appearance, are the result of the manner in which the elements interact via the hinge or pivot. For example, the handles on spring clip described above may be characterized as pivoting relative to the legs and in that case, the rotation of the handles may result in the appearance of discontinuities in the virtual binding element. Such a situation is illustrated in the leftmost side of FIG. 30, where the two examples have squared ends and rotation of the ends relative to one another reveals the discontinuity. In the alternatives on the right side, the model still employs a pivot 3010 to maintain a relationship between the elements, but the use of rounded or radiused elements eliminates or at least reduce the appearance of any discontinuities. One advantage of a model for a spring clip binding, or other binding elements using pivots is that the angles of the handles can be adjusted in real-time as part of the rendering operation, thereby permitting the accurate simulation of the spring clip handles in relation to the document thickness.

Referring next to FIG. 31, a "physics" model may also be used to represent the interaction between elements of the clips or other binding components. For example, using a series of control points 3110, the rigid handle 2110 is associated with the flexible clip legs 2120. The handle and clip legs then may be adjusted in real-time as they pivot or move about the hinge point that is defined by the control points, and the clip flexes at locations 3150, for example. In the model depicted in this figure, the elements of the model respond, in real-time, as part of the virtual rendering, using physical parameters. The control points respond to forces applied to them, and the model itself would require mathematical modeling of the component that is to be modeled in order to assure correct rendering for visualization. It will be appreciated that a physical model may be employed for the spring clips as well as a number of other bindings discussed herein, but that the use of such models may be much more computationally intensive than fixed models, albeit likely yielding highly realistic results.

7.0 Crimping Bindings

Staple and Brass Fasteners Examples

In considering the manner by which alternative binding mechanisms may be rendered for visualization in a document production visualization system, several alternative binding elements include common characteristics. For example, staples/stitches and brass fasteners are, generally, objects having portions that appear on the two faces of a document, and a variable connector portion to adjust the "thickness" of the connector. With these types of bindings however, the connector piece is generally not visible in the finished product. The center connector piece can be built and customized as requested, or alternatively this connector piece does not have to be part of the 3D model. As will be appreciated from the clip-type bindings discussed above, in the case of the alternative binding elements it is again the stretching of the center portion, or the distance between the top and bottom portions of the binding model, that occurs in the rendering whereas the two end portions are located on the paper surface. One familiar with these alternative binding techniques will also appreciate that this applies to other bindings which have similar properties.

7.1 Staples

Figure 34:
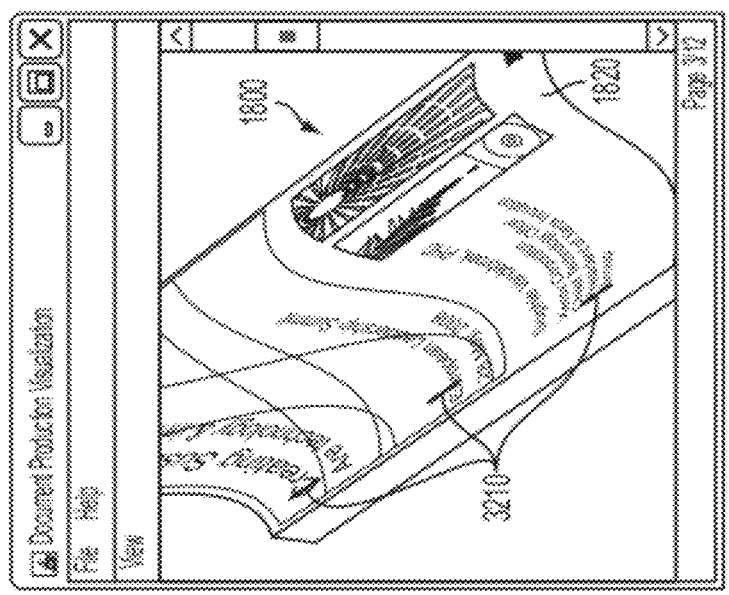
FIGS. 33 and 34 are, respectively, illustrative examples of staple model with multiple models and the staple models included in a visualization window.

As with the prior binding types, there are two principal steps involved in the creation of the 3D objects necessary to represent staples. Referring to FIGS. 32A-C, 33 and 34, preparation of a base model or objects for staples 3210 includes a set of common sizes for the top and bottom portions of the staple as well as a set of different finishing options (e.g. flat or crowned crimp) for the staple bottom. Relative to staples and other bindings or treatments applied to a surface, the design and operation of the model is as illustrated, where the staples may be represented as true 3D objects. The staple models are designed and built such that the separation distance between the front and back segment is easily customized. Staples 3210, as illustrated in the figures, support 3D virtual rendering of a finished document through the creation of a 3D model of the staple that is capable of holding any number of documents with different thicknesses (T). While staples come in different sizes to be matched according to the thickness T, the representation can avoid the selection of a particular size and simply represent staples using a common model that shows a top 3220 and crimped bottom ends 3230. Creating 3D models which have the proper clip spacing between the top and crimped sections (e.g. to match a given document thickness (T)) is accomplished using independent components to represent a staple, including a non-visible, variable thickness "connector." As with the other variable-thickness binding elements described above, the variable thickness is modified in real-time to match the thickness of the document, and is then attached to the scene as a single 3D object for rendering such as depicted in FIG. 34. The parameters associated with the staples further include those which indicate orientation, location, spacing, etc.

Figure 33:
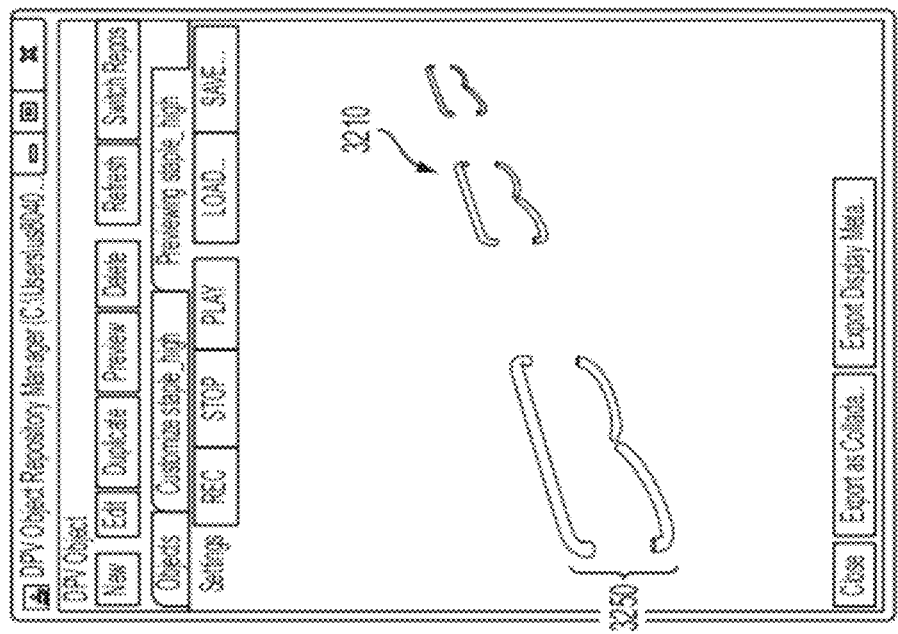

The key variables for staple binding elements to be customized in real time are: (1) the number of staples, (2) the location of the staples, (3) the color of the staples, and (3) the distance between the top and bottom to match the thickness (T) of the document. Continuing with reference to FIGS. 32A-34, when the Customization Service is run, for example with a request for a staple model (3210) which is "a set of three Crown crimped staples of length 0.5, thickness 0.3, dark grey in color and located at Y=−3.0, 0.0, +3.0 inches," (where Y offsets are relative to the center of the page and refer to the center of the staple). It will also be appreciated that the model for staples contemplates a thickness 3330, 3332 for the top and crimped portions of the staple, respectively, where the thickness is a function of the wire sized used for the staple as well as the crimping method (e.g., folded flat, crowned). The model which is generated and returned is shown in FIG. 33. Referring to FIG. 33, this single figure contains a single model with six pieces, with the pieces constituting the front and back of three staples. The base staple model was chosen to match the crimping style and staple size, and then modified to have the correct opening (3250) (e.g. to match the document thickness T), the requested color, and then replicated to provide staples at each of the requested locations.

This single model is then placed in the scene, as illustrated in FIG. 34, the result being the top and bottom of the staple models appearing to be on the front and back of the document (shown without document in FIG. 33). The center connecting pieces are not visible, as they are embedded within the paper. Alternatively, these connecting pieces could have been part of the model, but still would not be visible when rendered in the scene.

7.2 Brass Fasteners Example

Figure 35B:
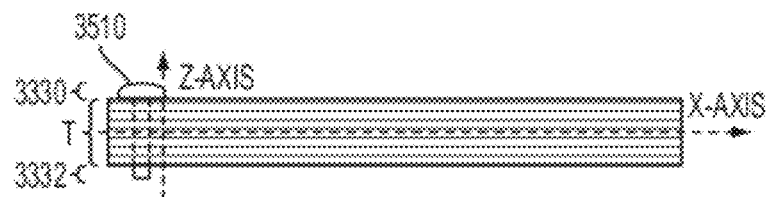
FIGS. 35A-C are illustrations of the face, top and side views of a document setting forth the model parameters for a fastener.
Figure 35C:
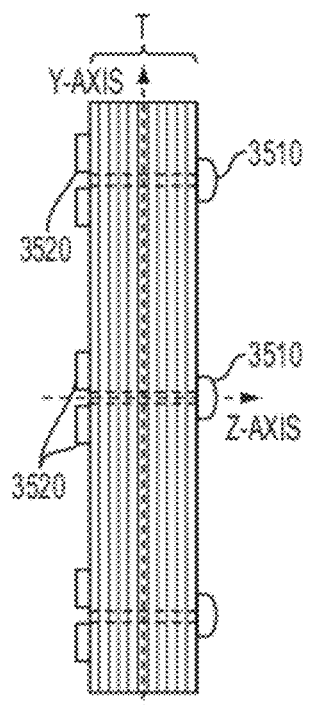
Figure 35A:
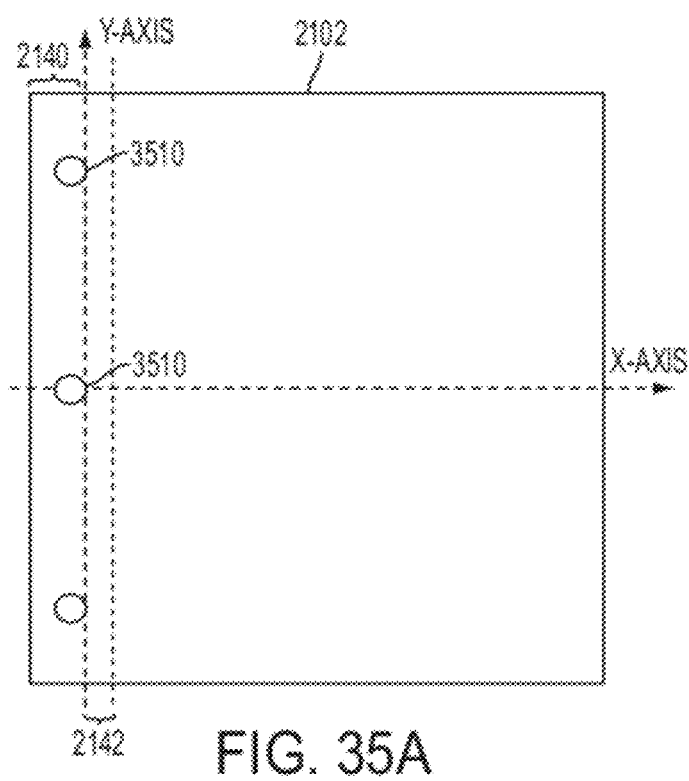
Figure 36:
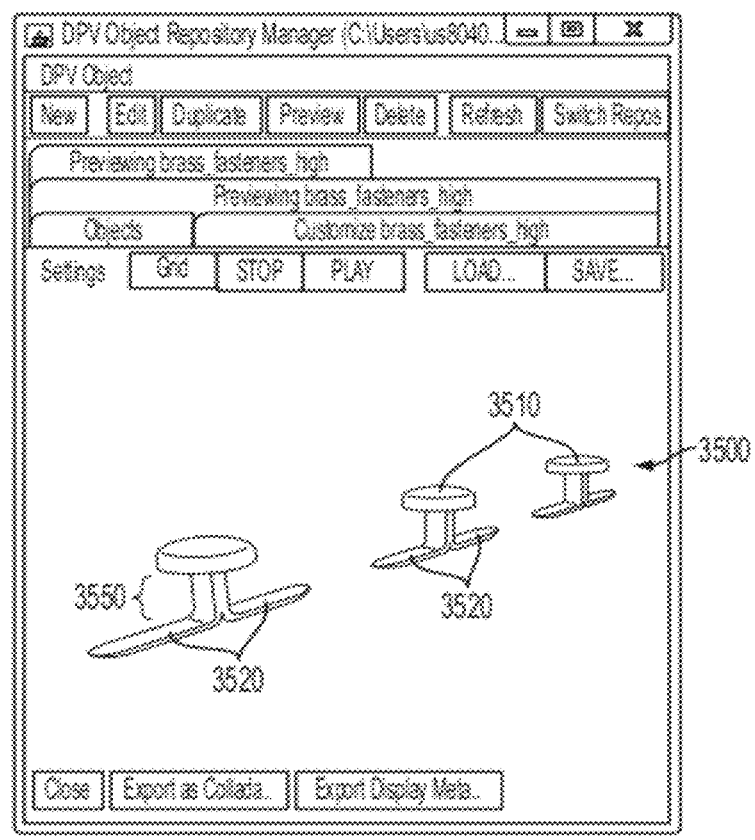
FIG. 36 is an illustrative examples of a fastener model.

As with the prior binding types, there are two principal steps involved in the creation of the 3D objects necessary to represent brass fasteners. Referring to FIGS. 35A-37B, preparation of a base model or objects for brass fasteners includes a set of common sizes for the top or head of the fastener 3510 and the associated gauge of the metal prongs 3520 that are folded over the rear of the document. Although described herein relative to a conventional two-prong brass fastener, it will be appreciated that similar models may also be developed for Acco™ fasteners that are commonly used for legal documents and other binders (e.g., inserted through punched holes). Relative to fasteners and other bindings or treatments applied to a surface, the design and operation of the model is as depicted in FIGS. 35A-36, where the fasteners are represented as true 3D objects. The brass fastener models are designed and built such that the separation distance between the front and back pieces is easily customized. Fasteners 3500, as illustrated in FIGS. 35A-36 support 3D virtual rendering of a finished document through the creation of a 3D model of the fastener that is capable of holding any number of pages thereby resulting in documents with different thicknesses (T). While fasteners come in a range of sizes to be matched according to the thickness T, the representation can avoid the selection of a particular size and simply represent the bras fasteners using a common model that shows a top 3510 and bent or crimped bottom prongs 3520. Creating 3D models involves determining the proper spacing between the top and crimped prong sections (e.g. to match a given document thickness (T)). Hence the disclosed fastener embodiment employs independent components to represent a brass fastener, including a non-visible, variable thickness "connector" in a manner similar to that disclosed above with staples. As with the other variable-thickness binding elements, the variable thickness is modified in real-time to match the thickness of the document, and is then attached or added to the scene as a single 3D object for rendering. The parameters associated with the fasteners similarly include those which indicate their location, spacing, etc.

For the fasteners, the key variables to be customized in real time are: (1) the number of fasteners, (2) the location of the fasteners, (3) the color/material of the fasteners (e.g., brass, steel), (3) the distance between the top and bottom to match the thickness of the document, and possibly the fastener type (e.g., round head, T-head, Acco, etc.). When the CustomizationService is run, for example with a request for a brass fastener model (3500) which is "a set of three Brass Fasteners with ¼ inch heads, thickness 0.3, dark grey in color and located at Y=−3.0, 0.0, +3.0 inches," the model which is generated and returned is shown in FIG. 36. Referring to FIG. 36, this exemplary display window contains a single model, with the pieces constituting the entire brass fastener (including the middle connector). The base brass fastener model has been chosen to match the head size, and then modified to have the correct opening 3550 (e.g. to match the document thickness), the requested color, and then replicated to provide fasteners at each of the requested locations.

Figure 37B:
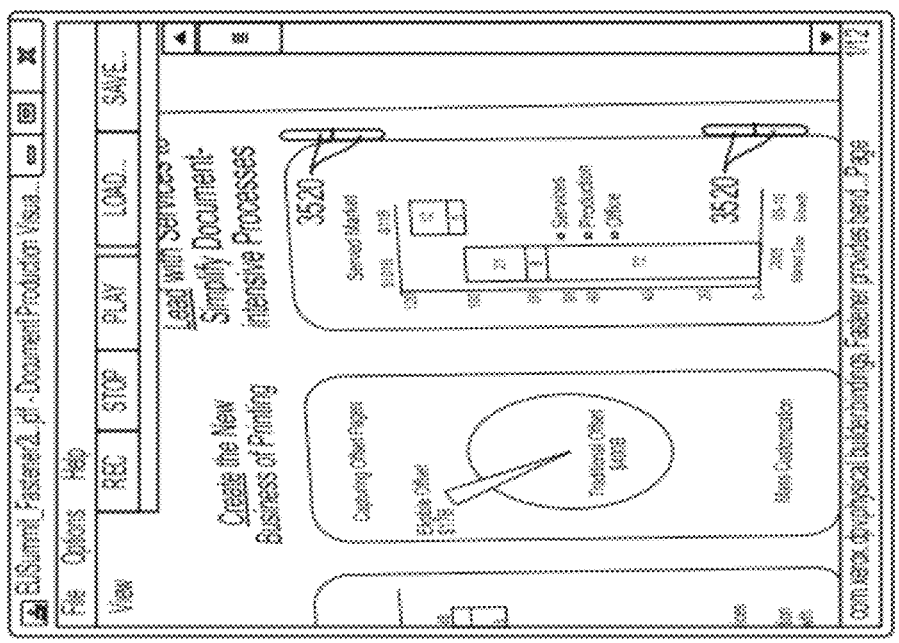
FIGS. 37A-B are, respectively, illustrative examples of the front and back surfaces of a document with the fastener model included in a visualization window.
Figure 37A:
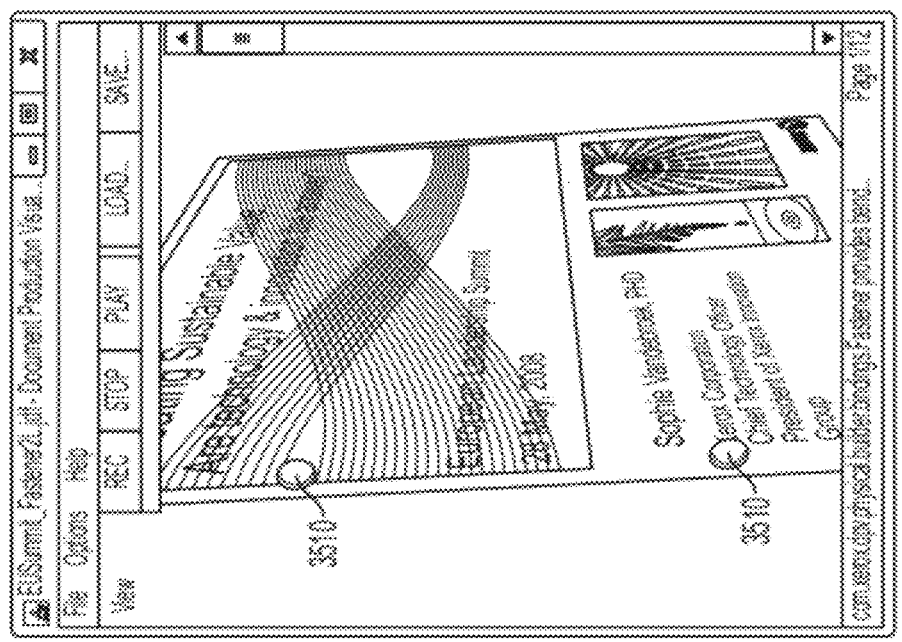

This single model is then placed in the scene, the result being the top and bottom of the fastener models appearing to be on the front and back of the document. A brass fastener model placed in a scene with a document is shown in FIGS. 37A-B. Even though they are part of the model, the center connecting pieces are not visible, as they are embedded within the paper. Alternatively, as described above, these connecting pieces could have been omitted from the model.

8.0 Edge Holding Bindings

Tape, Velo and Glue

There are a class of binding objects which hold a set of sheets together along or by the edges of the documents. Some of the most common types of edge holding bindings include:
Glue: where a thick glue is applied along the face of the spine (in reality it is absorbed a small distance into the stack of pages)
Velo™ binding: two plastic strips are held together by pins connecting one strip to the other, thru the set of pages. The plastic strips are located on the front-face and back-face of the document. The connecting pieces are not visible after the binding is applied.
Tape: bind by wrapping a heat-activated binding strip along and around the pages of the document and securing the pages together
Perfect/Soft: gives a result similar to paperback books. Paperback or soft cover books are also normally bound using perfect binding. They usually consist of various sections with a cover made from heavier paper, glued together at the spine with a strong, flexible glue. The sections are rough-cut in the back to facilitate absorption of the hot glue.

All of these types of bindings share some common structural features. For example, they are placed along the length of the bound edge and thus must vary in length. They can be applied to a continuum of document thicknesses, up to the physical limits of holding pages in place and as a result must be modeled with variable thickness. Many of the edge holding bindings come in assorted materials for color, texture, gauge, etc. Thus they must have models of assorted physical properties. The edge bindings typically cause the resulting pages to bend in a very similar fashion when the document is opened, thus can share common animation behavior models. The various edge holding binding types differ mostly in the way they are placed on the document, including: along the spine only (e.g. glue), thus have only a spine piece; along the faces only (e.g. Velo), thus require two opposing and equal pieces; and along the spine and faces (e.g. tape). Some, such as Perfect Bind, may have large 'covers' associated with them as well, and would thereby require connecting the three pieces together.

It will be appreciated that the model is stretched along one axis (e.g., Y-axis) to match the length of the edge of the document pages being bound, as well as a stretching of the spine dimension of the model to match the thickness of the document. As with the prior examples, this also applies to other bindings which have similar properties. Velo, tape, and glue are example embodiments, but similar techniques may be considered to represent other alternatives.

8.1 Tape Example

Figure 38B:
FIGS. 38A-C are illustrations of the face, top and side views of a document setting forth the model parameters for a tape binding.
Figure 38C:
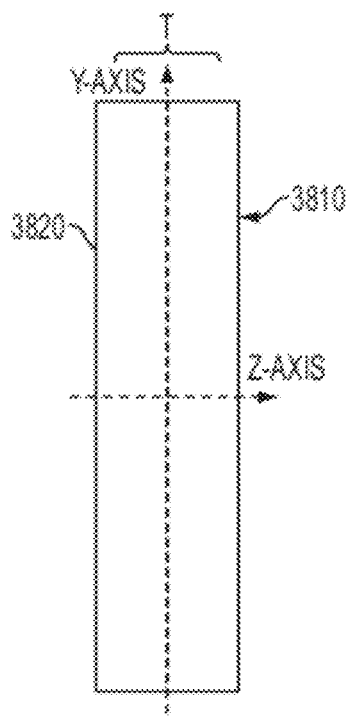
Figure 38A:
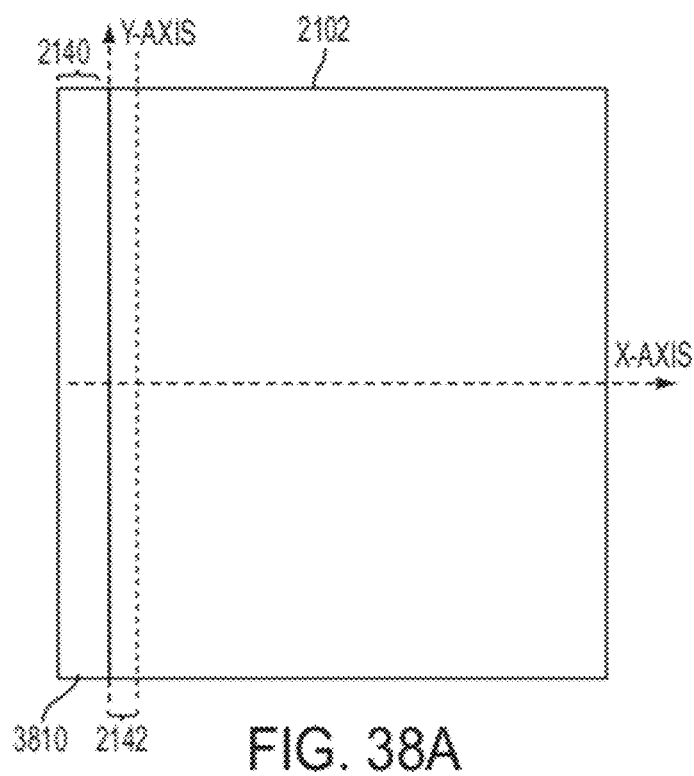
Figure 39B:
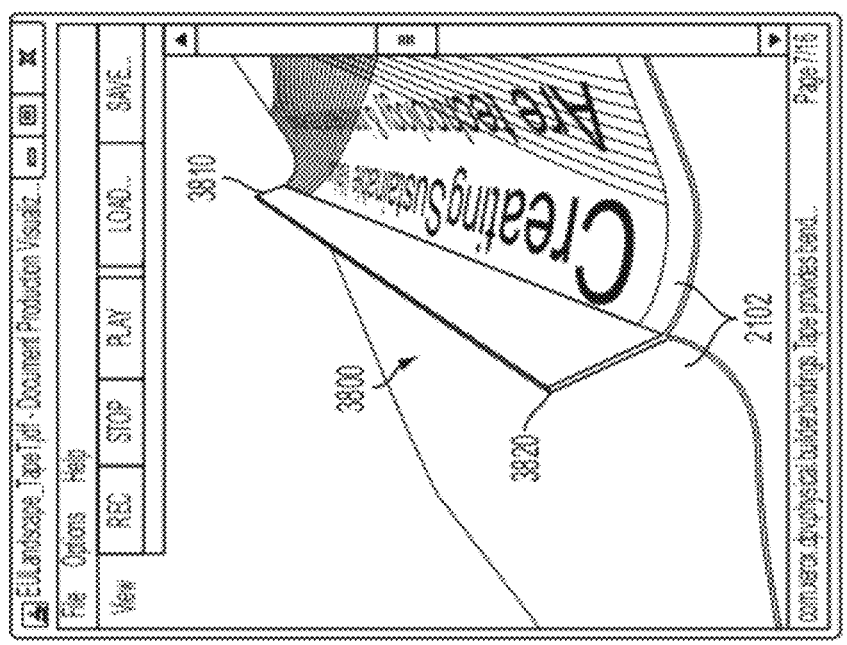
FIGS. 39A-B are, respectively, illustrative examples of a tape binding model and the tape binding model included in a visualization window.
Figure 39A:
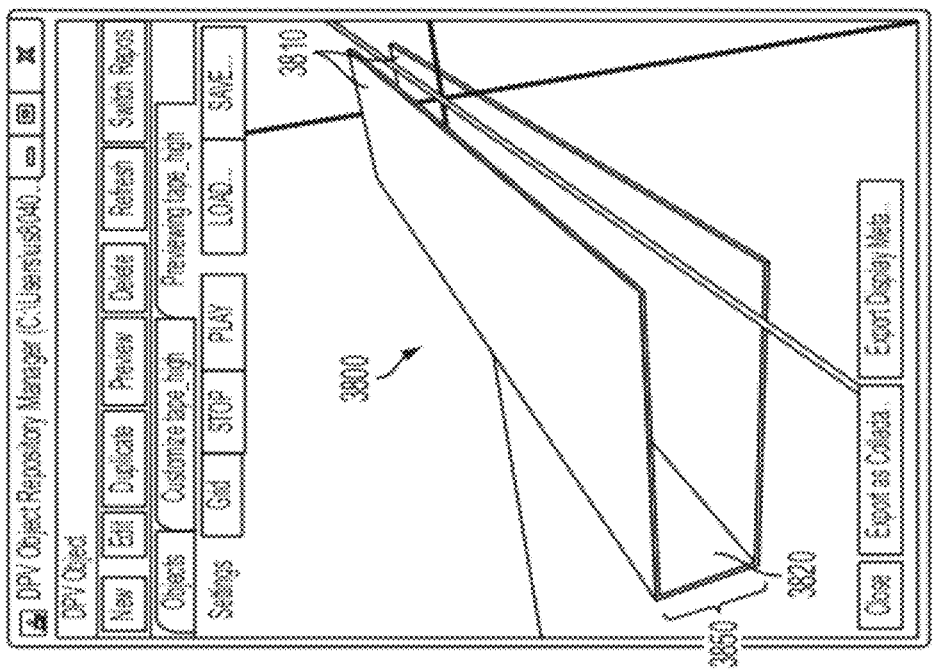

As with the prior binding types, there are two principal steps involved in the creation of the 3D objects necessary to represent tape binding. Preparation of a base model for tape includes a basic structure with the shape of tape when used to bound a document. Relative to glue bindings or treatments applied to the edge of document, the design and operation of the model is as depicted in FIGS. 38A-39B, where the tape is represented as a true 3D object. While it will be appreciated that the tape binding may be simulated, possibly using a 2D texture as described below, the 3D tape model 3800 is designed and built such that the separation distance or width 3850 of the spine 3820, between the front and back flap portions 3810, is easily customized, and the length of the tape can be scaled to match the length of the document. Tape binder 3800, as illustrated in FIGS. 38A-39B supports 3D virtual rendering of a finished, tape bound document through the creation of a 3D model of the tape that is suitable for holding documents with different thicknesses (T) as shown by binding width 3850. The tape comes in one or more widths and an excess not used to cover the thickness of the document overlaps or extends into flaps 3810, and the representation can avoid the selection of a particular size and simply represent the tape binding as a model that shows a top spine 3820 extending into flaps 3810 on the top and bottom of the document. As with the other variable-thickness binding elements, the thickness of the tape is adjusted according to the tape width (spine plus both flaps) so that the tape is depicted as covering the edge and extending into the Block or Xoffset region 2140 as shown in FIG. 38A, and the width of this region may be modified in real-time in accordance with the thickness of the document, before being added to the scene as a single 3D object for rendering. Although the tape thickness 3840 is generally on the order of a document page, it may also be modeled so as to be correctly represented on the surface of the 3D rendering. As noted above, the length of the tape binding would generally match the length of the documents being bound. The key variables to be customized in real time for the tape binding are (1) the length, (2) the color of the tape, and (3) the distance between the front and back segments to match the thickness of the document, which also includes a stretching of the spine portion to match as well. When the CustomizationService is run, for example with a request for a tape model which is "11 inches long, thickness 0.3, red in color," the model which is generated and returned is shown in FIG. 39A. Referring to FIG. 39A, this single figure contains a single model, with the pieces constituting the entire piece of tape as it will wrap around the document. The tape model has been modified to have the correct opening (e.g. to match the document thickness), the requested color, and the required length.

This single model is then placed in the scene, the result being the front, back, and spine portions of the model appear to wrap around the edge of the document. A tape binding model placed in a scene with a document is shown in FIG. 39B.

8.2 Velo Example

As with the prior binding types, there are two principal steps involved in the creation of the 3D objects necessary to represent Velo binding. Preparation of a base model for Velo includes a basic structure with the shape of the front and back plastic pieces when used to bind a document. Relative to Velo and similar bindings or treatments applied to the edge of document, the design and operation of the model is as depicted in FIGS. 40A-41B, where the tape is represented as a true 3D object. The Velo model 4000 is designed and built such that the separation distance 4050 between the front and back page plates 4010 is easily customized, and the length of the object can be scaled to match the length of the document. Alternatively, the length can be constrained to a set of fixed values commonly available. Velo binder 4000, as illustrated in FIGS. 40A-41B supports 3D virtual rendering of a finished, Velo bound document through the creation of a 3D model of the binder that is suitable for holding documents with different thicknesses (T) as shown by binding width 4050. The binder comes in one and possibly more widths, and the representation can simply present the binding as a model that shows a top and bottom page plates 4010 on the surfaces of the document. As with the other variable-thickness binding elements, the thickness of the Velo binder is adjusted but is not visible, and the width of this region (represented by 4050) may be modified in real-time in accordance with the thickness of the document, before being added to the scene as a single 3D object for rendering. The thickness 4040 of the page plates is generally the same, it may also be modeled in 3D so as to be correctly represented on the surface of the 3D rendering. As noted above, the length of the Velo binding would generally match or be close to the length of the documents being bound.

Figure 41A:
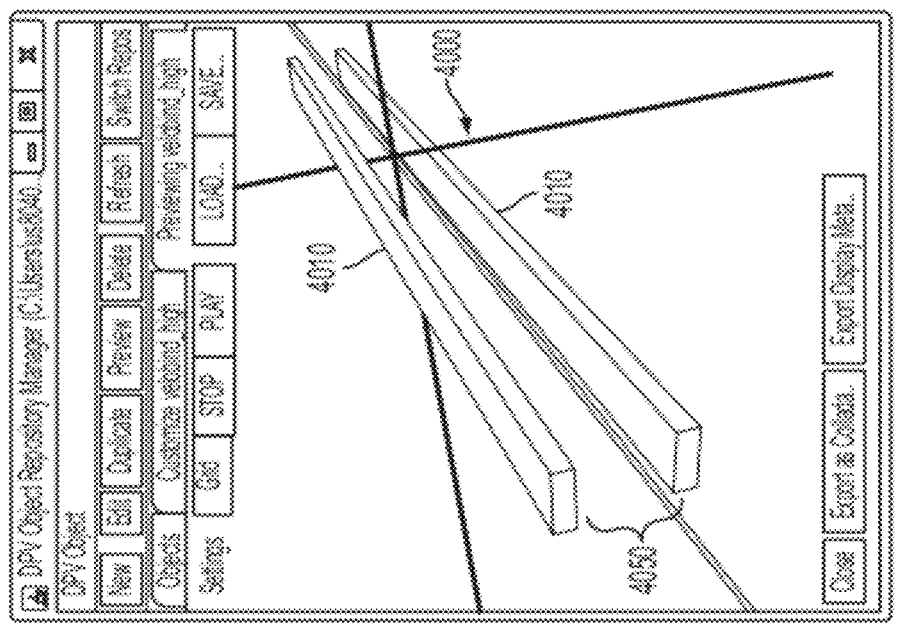
FIGS. 41A-B are, respectively, illustrative examples of a Velo binding model and the Velo binding model included in a visualization window.
Figure 41B:
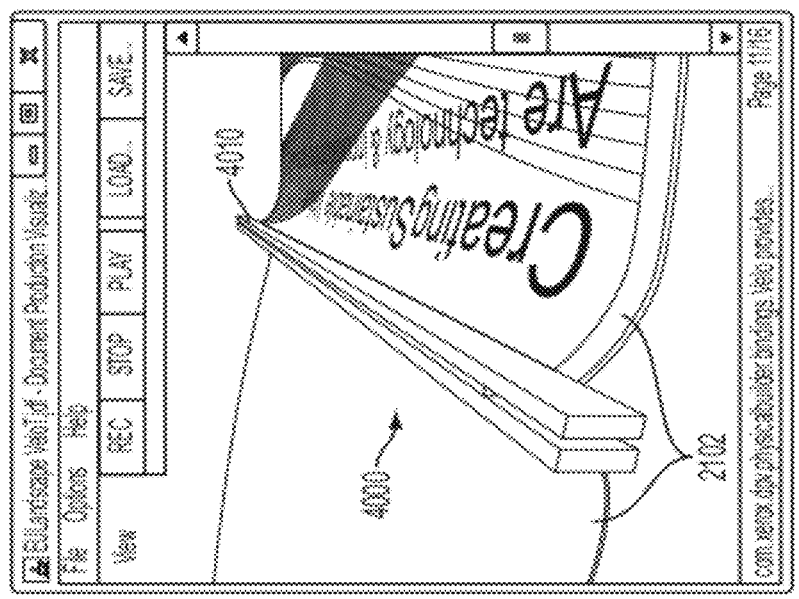
Figures 42A, 42B, 42C:
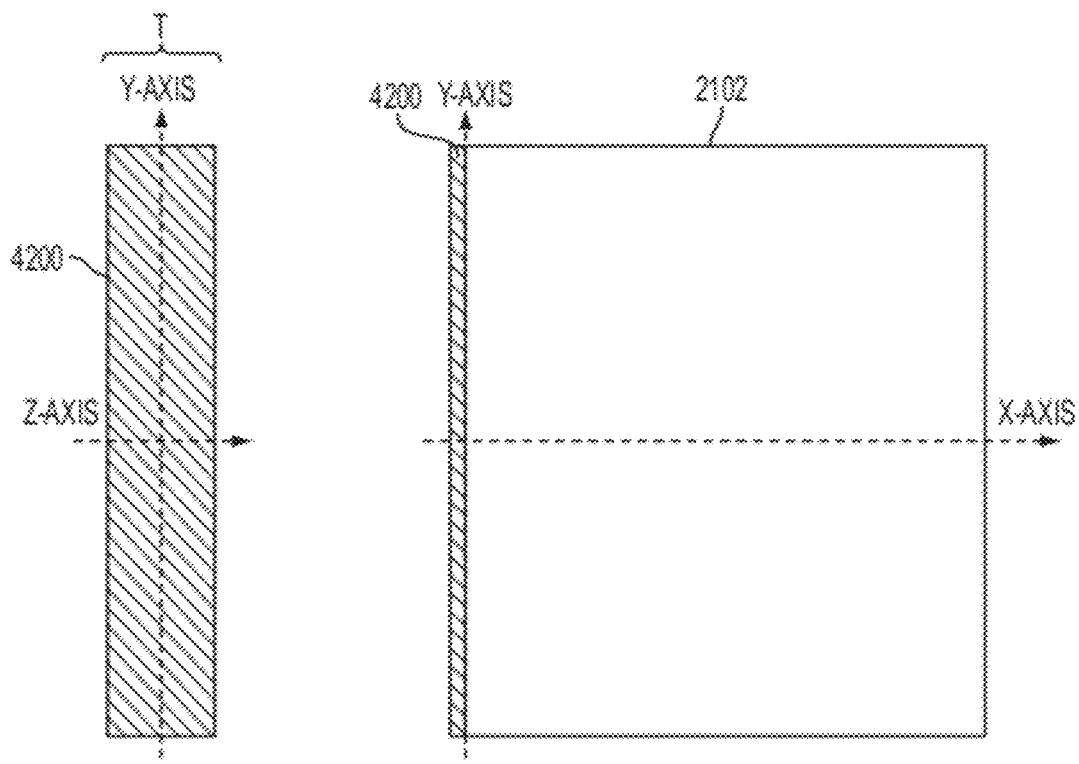
FIGS. 42A-C are illustrations of the face, top and side views of a document setting forth the model parameters for a glue binding.

For Velo binding, key variables to be customized in real time include: (1) the length, (2) the color of the Velo, and (3) the distance between the front and back segments to match the thickness of the document. In the case of Velo bindings, there is no spine portion to match as well, as there is for glue or tape. When the CustomizationService is run, for example with a request for a Velo model which is "11 inches long, thickness 0.3, red in color," the model which is generated and returned is shown in FIG. 41A. Referring next to FIG. 41B, this single figure contains a single model, with the two pieces constituting the entire object as it will be placed around and adjacent an edge of the document. The Velo model has been modified to have the correct opening (e.g. to match the document thickness (T)), the requested color, and the required length. An alternative embodiment may include the ability to specify the surface characteristics (e.g., texture) of the plastic Velo bind pieces.

This single model is then placed in the scene, the result being the front and back pieces of the model appear to crimp or compress the edge of the document. A Velo binding model placed in a scene with a document is shown in FIG. 41B. In reality, there are center connecting pieces 4060 which are not visible when the Velo bind is assembled with a document, as they are embedded within the paper. Alternatively, these connecting pieces could have been included with the model. Such an alternative is similar to that presented above in the brass fasteners example.

8.3 Glue Example

As with the prior edge binding types, there are two principal steps involved in the creation of the 3D objects necessary to represent a glue binding. Preparation of a base model for glue includes a basic structure with the shape of glue when it is applied to the edge of bound a document. Relative to glue-type bindings or treatments applied to the edge of document, the design and operation of the model is as depicted in FIGS. 42A-43B, where the glue is represented as a true 3D object. The glue model is designed and built such that the it is easily customized to match the dimensions of the spine of the document 2102. The glue binding 4200, as illustrated in FIGS. 42A-43B supports 3D virtual rendering of a finished, glue-bound document through the creation of a 3D model of the glue that is suitable for holding documents with different thicknesses (T). Representation of the glue or adhesive can simply present the binding as a model that shows the adhesive applied along the edge of the document pages. As with the other variable-thickness binding elements, the thickness is adjusted in real-time in accordance with the thickness of the document (T), before being added to the scene as a single 3D object for rendering. As noted above, the length of the Velo binding would generally match or be close to the length of the documents being bound. It should also be noted that the block offset for the glue binding is zero because it is applied to the page edges, and that while the bendoffset is not equal to zero for a glue binding, it is very small and can be reflected in the virtual model in that manner.

Figure 43A:
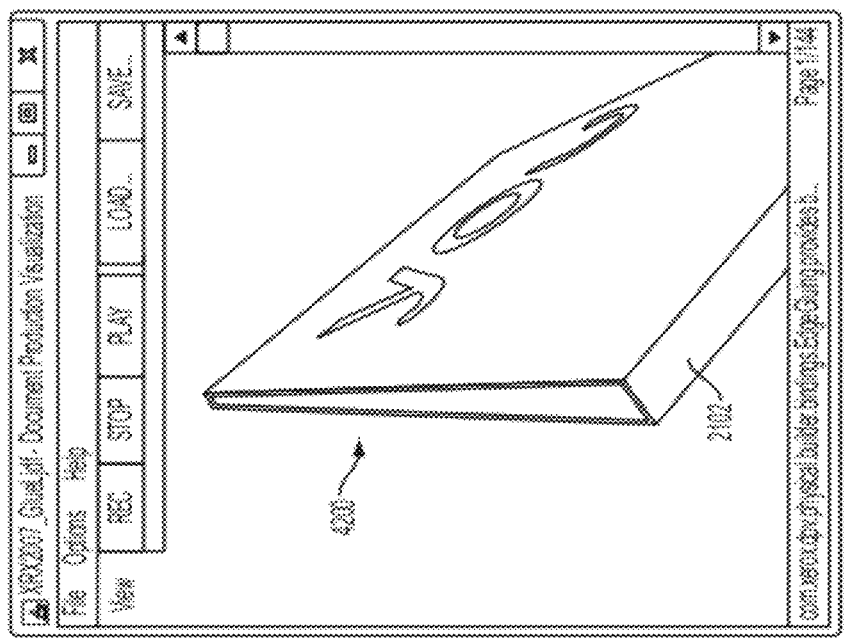
FIGS. 43A-B are, respectively, illustrative examples of a glue binding model and the glue binding model included in a visualization window.

The key variables to be customized in real time are (1) the length, (2) the color of the glue, and (3) the distance between the front and back segments, or width of the spine. When the CustomizationService is run, for example with a request for a glue model which is "11 inches long, thickness 0.3, red in color," the model which is generated and returned is shown in FIG. 43A. Referring to FIG. 43A, this figure contains a single object constituting the glue which would be applied along the spine of the document. The glue model has been modified to have the correct size (e.g. to match the dimensions of the spine) and the requested color.

Figure 43B:
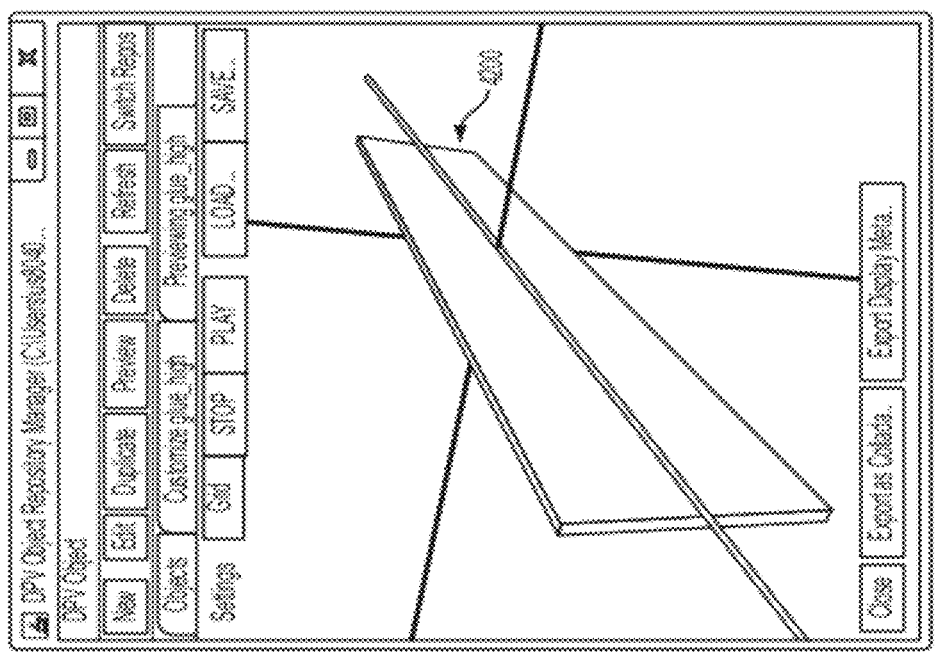

This single model is then placed in the scene, the result being the that the model appears to adhere to the edge of the document. In reality the glue would be impregnated a small distance into the document. This affect can be simulated by adjusting the thickness of the model, and its placement in space relative to the edge of the stack of paper. A glue binding model placed in a scene with a document is shown in FIG. 43B.

9.0 Using 2D Objects or Textures to Simulate 3D Objects

Having described the general operation of the document production visualization system for a binding, the following disclosure is directed to additional features and functions associated with specific binding types. As may be recognized from the foregoing description, in a 3D binding representation, the binding also has an associated hole or holes through which the binding must pass. While it is possible to render a 3D binding in a realistic manner, the rendering of holes in association with such binders presents increased complexity, particularly due to the multitude of different hole shapes, sizes and patterns which are possible. Some binding types (e.g. coil, comb-wire, comb-plastic, ring) require the presence of holes in the media and these binding types may come in different lengths or pitches. The media may have any of a number of hole patterns and the holes may be located along any edge of the document. In one embodiment, the system and method use 2D images, represented as surface textures on the front and back of 3D objects to represent holes, and generates these images under programmatic control so that any hole pattern can be supported without having to create and maintain a database of hundreds of pre-defined images.

It should also be appreciated that staples and similar low-profile or surface binding types such as tape, glue, stitching and various prong-type fasteners may also be represented as 2D images which approximate in appearance the 3D objects (e.g., pages) which they are displayed as binding. The system and methods described also use 2D images as surface textures on the front and back of 3D objects to represent stitching, etc. Again, the system generates these images under programmatic control so that any staple, stitch or other binding pattern can be supported without having to create and maintain a database of hundreds of images, thereby permitting the efficient storage of binding models associated with such binding types.

The embodiments described herein solve the problem of presenting a pseudo-realistic rendering of holes, staples, stitches and other bindings in pages with an efficient use of texture maps generated in real time in response to the document description. In one embodiment, the system generates an image to be used as a texture map on a page surface. The page surface image is clear, except where the holes or surface bindings are located, where they are represented as colored or shaded areas. For example, the color of holes is matched to the background grey of the scene to create the visual appearance of looking thru the document to the background. The color of the staples is black or grey to match the actual appearance, and similar coloration may be applied for stitching, etc. In these embodiments the images are computed in real time, in response to a set of parameters and then compressed as PNG or similar image types for transmission. The parameters specify such things as the size of the necessary texture map (e.g. to fit the page), and the geometry of the hole pattern, staple, stitching, etc.

9.1 Holes Due to Bindings or Media

Figure 44A:
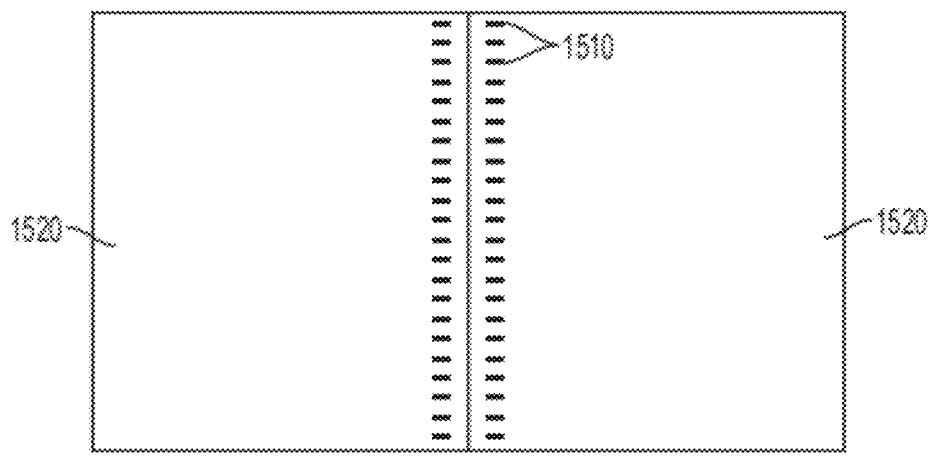
FIG. 44A is an illustration of a pair of document pages with a 2D texture used to model rectangular holes in the pages.
Figure 44B:
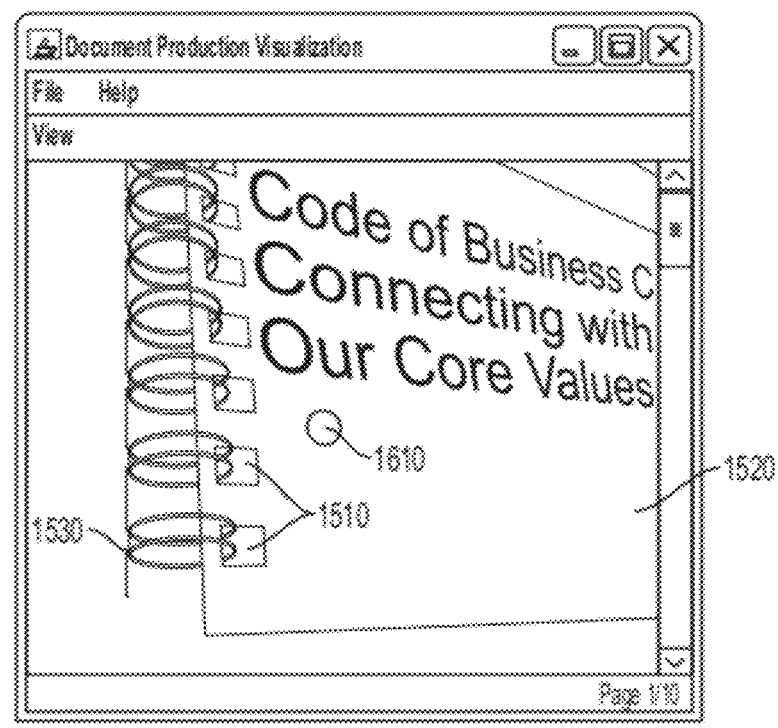
FIG. 44B is a 2D hole model for representing holes depicted with a wire comb binding included in a visualization window.

Referring to FIGS. 42-44, the system and methods employs 2D images to represent 3D features. For example, with specific reference to FIGS. 44A-B which depict a wire comb binder, FIG. 44A depicts holes for a spiral wire binder, where the holes 1510 are depicted as textures on a 3D surface 1520, to represent a 3D hole object in the scene. Since the holes are not true 3D objects, close examination will reveal that one can not look thru the holes. As can be seen in FIG. 44B, bindings which use the holes will be cut off at the surface of the virtual page instead of going thru the virtual page. However, the ability to see where holes will be on the page, and to see if holes 1510 and bindings such as the wire comb binding 1530 are potentially impacting any content is easily accomplished using this technique.

A typical set of parameters to define the hole pattern includes:
  PageWidth, PageHeight—these define the size of the image which will be used as the texture map;
  holeShape—used to produce round, elliptical, square, or rectangular hole;
  holeHeight—the size of the hole along the vertical direction;
  holeWidth—the size of the hole along the horizontal direction;
  holeColor—the RGB values of the holes, this is typically chosen to match the background color of the scene;
  pitch—used to determine the number of hole per unit distance, although it is also possible to provide a set of hole positions;
  initialX—the location of the start of the hole pattern along the horizontal direction;
  initialY—the location of the start of the hole pattern along the vertical direction;
  public HolePatternBuilder(double pageWidth, double pageHeight,
    String holeShape, double holeWidth,
    double holeHeight, Color color, int pitch, int number,
    String edge, String coordinateSystem, double initalX,
      double initalY, double . . . positions).

9.2 Customization of Holes

When the CustomizationService discussed above is run, the request for a hole pattern which is "a set of rectangular holes 1510 of size 0.15×35, light grey in color, starting in the lower left corner with pitch of 2 to place on a 8.5×11 page with a margin of 0.5" the image which is generated and returned is shown in FIG. 44B. The holes, as will be appreciated, are matched to the pitch of the binding 1530 which is also depicted in FIG. 44B. In the event of a spiral binding, for example as described above, the request may be for a hole pattern which is "a set of round holes of size 0.35, red in color, starting in the lower left corner with pitch of 2 to place on a 8.5×11 page with a margin of 1.5" the image which is generated and returned as shown in FIG. 45.

Figure 45:
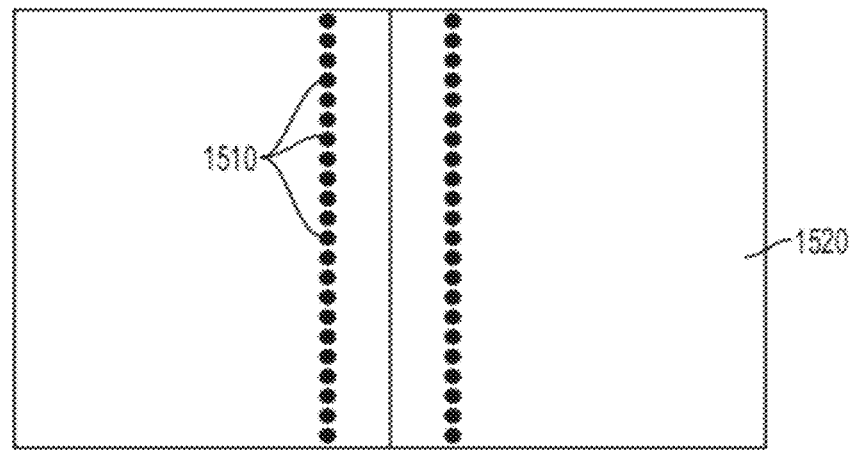
FIG. 45 is an illustration of a pair of document pages with a 2D texture used to model round holes in the pages associated with a coil binding.

The images of FIGS. 44A and 45 contain the textures which will be mapped to the front and back of the displayed pages (e.g., FIG. 44B). The right half of each image is the front of the document (the holes will be adjacent the left edge), and the left half of the image contains the hole pattern for the back of a page, where the holes will appear adjacent the right edge. As illustrated in FIG. 44B a rendered document with holes displayed in a 2D manner provides ample indication of the nature of the holes and associated binding. While only the lower left portion of a document is shown in FIG. 44B, the rectangular holes 1510 necessary for the wire comb binding 1530 are clearly depicted. Moreover, the job further included a 3-hole pattern for holding the document in a ring binder, and the relative position of the circular hole 1610 for the ring binder can be seen in the face of the top page as well.

Some documents may contain different size pages, yet a virtual representation of a set of punched holes in a document of mixed size pages should have a consistent hole pattern for each page. When applying the textures to a page, care must be taken, therefore, to use the same image size for each page. In this case the size of the image used as the texture map for holes must be calculated for all the different page sizes that may be present in a document. If the image is scaled to map onto each page, the hole positions may change with page size. The hole image textures are clipped into the surfaces as textures, and are not scaled to fit any arbitrary size page. In the current embodiment the hole images are set to match the smallest size sheet, and the sheets are center aligned. It is contemplated that other embodiments may use other rules for alignment of sheets within the document and the location of holes. Indeed, these preferences should be part of the job description, and properly reflected in any rendering.

9.3 Tape, Glue, Staples

Figure 46:
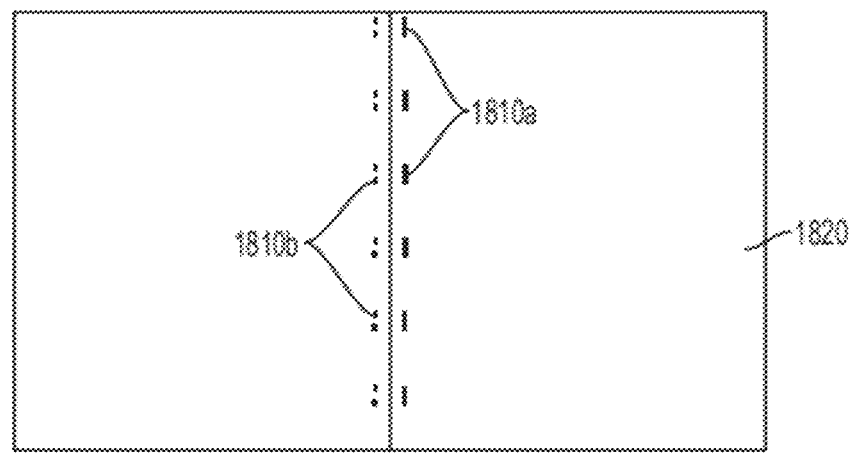
FIG. 46 illustrates a 2D model for representing staples in accordance with one of the embodiments.
Figure 48:
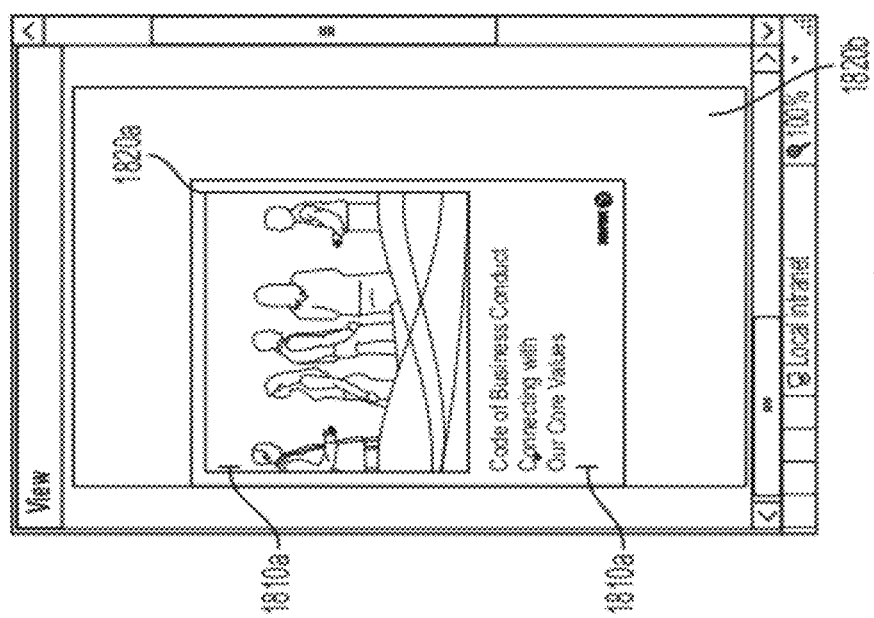
FIGS. 47 and 48 illustrate the representation of additional stapling configurations using a 2D model as depicted in a visualization window.
Figure 47:
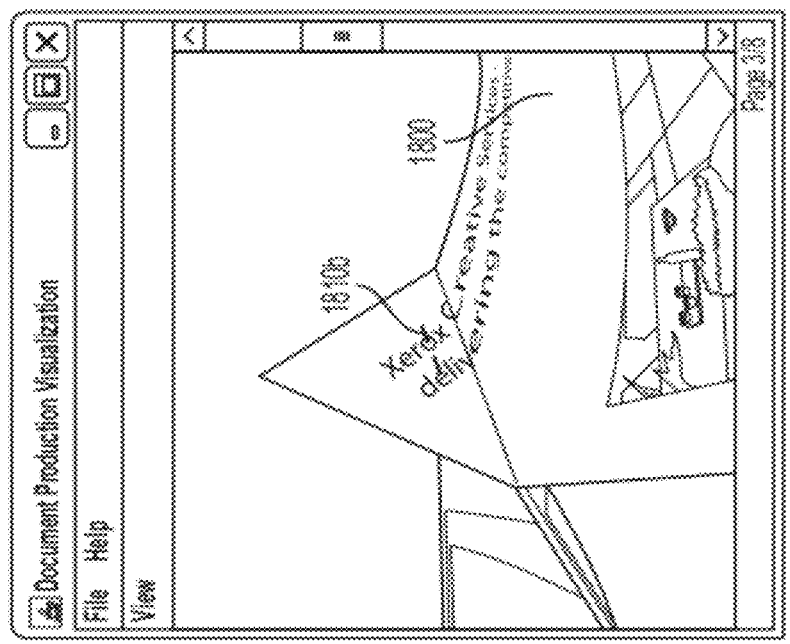

Relative to staples and other bindings or treatments applied to a surface, for example as depicted in FIGS. 46-48, since the staples 1810 are not represented as true 3D objects in the displayed windows shown, close examination will reveal that the staples have no real height above the surface of the page 1820, as real staples do or as the staples disclosed above for 3D models would. However, the ability to see where staples will be located on the page, and to see if staples are occluding any content is easily accomplished using this technique.

The typical set of parameters to define the staple pattern include:
PageWidth, PageHeight—these define the size of the image which will be used as the texture map;
margin—the distance of the staple form the edge (or corner) of the page;
stapleLength, stapleThickness—the size of the staple;
Color—the RGB values of the staple, where this is typically black or grey, but a contrasting color may be used to increase visibility for testing;
Number—the number of staples;
Edge—top, right, bottom, left, upper left/right, lower left/right;
public StaplePageBuilder(double pageWidth, double pageHeight, double margin, double stapleLength, double stapleThickness, Color color, int numOfStaples, String edge).

9.4 Customization of Tape, Glue, Staples

When the CustomizationService is run, with a request for a staple pattern (1810a, b) such as "a set of six Crown crimped staples of length 0.5, thickness 0.3, dark grey in color, located 0.03 from the left edge of a 8.5×11 page" the image which is generated and returned is shown in FIG. 46. Referring to FIG. 46, this single figure contains images of the textures which will be mapped to the front (rightmost) and back (leftmost) pages. In the right half of the image the staple image/texture 1810a will be along the left edge, and in the left half of the image the sample pattern for the back of a page is depicted, where the rounded ends (crown crimping) of the staple 1810b will appear adjacent the right edge.

An example of a document rendered by the document production visualization system with staples is shown in FIGS. 47 and 48. In each case staples 1810a, b are shown adjacent an edge of the document 1800. The staples may be rendered in a contrasting color (e.g., red) to increase visibility in the visualization. Referring to FIG. 47, a corner staple document is shown as may have been selected as an option from a user menu presented on the graphical user interface. In this case the back crimping of the staple 1810b is visible. Considering FIG. 48, some bound documents may contain different size pages (1820a, 1820b). A physical representation of a set of staples in a document of mixed size pages should have the same staple location for each page. When applying the textures to the pages, care must be taken to use the same image size for each page. An example of such a document is shown, where there is a request for two staples 1810a adjacent the left edge. The upper staple is just above the man's head in the page content, whereas the lower staple is just below the word 'Our' in the page content. In the case of mixed-size pages, the image used as the texture map for staples must be calculated for all the pages. If the image is scaled to map onto each page, the staple positions will change with page size. The staple image textures are clipped into the surfaces as textures, and are not scaled to fit any arbitrary size page. In one embodiment the staple images may be set to match the smallest size sheet, and the sheets are center aligned such as illustrated in the visualization seen in the display window of FIG. 48. Other embodiments could use other rules for alignment of sheets within the document and the location of staples. Indeed, these preferences should be part of the job description, and properly reflected in any rendering.

Relative to the display of holes and various low-profile or surface-applied bindings, the print document production visualization system, again including a controller, a print product definition, and a binder requirement specification, would employ a plurality of binding elements and associated meta-data managed by the controller, the controller configured to transform the binding elements and associated meta-data as specified by the binder requirement specification into a 2D binder display model for inclusion in the transformation of the print product definition into a print product display model that can be displayed as a virtual rendering on a graphical user interface. As noted, the binder requirement specification is provided within the print product definition, and may be defined by user interaction with a graphical user interface menu provided by the graphical user interface (e.g., 150 in FIG. 2). Thus, the system enables an efficient means of using a 2D binder display model to represent the binder requirement as a 2D rendering associated with a 3D surface of the print product. Again, the binder requirement specification (whether holes, staples, stitches, etc.) is defined with values used to modify properties as provided by the meta-data in interaction with the graphical user interface menu. In other words, the graphical user interface is configured to provide or present values from user gestures in interaction with graphical user interface menu, the values being used to select or modify properties provided by the meta-data associated with the 2D elements.

9.5 Other Elements Represented in 2D

Although not intended to be an exhaustive list, and other types of 2D representations are contemplated, other bindings may be represented using 2D textures to render the elements and associated meta-data including: holes, and staples, tape, glue, stitching, saddle stitching, round-head fasteners, 2-prong fasteners, and VeloBind. Further contemplated are 2D "binding" elements that may be represented include: embossing, foils, special inks or stickers and labels applied to the document.

9.6 Combinations of 2D and 3D Objects for Document Visualization

The models for each of the binding elements and other 2D features are, as previously disclosed, managed by the controller in a model repository. Moreover, architecture layers of the system are managed and organized by the controller including a print job ticket adaptation layer, a physical model layer, and a display model layer, where the print job ticket adaptation layer is configured to transform the print product definition into a physical model, the physical model layer is configured to transform the physical model into a display model pulling the 2D binding elements and associated meta-data from the model repository as per the binder requirement specification, and the display model layer is configured to transform the display model into the print product display model that can be displayed as a virtual 3D rendering with associated 2D elements on the graphical user interface.

As will be further appreciated, the method of operating the system for generation of a three dimensional virtual rendering of a document having such "binding" features includes not only storing the 2D binding elements and associated meta-data in a repository, but also transforming the 2D binding element and associated meta-data into a 2D binder display model in response to the binder requirement specification, and transforming the print product definition into a 3D display model, including incorporating the 2D binder display model in a 3D virtual rendering of the print product definition on the graphical user interface. More specifically, the 2D binder display model is employed to represent the binder requirement as a 2D rendering associated with a 3D surface of the print product being displayed. The graphical interface may be further employed to interact with a menu on the graphical user interface, and may interactively update the display model layer in response to requests from the rendering layer to update spatial relationships in response to the user gestures.

9.7 Example

O-Ring Binder (with 2D Holes)

Referring again to FIGS. 16A-19C, depicted therein is a model (FIG. 16C for example), illustrating the ring elements 1610 along with associated backing plate portions 1614 and the non-ring portions of the backing plate 1620. As shown, the number of rings and spacing therebetween may be customized by the selection of the appropriate model. FIG. 19A illustrates a visualization of a document bound using a ring binder as described, where the ring binder is an D-ring type having a backing plate 1614, 1620 affixed or mounted along the spine of the cover 1650, and where the three rings are illustrated as passing through the pages 1660 of the document. As illustrated the ring elements 1610 are held in a spaced-apart relationship by the backing plate elements. As described above relative to the 2D models, the holes in the pages into which the rings appear to pass may be 2D textures applied to the surface of the pages in order to provide the appearance of a hole.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A modular document production visualization system, comprising:
    a controller;
    a print product definition;
    a plurality of architecture layers managed and organized by the controller wherein the plurality of architecture layers include a print job ticket adaptation layer, a physical model layer, a display model layer, and a rendering layer;
    the print job ticket adaptation layer reading the print product definition and transforming the print product definition into a physical model that describes the static nature of the print job to be rendered, said physical model being represented, at least in part, by physical model blocks representing, in a scene, a set of adjoining sheets of the same media with the same orientation;
    the physical model layer transforming the physical model into a display model that uses abstractions to represent various artifacts produced by the job and a data-binding parser to load the physical model into a memory, and where each physical model block is mapped to a plurality of display model blocks; and
    the display model layer transforming the display model into the scene displayed as a three dimensional virtual rendering of the print product definition by the rendering layer on a graphical user interface, wherein the scene includes representations of a plurality of physical model blocks.

2. The system of claim 1 wherein the architectural layer utilizes a programming technique selected from the group consisting of: extensible stylesheet language transformations, computer programming languages that allow small application programs to be downloaded from a server to a client along with data that each program processes, a multi-paradigm object-oriented programming language, and servlets.

3. The system of claim 1 wherein a user manipulates the three dimensional virtual rendering through user gestures.

4. The system of claim 3 wherein the system supports a bi-directional flow of information.

5. The system of claim 4 wherein the display model layer responds to requests from the rendering layer to update spatial relationships in response to user gestures.

6. The system of claim 1 wherein the system is implemented as a stand-alone application operating on a computing device.

7. The system of claim 1 wherein the system is implemented as a client-server application, wherein the client-server application includes a segmentation of function between the client and the server.

8. The system of claim 1 wherein the physical model blocks are each mapped to a plurality of display model blocks.

9. A document production visualization method, comprising:
    reading a print product definition and transforming the print product definition into a physical model utilizing a job ticket adaptation layer, said adaptation layer transforming the print product definition into a physical model that describes the static nature of the print job to be rendered, said physical model being represented, at least in part, by physical model blocks representing, in a scene, a set of adjoining sheets of the same media with the same orientation;
    transforming the physical model into a display model utilizing a physical model layer that uses abstractions to represent various artifacts produced by the job and a data-binding parser to load the physical model into a memory, and where each physical model block is mapped to a plurality of display model blocks;

transforming the display model into the scene utilizing a display model layer, wherein the scene includes representations of a plurality of physical model blocks; and displaying said scene as a three-dimensional virtual rendering utilizing a rendering layer transform to a graphical user interface.

10. The method of claim 9 wherein the print product definition is provided as one of a group of definitions consisting of: a job definition format, a job ticket.

11. The method of claim 9 wherein the job ticket adaptation layer utilizes extensible stylesheet language transformations to transform the print product definition into the physical model.

12. The method of claim 9 wherein the method utilizes a bi-directional flow of information.

13. A non-transitory computer storage medium for generation of a three dimensional virtual rendering, the non-transitory computer storage medium embodying computer program code, the computer program code comprising computer executable instructions configured for:

receiving as input a print product definition;

generating a physical model from the print product definition utilizing a job ticket adaptation layer, said adaptation layer transforming the print product definition into a physical model that describes the static nature of the print job to be rendered, said physical model being represented, at least in part, by physical model blocks representing, in a scene, a set of adjoining sheets of the same media with the same orientation;

generating a display model from the physical model utilizing a physical model layer, said physical model layer using abstractions to represent various artifacts produced by the job and a data-binding parser to load the physical model into a memory, and where each physical model block is mapped to a plurality of display model blocks;

generating the scene from the display model utilizing a display model layer, wherein the scene includes representations of a plurality of physical model blocks;

displaying the scene as a three dimensional virtual rendering of the print product definition on a graphical user interface utilizing a rendering layer; and providing a controller configured to organize and manage the job ticket adaptation layer, the physical model layer, the display model layer, and the rendering layer and thereby permit the manipulation of a representation of at least one physical model layer block.

14. The non-transitory computer storage medium of claim 13 wherein the physical model layer utilizes at least one of: XSLT, JAVA, JAVA Script, C#, and servlets.

15. The non-transitory computer storage medium of claim 13 wherein a user may manipulate the three dimensional virtual rendering through system recognition of user gestures.

16. The non-transitory computer storage medium of claim 15 wherein the display model layer responds to requests from the rendering layer to update spatial relationships in response to the user gestures.

17. The non-transitory computer storage medium of claim 16 wherein the system is configured to support a bi-directional flow of information.

18. The non-transitory computer storage medium of claim 13 wherein the system is implemented as a client-server application wherein the client-server application includes a segmentation of function between the client and the server.

* * * * *